United States Patent [19]
Ueda et al.

[11] Patent Number: 5,646,868
[45] Date of Patent: Jul. 8, 1997

[54] PHYSICAL QUANTITY ANALYZING METHOD AND APPARATUS THEREOF

[75] Inventors: Tomoaki Ueda; Masayuki Sagane, both of Kusatsu, Japan

[73] Assignee: Daikin Industries, Ltd., Osaka, Japan

[21] Appl. No.: 381,823

[22] PCT Filed: Jun. 3, 1994

[86] PCT No.: PCT/JP94/00901

§ 371 Date: May 4, 1995

§ 102(e) Date: May 4, 1995

[87] PCT Pub. No.: WO94/29806

PCT Pub. Date: Dec. 22, 1994

[30] Foreign Application Priority Data

Jun. 3, 1993 [JP] Japan .................................... 5-133707
Dec. 6, 1993 [JP] Japan .................................... 5-305571

[51] Int. Cl.$^6$ .................................................. G01N 27/00
[52] U.S. Cl. .......................... 364/570; 364/554; 379/382
[58] Field of Search .............................. 364/570, 554, 364/576; 379/392, 402–410; 326/248; 237/6

[56] References Cited

FOREIGN PATENT DOCUMENTS 5-94543  4/1993  Japan  ............................ G01R 33/02
5-157735 6/1993  Japan  ............................ G01N 29/22

OTHER PUBLICATIONS

Fujio Kobayashi, Shoichiro Yamaguchi "Successive Approximation of Hypercomplex Simultaneous equations using Measurements" IEE Journal thesis, No. 92–vol. A, 9th edit. pp. 431–439 1972.

Kenro Murata, Chikara Oguni "Super Computer Application to Scientific technological calculations"Maruzen pp. 136–153 Mar. 15, 1985.

Fujio Kobayashi, Shoichiro Yamaguchi "Solution of Simultaneous linear equations in bad conditions with restrictions", Information Processing, vol. 16, 9th edit. pp. 789–794 1975.

*Primary Examiner*—Emanuel T. Voeltz
*Assistant Examiner*—Kamini S. Shah
*Attorney, Agent, or Firm*—Beveridge, DeGrandi, Weilacher & Young, L.L.P.

[57] ABSTRACT

A physical quantity analyzing method obtains estimated physical quantities $O_j$ at a predetermined point j based upon proportion constants $\alpha_{ij}$ and provisionally determines physical quantities $u_i$. The method obtains a sum of squares of differences between the estimated physical quantities $O_j$ and known physical quantities $S_j$ at a predetermined point j given in a region as an error function E. The method corrects the provisionally determined physical quantities to an axis value of the error function E which is a parabola, so that an analysis of physical quantities within a system which is a linear system is improved in speed and accuracy. The number of species of physical quantities, which can be subjected to the present physical quantity analyzing method, is large.

34 Claims, 27 Drawing Sheets

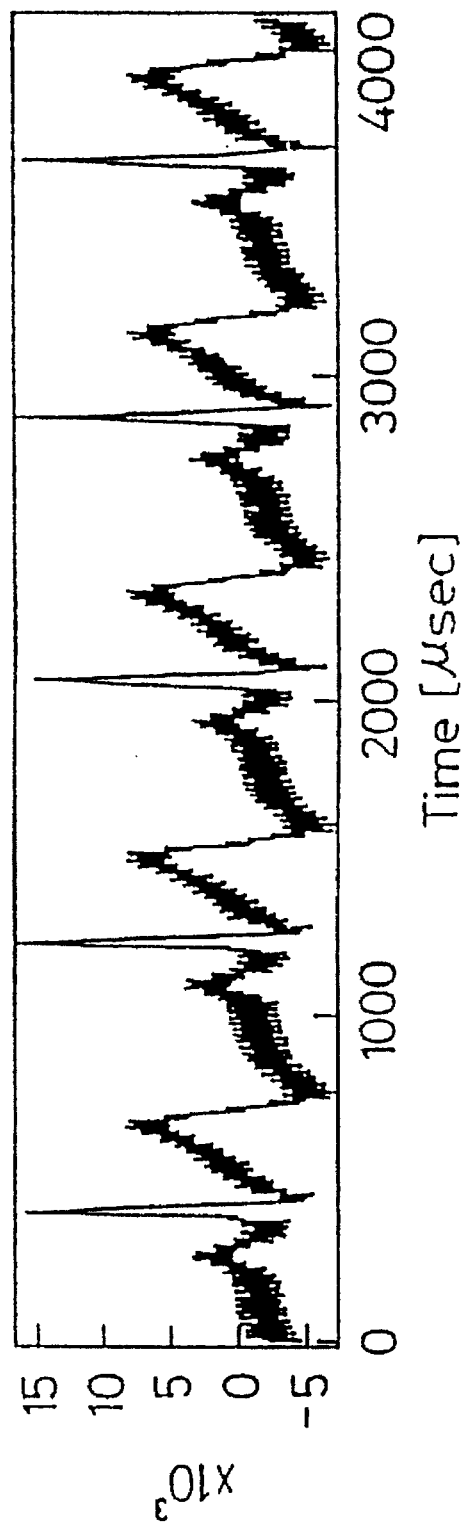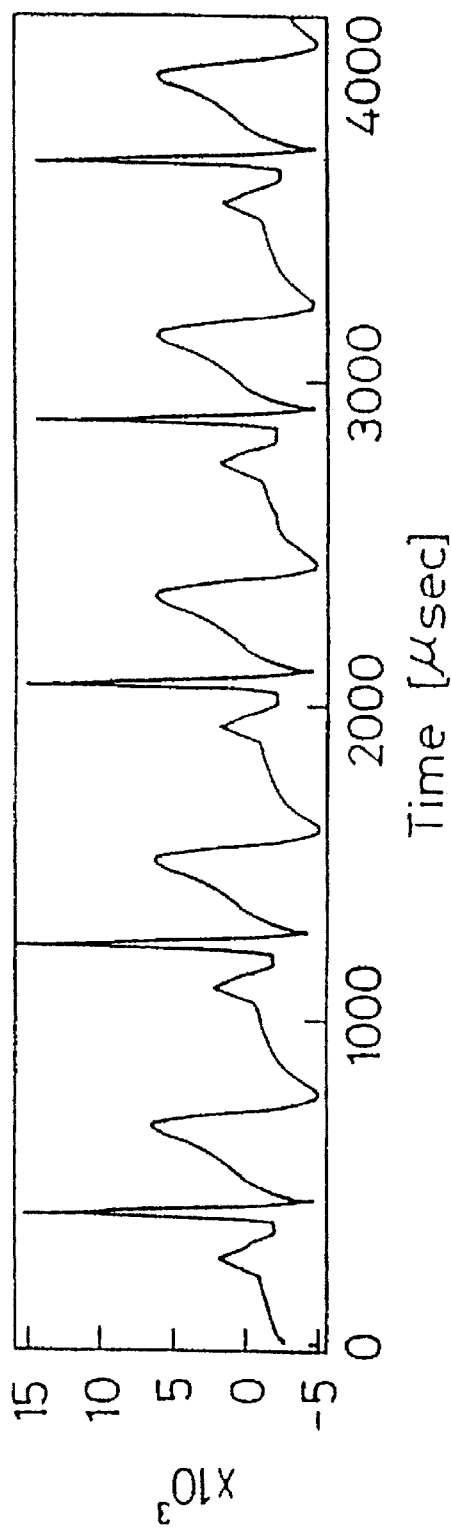

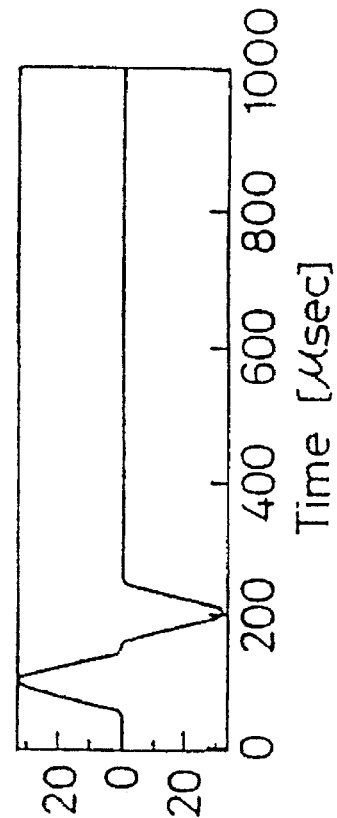
FIG. 13(B)
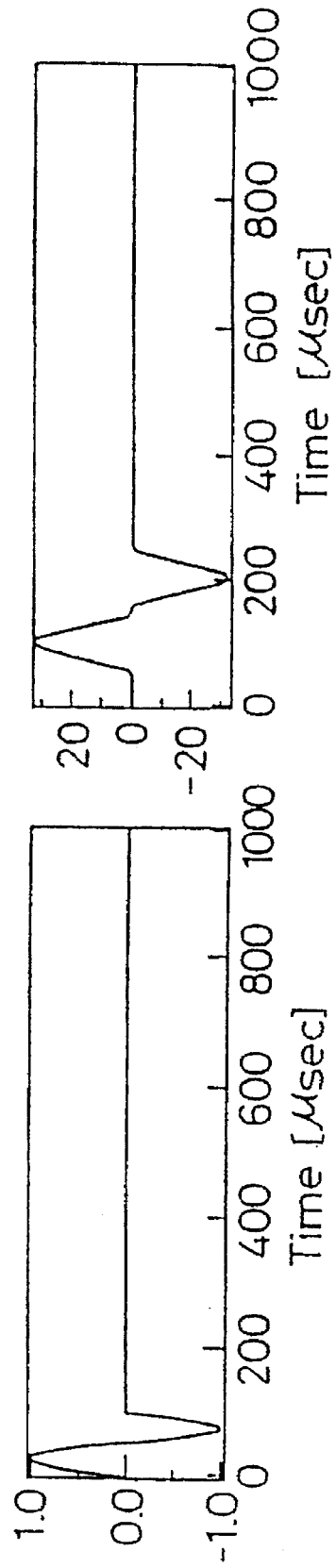
FIG. 13(A)
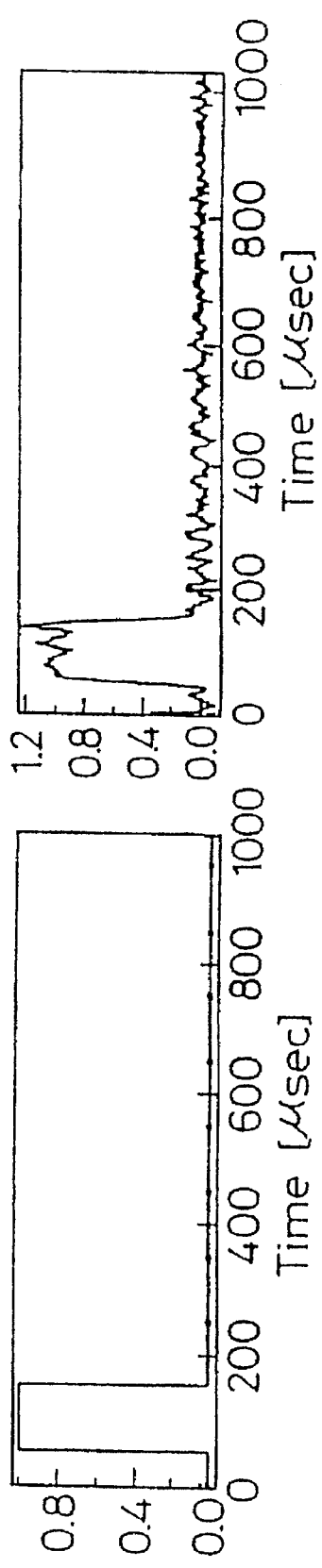
FIG. 13(D)
FIG. 13(C)

PHYSICAL QUANTITY ANALYZING METHOD AND APPARATUS THEREOF

TECHNICAL FIELD

The present invention relates to physical quantity (measurable or calculated physical characteristic, quantity, aspect, atribute, property, trait or the like) analyzing methods and apparatus therefore, more particularly, relates to novel methods and apparatus for analyzing unknown physical quantities $u_i$ (i=1, 2, ..., m) in a physical system which has a relationship of $$O_j = \sum_{i=1}^{m} \alpha_{ij} \cdot u_i \qquad (1)$$

(wherein, i=1, 2, ..., m; j=1, 2, ..., n; $\alpha_{ij}$ is a proportional constant) between physical quantities $u_i$ of individual physical sources and physical quantities $O_j$ which occur at arbitrary points caused by the individual physical sources.

BACKGROUND ART

In the past, methods for analyzing magnetic field sources using a super computer were based upon output from plural flux meters and Monte Carlo analysis; methods applied to adaptive noise cancelers; methods which incorporate an impulse response estimating apparatus; and methods which determine threshold values, coupling coefficients, and the like, of neuron devices which constitute a neural network based upon physical formulae of a system so as to omit learning time required for these neuron devices (refer to Japanese Patent Laid Open Tokukaihei 5-94543), are proposed as physical quantity analyzing methods. Further, a finite element method is also proposed as physical quantity analyzing method.

The method for analyzing magnetic field sources typically involves the following processing:

a) Scatter m-number current elements using random numbers within a search space which is searched by plural flux meters;

b) calculate a total estimated error (a sum of all estimated errors) by an estimated error calculating process;

c) Repeat the following processing d) to g);

d) Select a current element k arbitrarily, and evacuating parameters of corresponding current element and the total estimated error;

e) Vary parameters of the current element k by extremely small quantities using random numbers;

f) Calculate a total estimated error by the estimated error calculating process;

g) Compare the evacuated total estimated error and the total estimated error calculated in f), and restore the information which are evacuated at d) when the evacuated total estimated error is smaller than the total estimated error calculated in f).

An adaptive noise canceler incorporating the method is illustrated in FIG. 27 and operates as follows. An input $S_j$ which is made by mixing a noise from a noise source 72 to information from a signal source 71 is supplied to a non-inversed input terminal of an error computing element 73. Only the noise from the noise source 72 is supplied to an inversed input terminal of the error computing element 73 through an FIR filter 74. An output from the error computing element 73 is feedbacked to the FIR filter 74. The FIR filter 74 employs a LMS (Least Mean Square) algorithm.

The adaptive noise canceler can remove only noise in information by determining an estimation gain to be a proper value. Therefore, noise of a duct of an air conditioner can be eliminated, and the passenger area of an automobile can be made to be quiet and so on. That is, noise which should be removed are accurately estimated.

An impulse response estimating apparatus incorporating the method performs analysis of frequency components using a fast Fourier transform (hereinafter referred to as FFT) and estimates an impulse response based upon the analysis result.

A method for solving threshold values, coupling coefficients, and the like, for neural systems has already been filed in a patent application by the applicant of this patent application, and is illustrated in FIG. 28. An input pattern is supplied to plural physical formula operating units 811, 812, ..., 81m so as to operate based upon a known physical formula. Outputs from all physical formula operating units 811, 812, ..., 81m are supplied to a sigma unit 82 so as to obtain a sum. The sum and an actual measurement value are supplied to an error operating device 83 so as to obtain an error (a difference between the estimated and actual values). The obtained error is fed back to correction sections 811a, 812a, ..., 81ma of the physical formula operating units 811, 812, ..., 81m. Values of variables which are estimated in the physical formula operating units 811, 812, ..., 81m are collected and outputted as analysis results by an information collection unit 84.

Therefore, no physical formula operating units are required learning of a physical formula. The analysis result with high accuracy is obtained by repeating the correction based upon the error and estimation gains for only the variables which are included in the physical formula.

The method for finite element analysis which is widely utilized in variable field such as structure analysis in architecture and machinery, weather calculation, calculating astronomy, electromagnetic analysis and the like. The method constructs a model by dividing an object for analysis into finite number of elements. The method then solves simultaneous linear equations which are given based upon the model so as to obtain a physical source analysis result. Various methods such as Gauss' erasing method, SOR method, CD method, SD method and the like are known as methods for solving simultaneous linear equations.

Method for analyzing magnetic field sources varies parameters of the current element k by extremely small quantities so as to minimize total estimated error, until a correct analysis result is finally obtained. But, it is not guaranteed that the total estimated error will become smaller when the processing is carried out once. Disadvantages arise in that a remarkably long time period is required even when a super computer is employed and that a final solution cannot be obtained even when the number of times of the processings is increased, because only part of the processing can typically be processed in parallel and the other parts of the processing (e.g., the processing for operating a magnetic field which is made up by m-numbered current elements, and the processing for obtaining a total estimated error) can not be processed in parallel.

The adaptive noise canceler requires determination of an estimation gain because the adaptive noise canceler employs a LMS algorithm. A disadvantage arises in that it is difficult to determine a proper estimation gain. More particularly, a number of propagation paths of the noise is extremely great. The noise from the noise source 72 could be delayed by an extremely short time and proper estimation gains should be determined for all delayed noises for accurately estimating actual noise which reaches a position selected for noise cancelling through all propagation paths. As a result, the number of estimation gains which should be determined becomes extremely large, and all the estimation gains should be properly determined. If all estimation gains are determined to be the same value, all the estimation gains are inevitably determined to be a small value so that no estimation processing diverges. Convergence of solutions becomes slow following the estimation gains becoming small.

The impulse estimating response method suffers the following disadvantages because the method employs FFT. Though FFTs is a method for performing processing based upon a sampling theorem, it is necessary that a low pass filter, called an antialiasing filter, be provided for omitting unwanted higher harmonics which are usually included in a measurement signal, which results in a complicated arrangement. Accuracy of frequency analysis result is extremely low when data in a sampling interval is not periodic. To solve these disadvantages, it is proposed that a window function such as hamming, hunning, or the like, be utilized. When the window function is used in a reverse filtering operation, a new disadvantage arises in that a waveform is deformed in the sampling interval after the operation so that analysis accuracy is lowered. Further, another disadvantage arises in that a number of samples should be increased when analysis for a wide band is necessary, because only outputs at frequency intervals determined based upon sampling intervals are obtained. A further disadvantage arises in that an extremely large quantity of memory is necessary because sampling should be performed by constant intervals even when a frequency axis has a logarithmic scale and a number of samples is limited to $2^N$.

The method in neural systems performs correction processing using a value which is obtained by multiplying an estimation gain to a sum of products of partial differential values of physical formula operation results and errors, consequently estimation gains are necessary. A number of estimation gains which should be determined is increased when a proper number of estimation gains is determined, resulting in the determination of estimation gains becoming extremely complicated. If, all estimation gains are determined to be the same value for simplicity, then all estimation gains are inevitably determined to be a small value so that estimation processing does not diverge. Convergence of solutions becomes slow following the estimation gains becoming small.

The method applied to finite element analysis can improve analysis accuracy of physical quantities by increasing a mesh division number.

However, when Gauss' erasing method is employed for solving simultaneous linear equations, and it is assumed that a number of unknowns is n, operation frequency on an order of $n^3/3$ is necessary so that operation load becomes unwieldy. Therefore, when a number of unknowns is great, physical source analyzing with succient speed cannot be practically performed even when a super computer is employed. When Choleski's method is employed, operation frequency can be made on an order of $n^3/6$, but operation load is too great for a method for solving simultaneous linear equations having a large size. In both methods, errors are cumulative so that physical source analyzing accuracy cannot be significantly improved.

The SOR method is a method for performing excessive correction by introducing acceleration parameters so as to accelerate convergence of Gauss-Seidel's method. Therefore, convergence of solutions is guaranteed for a coefficient matrix which satisfies a predetermined condition, but convergence of solutions is not guaranteed for a coefficient matrix which does not satisfy the predetermined condition. There is not a method for securely and easily obtaining proper values of the acceleration parameters even when the coefficient matrix is guaranteed convergence of solution. When determined acceleration parameters are not proper, the convergence of solution is insufficiently accelerated.

The SD method is a method which is also called a maximum grade direction decreasing method. This method does not have the limit in a coefficient matrix of the SOR method. The SD method involves an extreme increase in repetition, it also requires a calculation of a maximum grade direction, a calculation of gain for correcting unknowns is carried out for each repetition cycle. In addition these calculations include vector operations and subtractions. Therefore operation load, as a whole, is extreme.

The CG method is also called a conjugate gradient method. This method determines a direction as a correction direction which is vertical to all directions in which direction corrections have already been made, and corrects unknowns sequentially. Therefore, repetition is dramatically decreased in theory (the repetition number of times can be made to be less than n). In theory, physical source analysis accuracy also is increased. However, in actual use, errors are typically generated in correction processing, therefore, the repetition number greatly varies depending upon matrix coefficients. Further, vector operations and subtractions are necessary for performing each repetition. Therefore operation load increases.

DISCLOSURE OF THE INVENTION

The present invention was made to solve the above problems.

It is an object of the present invention to supply physical quantity analyzing methods and an apparatus therefore which requires no determination of estimation gains, excludes a limit for a number of samples, and performs analysis of physical quantity with high accuracy and at high speed.

To perform the above objects, a physical quantity analyzing method according to the present invention is a method for analyzing a physical quantity $u_i$ having an unknown physical source in a physical system which has a relationship involving equation $$O_j = \sum_{i=1}^{m} \alpha_{ij} \cdot u_i \qquad (1)$$

between physical quantities of individual physical sources and physical quantities $O_j$ at an arbitrary position generated by the individual physical sources, the method comprises the steps of, provisionally determining a physical quantity $u_i$ of each physical source, calculating a physical quantity $O_j$ by carrying out an operation of equation (1) based upon the provisionally determined physical quantity $u_i$, determining and employing a value which minimizes a sum of squares of differences as a physical quantity of a physical source based upon a difference and corresponding proportional constants, the difference being a difference between the calculated physical quantity $O_j$ and corresponding known physical quantity $S_j$, repeating the calculation of the difference and the employing of the physical quantities $u_i$ for each of the physical sources, continuing to repeat the calculations of the differences and the determination of the physical quantities $u_i$ for each physical source until the sum of the squares of the differences which is obtained by the repetition of the processing becomes smaller than a predetermined threshold value, and employing the physical quantities $u_i$ of each of the physical sources which are finally obtained.

A physical quantity analyzing method according to a next aspect is a method for analyzing a physical quantity $u_i$ of each physical source based upon physical quantities measured at predetermined plural positions spaced apart from the physical sources, in the case where the physical quantities measurable at arbitrary positions spaced apart from the individual physical source can be calculated based upon predetermined operation formulae which include physical quantities of physical sources, and the physical quantities are in a linear system, the method comprises the steps of, predetermining constants each of which represents a physical characteristic provided at each predetermined position by a physical source having a unit quantity corresponding to the individual physical source, calculating a difference between a measured physical quantity at each predetermined position and a sum of products of each physical quantity and corresponding constant, determining and employing a value which minimize a sum of squares of differences as a new physical quantity based upon the calculated differences and each constant, repeating the calculation of the differences and the employing of the physical quantities $u_i$ for each physical source, continuing to repeat the calculation of the difference and the employing of the physical quantities $u_i$ for each physical source until the sum of the squares of the differences which is obtained by the repetition of the process becomes smaller than a predetermined threshold value, and employing the physical quantities $u_i$ of each physical source which are finally obtained.

A physical quantity analyzing method according to a further aspect is a method for analyzing a physical quantity $u_i$ of a physical source i based upon a physical quantity $S_j$ measured at plural measurement points j spaced apart from the physical source i, in the case where a physical quantity, which is measurable at plural measurement points j, which positions are known and are spaced apart from individual physical sources i whose positions are known, can be calculated based upon predetermined operations including the physical quantity $u_i$ of the physical source i. The physical quantity $S_j$ measurable at the plural measurement points j spaced apart from the physical source i is in a linear system. The method comprises the steps of, (1) predetermining constants $\alpha_{ij}$ each of which represents a measurable physical characteristic provided at each predetermined position by a physical source having a unit quantity corresponding to the individual physical source, (2) provisionally determining a physical quantity $u_i$ for each physical source, (3) calculating a physical quantity $O_j$ which is expected to be provided at the measurement point j by carrying out the operation of the equation:

$$O_j = \sum_{i=1}^{m} \alpha_{ij} \cdot u_i \quad (1)$$

(4) calculating a difference $S_j - O_j$ between an actual measurement value $S_j$ at the measurement point j and the physical quantity $O_j$, (5) obtaining a physical quantity $u_i$ as a provisional solution by carrying out the equation:

$$u_i = u_i + \sum_{j=1}^{n} \{\alpha_{ij}(S_j - O_j)\} / \sum_{j=1}^{n} \alpha_{ij}^2 \quad (2)$$

(6) carrying out the steps (3) to (5) for each physical source, (7) continuing to repeat the process of steps (3) to (5) until a sum of the squares of the differences $S_j - O_j$ is less than a predetermined threshold value, and employing the physical quantity of each physical source which is finally obtained as a result.

A physical quantity analyzing method according to still another aspect is a method for analyzing physical quantities and/or measurable aspects of magnetic sources within an object body by measuring magnetic field which is generated by the object body with plural magnetic field sensors, the method comprises the steps of, (1) predetermining constants $\alpha_{ij}$ each of which represents a magnetic field generated at each predetermined position by a magnetic field source having a unit quantity corresponding to an individual magnetic field source, (2) provisionally determining a physical quantity $u_i$ for each magnetic field source whose position corresponds to a lattice point k (k=1, 2, ..., p) within the object body, (3) calculating a magnetic field $O_j$ which is expected to be generated at a measurement point j by carrying out the operation of the equation:

$$O_j = \Sigma \alpha_{ij} \cdot u_i \quad (1)$$

(4) calculating a difference $S_j - O_j$ between an actual measurement value $S_j$ of a magnetic field at the measurement point j and the magnetic field $O_j$, (5) obtaining a physical quantity $u_i$ as a provisional solution by carrying out operation of the equation:

$$u_i = u_i + \sum_{j=1}^{n} \{\alpha_{ij}(S_j - O_j)\} / \sum_{j=1}^{n} \alpha_{ij}^2 \quad (2)$$

(6) performing steps (3) to (5) for all magnetic field sources, (7) continuing to repeat the process of steps (3) to (5) until the sum of the squares of the differences $S_j - O_j$ is less than a predetermined threshold value.

A physical quantity analyzing method according to still another method in which the physical quantity $u_i$ in the equation $O_j = \Sigma \alpha_{ij} \cdot u_i$ is a current component oriented in an x-direction and a current component in y-direction, wherein $u_i$ is represented by the formula:

$$u_i = \begin{cases} P_{xi} \ (i = 1, 2, \ldots, p) \\ P_{yi} \ (i = p+1, p+2, \ldots, 2p) \end{cases} \quad (3)$$

wherein a constant $\alpha_{ij}$ is given by the formula:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ \quad (i = p+1, p+2, \ldots, 2p) \end{cases} \quad (4)$$

wherein, $K_j$ is a sensitivity correction coefficient at a measurement point j.

A physical quantity analyzing method according to another method for analyzing a physical quantity of each physical source which may be observed at a predetermined position corresponding to the measurable physical quantities of the physical sources. In the case where physical quantities are measurable at arbitrary positions spaced apart from the individual physical source. And, such physical quantities can be calculated based upon predetermined operation formulae which include physical quantities of the physical sources. Further, such physical quantities measurable at the arbitrary positions spaced apart from at least one physical source are in a linear system. The method comprises the steps of, measuring a physical quantity $u_i$ at a predetermined position which is proximal to at least one physical source, provisionally determining degrees each of which represents an influence at the predetermined position by the physical source, calculating a difference between a measured physical quantity $u_i$ at each predetermined position and a sum of products of each measured physical quantity and corresponding degree, determining and employing a value which minimizes a sum of squares of differences for each new physical quantity based upon the calculated differences and each physical quantity measurement value, repeating the calculation of difference and the determination and employment of physical quantities $u_i$ for each physical source, and continuing to repeat the calculation of the difference and the employing of the physical quantities $u_i$ for each physical source until a sum of the squares of the differences which is obtained by the repetition of the processings becomes smaller than a predetermined threshold value, and thereafter employing the physical quantities of each physical source which are finally obtained at the predetermined positions.

A physical quantity analyzing method according to another aspect is a method for analyzing a physically measurable aspect of a passive physical object which may be influenced by a physical quantity which may be observable at a predetermined position due to influence by physical quantities of active physical sources. In a case where physical quantities are measurable at arbitrary positions spaced apart from the active physical sources, physical quantities can be calculated based upon predetermined formulae which formulae include physical aspects of physical sources, and physical quantities measurable at the arbitrary positions spaced apart from active physical sources are in a linear system. The method comprises the steps of, measuring a physical aspect of an active physical source, provisionally determining a physical aspect of a passive physical source, calculating a difference between a measured physical quantity at a predetermined position and a sum of products of each measured physical quantity of the active physical source and the physical quantity of the passive physical source, determining and employing a value which minimizes a sum of squares of differences for each new physical quantity based upon the calculated differences and based upon each physical quantity measurement value of each active physical source, repeating the calculation of the difference and the determination and employment of the physical quantities for each physical source, continuing to repeat the calculation of the difference and the determination and employment of the physical quantities for each physical source until the sum of the squares of the differences which is obtained by the repetition of the processings becomes smaller than a predetermined threshold value, and employing the physical quantities of each physical source which are finally obtained as physical quantities of the passive physical source.

A physical quantity analyzing method according to another aspect is a method for analyzing a physical quantity which is obtained at an arbitrary point within a region in which simultaneous linear equations including individual physical sources realized based upon physical quantities of the individual physical sources and proportion canstants determined based upon the region, wherein the method comprises the steps of, obtaining proportion constants which are determined for a particular region, provisionally determining physical quantities at plural predetermined positions, calculating a difference between a known physical quantity which is given within the region at each predetermined position and a sum of products of each physical quantity and corresponding proportion constant, determining and employing a value which minimizes a sum of squares of differences for each new physical quantity based upon the calculated differences and each physical quantity measurement value of each active physical source, repeating the calculation of the difference and the determination and employment of the physical quantities for each physical source, continuing to repeat the calculating of the differences and the determination and employment of the physical quantities for each physical source until a sum of the squares of the differences which is obtained by the repetition of the processing becomes smaller than a predetermined threshold value, and employing the physical quantity which is finally obtained as physical quantity for the predetermined position.

A physical quantity analyzing method may also include a method for obtaining a new physical quantity based upon differences, corresponding proportion constant, a value and a physical quantity. The differences are differences between actual physical quantities and products of each physical quantities. The value is a value which is obtained by dividing a sum of the products of each physical quantity and the corresponding proportion constant by a sum of squares of all of corresponding proportion constants. The physical quantity is a physical quantity which has just been employed.

A physical quantity analyzing method according to a tenth method employs inverses of resistance values of a plurality of resistors which are interconnected in a three dimensional lattice which is provided to approximate a region. The method employs proportion constants which are the inverses, and employs current values at the lattice points as the actual physical quantities, and employs potentials at the lattice points, as physical quantities which are objects for analysis.

A physical quantity analyzing method according to an eleventh method wherein the proportion constants are inverses $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistors which are connected in x, y, z-positions to each lattice point $[k_x, k_y, k_z]$ of $N_x \times N_y \times N_z$ lattice points, and a sum $G_N[k_x, k_y, k_z]$ corresponding to actually connected resistances to the lattice point $[k_x, k_y, k_z]$ which sum $G_N$ is represented by the equation:

$$G_N[k_x, k_y, k_z] = G_x[k_x-1, k_y, k_z] + G_x[k_x, k_y, k_z] + G_y[k_x, k_y-1, k_z] + G_y[k_x, k_y, k_z] + G_z[k_x, k_y, k_z-1] + G_z[k_x, k_y, k_z] \quad (5)$$

the actual physical quantities are supplied current $S[k_x, k_y, k_z]$ and current flowing out $O[k_x, k_y, k_z]$ at the lattice point $[k_x, k_y, k_z]$, and the physical quantities which are objects for analysis are potentials $u[k_x, k_y, k_z]$ at each lattice point $[k_x, k_y, k_z]$. The method comprises the steps of, (1) obtaining $(N_x-1) \times N_y \times N_z$ number of $G_x[k_x, k_y, k_z]$, (2) obtaining $N_x \times (N_y-1) \times N_z$ number of $G_y[k_x, k_y, k_z]$, (3) obtaining $N_x \times N_y \times (N_z-1)$ number of $G_z[k_x, k_y, k_z]$, (4) obtaining $N_x \times N_y \times N_z$ number of $G_N[k_x, k_y, k_z]$, (5) obtaining $N_x \times N_y \times N_z$ number of $\beta[k_x, k_y, k_z]$ based upon the equation:

$$\beta[k_x, k_y, k_z] = 1/ (G_N[k_x, k_y, k_z]^2 + G_x[k_x-1, k_y, k_z]^2 + G_x[k_x, k_y, k_z]^2 + G_y[k_x, k_y-1, k_z]^2 + G_y[k_x, k_y, k_z]^2 + G_z[k_x, k_y, k_z-1]^2) \quad (6)$$

(6) calculating correction values $\Delta u$ of the potentials $u[k_x, k_y, k_z]$ based upon $$\Delta u \leftarrow \beta[k_x, k_y, k_z]\{G_N[k_x, k_y, k_z] (S[k_x, k_y, k_z] - O[k_x, k_y, k_z]) - G_x[k_x-1, k_y, k_z] (S[k_x-1, k_y, k_z] - O[k_x-1, k_y, k_z]) - G_x[k_x, k_y, k_z] (S[k_x+1, k_y, k_z] - O[k_x+1, k_y, k_z]) - G_y[k_x, k_y-1, k_z] (S[k_x, k_y-1, k_z] - O[k_x, k_y-1, k_z]) - G_y[k_x, k_y, k_z] (S[k_x, k_y+1, k_z] - O[k_x, k_y+1, k_z]) - G_z[k_x, k_y, k_z-1] (S[k_x, k_y, k_z-1] - O[k_x, k_y, k_z-1]) - G_z[k_x, k_y, k_z] (S[k_x, k_y, k_z+1] - O[k_x, k_y, k_z+1])\}, \quad (7)$$

(7) correcting the potential $u[k_x, k_y, k_z]$ by adding the calculated correction value $\Delta u$, (8) repeating the process of steps (6) and (7) for 1 to $N_z$ for $k_z$, (9) repeating the process of steps (6) to (8) for 1 to $N_y$ for $k_y$,

(10) repeating the process of steps (6) to (9) for 1 to $N_x$ for $k_x$, and

(11) repeating the process of steps (6) to (10) until an estimated error becomes smaller than a predetermined threshold value, and employing the potentials which are finally obtained as the analysis result.

A physical quantity analyzing method according to another embodiment wherein the potentials $u[k_x, k_y, k_z]$ for each lattice point $[k_x, k_y, k_z]$ which is the analysis result obtained by the method according to the previous embodiment is employed as a proportion constant $\alpha_{ij}$, the known physical quantities of which are potentials measured at a surface of a region being analyzed, and the physical quantities for analysis are supplied current $S[k_x, k_y, k_z]$ and current flowing out $O[k_x, k_y, k_z]$ at each lattice point $[k_x, k_y, k_z]$. The method comprises the steps of, (1) provisionally determining a current which flows into one lattice point and flows out of another lattice point as a physical source for analysis, (2) calculating an estimated value of a potential on a surface of the region selected for analysis by multiplying the provisionally determined physical quantity and a proportion constant, (3) calculating a correction value for a physical quantity based upon a difference between the measured potential and the estimated value of the potential, (4) correcting the physical quantity based upon the calculated correction value, (5) repeating the process of steps (2) to (4) for all physical quantities, and (6) repeating the process of steps (2) to (5) until an estimated error becomes smaller than a predetermined threshold value, and employing the physical quantities which are finally obtained.

A physical quantity analyzing method according to another embodiment comprises the steps of, (1) selecting a first and a second physical quantities from among a plurality of physical quantities, (2) calculating a correction value for each selected physical quantity based upon the formula;

$$\Delta u_i \leftarrow \sum_{j=1}^{n} \{\alpha_{ij}(S_j - O_j)\} / \sum_{j=1}^{n} \alpha_{ij}^2, \quad (8)$$

(3) correcting corresponding physical quantities based upon the calculation for each correction value, (4) correcting the first physical quantity by carrying out the process of steps (2) and (3), (5) correcting the second physical quantity by carrying out the process of steps (2) and (3), (6) correcting the first physical quantity again by carrying out the process of steps (2) and (3), (7) calculating a correction value for correcting the second physical quantity again, by carrying out the process of step (2), (8) calculating a correction value for the first physical quantity by dividing a product of the correction values which are obtained in steps (6) and (7) by a difference between the correction value obtained in the step (4) and the correction value obtained in the step (6), (9) calculating a correction value for the second physical quantity by dividing a product of the correction values which are obtained in steps (5) and (7) by a difference between the correction value obtained in step (4) and the correction value obtained in step (5),

(10) correcting the first physical quantity based upon the correction values obtained in step (6), and correcting the second physical quantity based upon the correction values obtained in step (9),

(11) selecting two additional physical quantities and carrying out the process of steps (4) to (10), and

(12) repeating the process of steps (4) through (11) until an estimated error becomes smaller than a predetermined threshold value, and employing the physical quantities which are finally obtained.

A physical quantity analyzing method according to another aspect further comprises the steps of, calculating estimated errors:

$$D[k_x, k_y, k_z] = (S[k_x, k_y, k_z] - O[k_x, k_y, k_z]),$$

$$D[k_x-1, k_y, k_z] = (S[k_x-1, k_y, k_z] - O[k_x-1, k_y, k_z]),$$

$$D[k_x+1, k_y, k_z] = (S[k_x+1, k_y, k_z] - O[k_x+1, k_y, k_z]),$$

$$D[k_x, k_y-1, k_z] = (S[k_x, k_y-1, k_z] - O[k_x, k_y-1, k_z]),$$

$D[k_x, k_y+1, k_z]=(S[k_x, k_y+1, k_z]-O[k_x, k_y+1, k_z])$, $D[k_x, k_y, k_z-1]=(S[k_x, k_y, k_z-1]-O[k_x, k_y, k_z-1])$, $D[k_x, k_y, k_z+1]=(S[k_x, k_y, k_z+1]-O[k_x, k_y, k_z+1])$, and correcting the estimated errors based upon formulae:

$D[k_x, k_y, k_z] \leftarrow (D[k_x, k_y, k_z]+G_N[k_x, k_y, k_z])\Delta u$ $D[k_x-1, k_y, k_z] \leftarrow (D[k_x-1, k_y, k_z]+G_x[k_x-1, k_y, k_z])\Delta u$ $D[k_x+1, k_y, k_z] \leftarrow (D[k_x+1, k_y, k_z]+G_x[k_x, k_y, k_z])\Delta u$ $D[k_x, k_y-1, k_z] \leftarrow (D[k_x, k_y-1, k_z]+G_y[k_x, k_y-1, k_z])\Delta u$ $D[k_x, k_y+1, k_z] \leftarrow (D[k_x, k_y+1, k_z]+G_y[k_x, k_y, k_z])\Delta u$ $D[k_x, k_y, k_z-1] \leftarrow (D[k_x, k_y, k_z-1]+G_z[k_x, k_y, k_z-1])\Delta u$ $D[k_x, k_y, k_z-1] \leftarrow (D[k_x, k_y, k_z+1]+G_z[k_x, k_y, k_z])\Delta u$ \qquad (9), wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are employed instead of $(S[k_x, k_y, k_z]-O[k_x, k_y, k_z])$, $(S[k_x-1, k_y, k_z]-O[k_x-1, k_y, k_z])$, $(S[k_x+1, k_y, k_z]-O[k_x+1, k_y, k_z])$, $(S[k_x, k_y-1, k_z]-O[k_x, k_y-1, k_z])$, $(S[k_x, k_y+1, k_z]-O[k_x, k_y+1, k_z])$, $(S[k_x, k_y, k_z-1]-O[k_x, k_y, k_z-1])$, $(S[k_x, k_y, k_z+1]-O[k_x, k_y, k_z+1])$ in the formula:

$\Delta u \leftarrow \beta[k_x, k_y, k_z]\{G_N[k_x, k_y, k_z] (S[k_x, k_y, k_z] -$ \qquad (7)
$O[k_x, k_y, k_z]) - G_x[k_x-1, k_y, k_z] (S[k_x-1, k_y, k_z] - O[k_x-1, k_y, k_z]) -$
$G_x[k_x, k_y, k_z] (S[k_x + 1, k_y, k_z] O[k_x + 1, k_y, k_z]) - G_y[k_x, k_y - 1, k_z]$
$(S[k_x, k_y - 1, k_z] - O[k_x, k_y - 1, k_z]) - G_y[k_x, k_y, k_z] (S[k_x, k_y + 1, k_z] -$
$O[k_x, k_y + 1, k_z]) - G_z[k_x, k_y, k_z - 1] (S[k_x, k_y, k_z - 1] -$
$O[k_x, k_y, k_z - 1]) - G_z[k_x, k_y, k_z] (S[k_x, k_y, k_z + 1] - O[k_x, k_y, k_z + 1])\}$ A physical quantity analyzing method according to still another technique employs a normalized function representing a sum of squares of calculated differences instead of the calculated difference itself.

A physical quantity analyzing method according to another aspect employs a process for employing a value which minimizes a sum of squares of the difference as a new physical quantity instead of the process for employing a value which minimizes the sum of the squares of the difference as a new physical quantity.

A physical quantity analyzing method according to a next technique employs a processing for continuing the repetition of the calculating of the difference and the employment of the physical quantities $u_i$ for each physical source until a sum of the absolute values of the differences which is obtained by the repetition of the process becomes smaller than a predetermined threshold value, instead of the sum of the squares of the differences.

A physical quantity analyzing apparatus according to the present invention involves an apparatus for analyzing a physical quantity $u_i$ having an unknown physical source in a physical system which has a relationship of the equation:

$$O_j = \sum_{i=1}^{m} \alpha_{ij} \cdot u_i \qquad (1)$$

corresponding to physical aspects of individual physical sources and physical aspects $O_j$ taken at an arbitrary position and generated by the individual physical sources, wherein the apparatus comprises physical quantity provisional determining means for provisionally determining a physical quantity $u_i$ of each physical source, physical quantity calculating means for calculating a physical quantity $O_j$ by carrying out an operation of equation (1) based upon each physical quantity $u_i$ determined, and employing a value which minimizes a sum of squares of differences based upon the differences and corresponding proportional constants, which difference is a difference between the calculated physical quantity $O_j$ and a corresponding known physical quantity $S_j$, first repetition controlling means for repeating the calculation of the difference and the employing of the physical quantities $u_i$ for each physical source, second repetition controlling means for continuing the repetition of the calculation of the difference by the first repetition controlling means and the employing of the physical quantities $u_i$ for each physical source until the sum of the squares of the differences which is obtained by the repetition of the processing becomes smaller than a predetermined threshold value, and physical quantity employment means for employing the physical quantities $u_i$ of each physical source which are finally obtained as physical quantities $u_i$ of each physical source.

A physical quantity analyzing apparatus according to a next embodiment is an apparatus for analyzing a physical quantity of each physical source based upon physical quantities measured at predetermined plural positions spaced apart from the physical sources, in the case where physical quantities are measurable at arbitrary positions spaced apart from the individual physical source and the physical quantities can be calculated based upon predetermined operation formulae which include physical quantities of physical sources, and physical quantities measurable at the arbitrary positions spaced apart from plural physical sources are in a linear system, wherein the apparatus comprises, constant determining means for predetermining constants each of which represents a physical field generated at each predetermined position by a physical source having a unit quantity corresponding to the individual physical source, difference calculating means for calculating a difference between a measured physical quantity at each predetermined position and a sum of products of each physical quantity and corresponding constant, physical quantity correcting means for employing a value which minimizes a sum of squares of differences for each new physical quantity based upon the calculated differences and each constant, first repetition controlling means for repetitively operating the difference calculating means and the physical quantity correcting means for each physical source, and physical quantity employment means for repetitively operating the repetitive operations of the difference calculating means and the physical quantity correcting means for each physical source by the first repetition controlling means, and for employing the physical quantities of each physical source which are finally obtained as physical quantities of each physical source.

A physical quantity analyzing apparatus according to another embodiment is an apparatus for analyzing a physical quantity $u_i$ of a physical source i based upon a physical quantity $S_j$ measured at plural measurement points j spaced apart from the physical source i, in a case where a physical quantity, which is measurable at plural measurement points j of which positions are known and is spaced apart from individual physical source i of which position is known, can be calculated based upon predetermined operations including a physical quantity $u_i$ of the physical source i and that the physical quantity $S_j$ measurable at the plural measurement pointe j spaced apart from the physical source i are in a linear system, wherein the apparatus comprises, (1) means for predetermining constants $\alpha_{ij}$ each of which represents a physical field generated at each predetermined position by a physical source, $\alpha_{ij}$ having a unit quantity corresponding to the individual physical source, (2) means for provisionally determining the physical quantity $u_i$ of each physical source, (3) means for calculating a physical quantity $O_j$ which may be generated at the measurement point j by carrying out the operation of the equation:

$$O_j = \sum_{i=1}^{m} \alpha_{ij} \cdot u_i \qquad (1)$$

(4) means for calculating a differences $S_j - O_j$ between an actual measurement value $S_j$ at the measurement point j and the physical quantity $O_j$, (5) means for obtaining a physical quantity $u_i$ as a provisional solution by carrying out operation of the equation:

$$u_i = u_i + \sum_{j=1}^{n} \{\alpha_{ij}(S_j - O_j)\} / \sum_{j=1}^{n} \alpha_{ij}^2 \qquad (2)$$

(6) means for carrying out the operation of each of the means (3) to (5) for each physical source i, (7) means for continuing the repeating operation of the processing of each of the means (3) to (5) until the sum of the squares of the differences $S_j - O_j$ is less than a predetermined threshold value, and (8) means for employing the physical quantity $u_i$ of each physical source as the physical quantity $u_i$ of each physical source which is finally obtained as an analysis result.

A physical quantity analyzing apparatus according to another embodiment is an apparatus for analyzing physical quantities of magnetic sources within an object by measuring a magnetic field which is generated by the object with a plurality of magnetic field sensors, wherein the apparatus comprises, (1) means for predetermining constants $\alpha_{ij}$ each of which represents a magnetic field generated at a predetermined position by a magnetic field source having a unit quantity corresponding to the individual magnetic field source, (2) means for provisionally determining physical quantity $u_i$ for each magnetic field source which is positioned at a lattice point k (k=1, 2, . . . , p) within the object, (3) means for calculating a magnetic field $O_j$ which is generated at the measurement point j by carrying out the operation of the equation:

$$O_j = \sum_{i=1}^{m} \alpha_{ij} \cdot u_i \qquad (1)$$

(4) means for calculating a differences $S_j - O_j$ between an actual measurement value $S_j$ of the magnetic field at the measurement point j and the magnetic field $O_j$, (5) means for obtaining a physical quantity $u_i$ as a provisional solution by carrying out operation of the equation:

$$u_i = u_i + \sum_{j=1}^{n} \{\alpha_{ij}(S_j - O_j)\} / \sum_{j=1}^{n} \alpha_{ij}^2 \qquad (2)$$

(6) means for carrying out the processing by each of the means (3) to (5) for each magnetic field source.

(7) means for repeating the processing by each of the means (3) to (5) until the sum of the squares of the differences $S_j - O_j$ is less than a predetermined threshold value, and (8) means for employing the physical quantity which is finally obtained as analysis result.

A physical quantity analyzing apparatus according to a further embodiment is an apparatus in which a current component in an x-direction and a current component in a y-direction represented by the formula:

$$u_i = \begin{cases} P_{xi} (i = 1, 2, \ldots, p) \\ P_{yi} (i = p+1, p+2, \ldots, 2p) \end{cases} \qquad (3)$$

are employed as the physical quantity $u_i$, and a constant given by the formula:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ (i = p+1, p+2, \ldots, 2p) \end{cases} \qquad (4)$$

is employed as the constant $\alpha_{ij}$.

A physical quantity analyzing apparatus according to yet another embodiment is an apparatus for analyzing a physical quantity of each physical source which may be observed at a predetermined position caused by the physical sources, in a case where physical quantities are measurable at arbitrary positions spaced apart from the individual physical source, the physical quantities can be calculated based upon predetermined operation formulae which include physical quantities of physical sources, and physical quantities measurable at the arbitrary positions spaced apart from at least one physical source are in a linear system. The apparatus comprises, physical quantity measuring means for measuring a physical quantity at a predetermined position which is proximal to at least one physical source, provisional degree determining means for provisionally determining degrees each of which represents an influence at the predetermined position by the physical source, difference calculating means for calculating a difference between a measured physical quantity at each predetermined position and a sum of products of each measured physical quantity and corresponding degree, physical quantity correcting means for employing a value which minimizes a sum of squares of differences for each new physical quantity based upon the calculated differences and each physical quantity measurement value, first repetition controlling means for repetitively operating the difference calculating means and the physical quantity correcting means for each physical source, and physical quantity employment means for continuing the repetition of the difference calculating means and the physical quantity correcting means by the first repetition controlling means for each physical source until the sum of the squares of the differences which is obtained by the repetition of the processing becomes smaller than a predetermined threshold value, and for employing the physical quantities of each physical source which are finally obtained as physical quantities which are observed at the predetermined positions.

A physical quantity analyzing apparatus according to another embodiment is an apparatus for analyzing a physical quantity of a passive physical object which influences a physical quantity which may be observed at a predetermined position caused by physical quantities of active physical sources, in a case where physical quantities measurable at arbitrary positions spaced apart from the active physical sources can be calculated based upon predetermined operation formulae which include physical quantities of physical sources, and physical quantities measurable at the arbitrary positions spaced apart from the active physical sources are in a linear system, wherein the apparatus comprises, physical quantity measuring means for measuring a physical quantity of the active physical source, provisional physical quantity determining means for provisionally determining a physical quantity of the passive physical source, difference calculating means for calculating a difference between a measured physical quantity at a predetermined position and a sum of products of each measured physical quantity of the active physical source and the physical quantity of the passive physical source, physical quantity correcting means for employing a value which minimizes a sum of squares of differences for each new physical quantity based upon the calculated differences and each physical quantity measurement value of each active physical source, first repetition controlling means for repetitively operating the difference calculating means and the physical quantity correcting means for each physical source, and physical quantity employment means for continuing the repetition of the difference calculating means and the physical quantity correcting means by the first repetition controlling means for each physical source until a sum of the squares of the differences which is obtained by the repetition of the processing becomes smaller than a predetermined threshold value, and for employing the physical quantities of each physical source which are finally obtained as physical quantities of the passive physical source.

A physical quantity analyzing apparatus according to another aspect is an apparatus for analyzing a physical quantity which is obtained at an arbitrary point within a region at which simultaneous linear equations, including individual physical sources realized based upon physical quantities of the individual physical sources and proportion constants determined based upon the region, are solvable. The apparatus comprises, proportion constant holding means for obtaining and holding the proportion constants which are determined based upon a region, provisional physical quantity determining means for provisionally determining physical quantities at plural predetermined positions which are predetermined, difference calculating means for calculating a difference between a known physical quantity which is given within the region at each predetermined position, and a sum of products of each physical quantity and corresponding proportion constant, physical quantity renewing means for employing a value which minimizes a sum of squares of differences for each new physical quantity based upon the calculated differences and each physical quantity measurement value of each active physical source, first repetition controlling means for repeating the calculation of the difference by the difference calculating means and the employment of the physical quantities by the physical quantity renewing means for each physical source, and physical quantity employment means for continuing the repetition of the calculating of the difference by the difference calculating means and the employing of the physical quantities for each physical source until a sum of the squares of the differences, which is obtained by the repetition of the processing, becomes smaller than a predetermined threshold value, and for employing the physical quantity which is finally obtained as physical quantity at the predetermined position.

A physical quantity analyzing apparatus according to still another embodiment employs means for calculating a sum of products of each of a physical quantity and a corresponding proportion constant, which means for calculating obtains a new sum by correcting the physical quantity which was most recently employed based upon a product of a difference between a new physical quantity and the physical quantity which was previously employed and corresponding proportion constant, for each iteration by a first repetition controlling means, after a calculation of the sum of the products of each physical quantity and corresponding proportion constant.

A physical quantity analyzing apparatus according to another embodiment employs a difference calculating means which obtains a new difference, for each of a predetermined position, based upon a product of a difference between a new physical quantity and a physical quantity which was most previously employed and corresponding proportion constant for each repetition process by a first repetition controlling means, after a calculation of the difference between the sum calculated by the means for calculating the sum and corresponding proportion constant and the actual physical quantity is obtained.

A physical quantity analyzing apparatus according to another embodiment wherein the proportion constants are inverses $C_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistors which are connected x, y, z-directions to each lattice point $[k_x, k_y, k_z]$ of $N_x \times N_y \times N_z$ number of lattice points, and a sum $G_N[k_x, k_y, k_z]$ corresponding to resistances actually connected to the lattice point $[k_x, k_y, k_z]$ which sum $G_N$ is represented by the equation:

$$G_N[k_x, k_y, k_z] = G_x[k_x - 1, k_y, k_z] + \qquad (5)$$
$$G_x[k_x, k_y, k_z] + G_y[k_x, k_y - 1, k_z] + G_y[k_x, k_y, k_z] +$$
$$G_z[k_x, k_y, k_z - 1] + G_z[k_x, k_y, k_z]$$

the actual physical quantities have supplied current $S[k_x, k_y, k_z]$ and flowing out current $O[k_x, k_y, k_z]$ at the lattice point $[k_x, k_y, k_z]$, and the physical quantities for analysis are potentials $u[k_x, k_y, k_z]$ at each lattice point $[k_x, k_y, k_z]$, wherein the apparatus comprises, (1) means for obtaining $(N_x-1) \times N_y \times N_z$ number of $G_x[k_x, k_y, k_z]$, (2) means for obtaining $N_x \times (N_y-1) \times N_z$ number of $G_y[k_x, k_y, k_z]$, (3) means for obtaining $N_x \times N_y \times (N_z-1)$ number of $G_z[k_x, k_y, k_z]$, (4) means for obtaining $N_x \times N_y \times N_z$ number of $G_N[k_x, k_y, k_z]$, (5) means for obtaining $N_x \times N_y \times N_z$ number of $\beta[k_x, k_y, k_z]$ based upon the equation:

$$\beta[k_x, k_y, k_z] = 1/(G_N[k_x, k_y, k_z]^2 + \qquad (6)$$
$$G_x[k_x-1, k_y, k_z]^2 + G_x[k_x, k_y, k_z]^2 + G_y[k_x, k_y-1, k_z]^2 +$$
$$G_y[k_x, k_y, k_z]^2 + G_z[k_x, k_y, k_z-1]^2)$$

(6) means for calculating correction values $\Delta u$ of the potentials $u[k_x, k_y, k_z]$ based upon the formula:

$$\Delta u \leftarrow \beta[k_x, k_y, k_z]\{G_N[k_x, k_y, k_z] (S[k_x, k_y, k_z] - \qquad (7)$$
$$O[k_x, k_y, k_z]) - G_x[k_x-1, k_y, k_z] (S[k_x-1, k_y, k_z] - O[k_x-1, k_y, k_z]) -$$
$$G_x[k_x, k_y, k_z] (S[k_x+1, k_y, k_z] - O[k_x+1, k_y, k_z]) - G_y[k_x, k_y-1, k_z]$$
$$(S[k_x, k_y-1, k_z] - O[k_x, k_y-1, k_z]) - G_y[k_x, k_y, k_z] (S[k_x, k_y+1, k_z] -$$
$$O[k_x, k_y+1, k_z]) - G_z[k_x, k_y, k_z-1](S[k_x, k_y, k_z-1] \cdot$$
$$O[k_x, k_y, k_z-1]) - G_y[k_x, k_y, k_z] (S[k_x, k_y, k_z+1] - O[k_x, k_y, k_z+1])\}$$

(7) means for correcting the potential $u[k_x, k_y, k_z]$ by adding the calculated correction value $\Delta u$, (8) means for repeating the process of the means (6) and (7) for 1 to $N_z$ for $k_z$, (9) means for repeating the process of the means (6) to (8) for 1 to $N_y$ for $k^y$,

(10) means for repeating the process of the means (6) to (9) for 1 to $N_x$ for $k_x$, and

(11) means for repeating the process of the means (6) to (10) until an estimated error becomes smaller than a predetermined threshold value, and for employing the potentials which are finally obtained.

A physical quantity analyzing apparatus according to another embodiment involves an apparatus wherein the potentials $u[k_x, k_y, k_z]$ of each lattice point $[k_x, k_y, k_z]$ which correspond to the analysis results obtained by the apparatus according to the previous embodiment, are employed as proportion constant $\alpha_{ij}$, known physical quantities being potentials measured at a surface of a region subject to analysis, and the physical quantities subject to analysis having supplied current $S[k_x, k_y, k_z]$ and flowing out current $O[k_x, k_y, k_z]$ for each lattice point $[k_x, k_y, k_z]$, wherein the apparatus comprises, (1) means for provisionally determining a current flows into a lattice point and flows out from another lattice point for a physical source subject to analysis, (2) means for calculating an estimated value of a potential on a surface of the region subject to analysis by multiplying the provisionally determined physical quantity and a proportion constant, (3) means for calculating a correction value for a physical quantity based upon a difference between the measured potential and the estimated value of the potential, (4) means for correcting the physical quantity based upon the calculated correction value, (5) means for repetitively operating each of the means (2) to (4) for each physical quantity, and (6) means for iteratively operating each of the means (2) to (5) until an estimated error becomes smaller than a predetermined threshold value, and for employing the physical quantities which are finally obtained as a analysis result.

A physical quantity analyzing apparatus according to another aspect comprises, (1) means for selecting two physical quantities from among plural physical quantities, (2) means for calculating a correction value of each selected physical quantity based upon the formula:

$$\Delta u_i \leftarrow \sum_{j=1}^{n} \{\alpha_{ij}(S_j - O_j)\} / \sum_{j=1}^{n} \alpha_{ij}^2 \qquad (8)$$

(3) means for correcting a corresponding physical quantity based upon each calculated correction value, (4) means for correcting a first physical quantity by operating each of means (2) and (3), (5) means for correcting a second physical quantity by operating each of means (2) and (3), (6) means for correcting the first physical quantity again by operating each of means (2) and (3), (7) means for calculating a correction value for correcting the second physical quantity again, by operating the means (2), (8) means for calculating a correction value for the first physical quantity by dividing a product of correction values which are obtained by operating each of means (6) and (7) by a difference between a correction value which is obtained by operating the means (4) and the correction value obtained by means (6), (9) means for calculating a correction value for the second physical quantity by dividing a product of correction values which are obtained by operating each of means (5) and (7) by a difference between a correction value which is obtained by operating the means (4) and the correction value which is obtained by operating the means (6),

(10) means for correcting the physical quantities based upon a correction value which is obtained by operating each of means (8) and (9),

(11) means for selecting two other physical quantities and for operating each of means (4) to (10), and

(12) means for iteratively operating each of means (4) to (11) until an estimated error becomes smaller than a predetermined threshold value, and for employing the physical quantities which are finally obtained.

A physical quantity analyzing apparatus according to another embodiment further comprises means for calculating the estimated errors of $$D[k_x, k_y, k_z] = (S[k_x, k_y, k_z] - O[k_x, k_y, k_z]),$$

$$D[k_x-1, k_y, k_z] = (S[k_x-1, k_y, k_z] - O[k_x-1, k_y, k_z]),$$

$$D[k_x+1, k_y, k_z] = (S[k_x+1, k_y, k_z] - O[k_x+1, k_y, k_z]),$$

$$D[k_x, k_y-1, k_z] = (S[k_x, k_y-1, k_z] - O[k_x, k_y-1, k_z]),$$

$$D[k_x, k_y+1, k_z] = (S[k_x, k_y+1, k_z] - O[k_x, k_y+1, k_z]),$$

$$D[k_x, k_y, k_z-1] = (S[k_x, k_y, k_z-1] - O[k_x, k_y, k_z-1]),$$

$$D[k_x, k_y, k_z+1] = (S[k_x, k_y, k_z+1] - O[k_x, k_y, k_z+1])$$

and means for correcting the estimated errors based upon the formulae $$D[k_x, k_y, k_z] \leftarrow (D[k_x, k_y, k_z] + G_N[k_x, k_y, k_z])\Delta u$$

$$D[k_x-1, k_y, k_z] \leftarrow (D[k_x-1, k_y, k_z] + G_x[k_x-1, k_y, k_z])\Delta u$$

$$D[k_x+1, k_y, k_z] \leftarrow (D[k_x+1, k_y, k_z] + G_x[k_x, k_y, k_z])\Delta u$$

$D[k_x, k_y-1, k_z] \leftarrow (D[k_x, k_y-1, k_z] + G_y[k_x, k_y-1, k_z])\Delta u$ $D[k_x, k_y+1, k_z] \leftarrow (D[k_x, k_y+1, k_z] + G_y[k_x, k_y, k_z])\Delta u$ $D[k_x, k_y, k_z-1] \leftarrow (D[k_x, k_y, k_z-1 + G_y[k_x, k_y, k_z-1])\Delta u$ $D[k_x, k_y, k_z+1] \leftarrow (D[k_x, k_y, k_z+1] + G_y[k_x, k_y, k_z])\Delta u$ \hfill (9)

wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are employed instead of $(S[k_x, k_y, k_z] - O[k_x, k_y, k_z])$, $(S[k_x-1, k_y, k_z] - O[k_x-1, k_y, k_z])$, $(S[k_x+1, k_y, k_z] - O[k_x+1, k_y, k_z])$, $(S[k_x, k_y-1, k_z] - O[k_x, k_y-1, k_z])$, $(S[k_x, k_y+1, k_z] - O[k_x, k_y+1, k_z])$, $(S[k_x, k_y, k_z-1] - O[k_x, k_y, k_z-1])$, $(S[k_x, k_y, k_z+1] - O[k_x, k_y, k_z+1])$, in the formula:

$$\Delta u \leftarrow \beta[k_x, k_y, k_z]\{G_N[k_x, k_y, k_z] (S[k_x, k_y, k_z] - \qquad (7)$$
$$O[k_x, k_y, k_z]) - G_x[k_x-1, k_y, k_z] (S[k_x-1, k_y, k_z] - O[k_x-1, k_y, k_z]) -$$
$$G_x[k_x, k_y, k_z] (S[k_x+1, k_y, k_z] - O[k_x+1, k_y, k_z]) - G_y[k_x, k_y-1, k_z]$$
$$(S[k_x, k_y-1, k_z] - O[k_x, k_y-1, k_z]) - G_y[k_x, k_y, k_z] (S[k_x, k_y+1, k_z] -$$
$$O[k_x, k_y+1, k_z]) - G_z[k_x, k_y, k_z-1] (S[k_x, k_y, k_z-1] -$$
$$O[k_x, k_y, k_z-1]) - G_z[k_x, k_y, k_z] (S[k_x, k_y, k_z+1] - O[k_x, k_y, k_z+1])\}$$

A physical quantity analyzing apparatus according to another embodiment employs a physical quantity calculating means which employs a normalized function of a function representing a sum of squares of calculated difference instead of the calculated difference.

A physical quantity analyzing apparatus according to another embodiment employs a means which employs a value which minimizes the square of the difference as a new physical quantity instead of the means which employs a value which minimizes the sum of the squares of the difference as a new physical quantity.

A physical quantity analyzing apparatus according to another embodiment employs a means which performs processing in the calculation of a difference and the employment of physical quantities $u_i$ for each physical sources until a sum of the absolute values of differences which are obtained by the iterative processing becomes smaller than a predetermined threshold value, instead of the means which continues the repetition of the calculation of the differences and the employment of the physical quantities $u_i$ for each physical sources until the sum of the squares of the differences which is obtained by the repetition of the processing becomes smaller than a predetermined threshold value.

As to the physical quantity analyzing method according to claim 1, when the method analyzes a physical quantity $u_i$ associated with an unknown physical source in a physical system wherein a relationship corresponding to the equation:

$$O_j = \sum_{i=1}^{m} \alpha_{ij} \cdot u_i \qquad (1)$$

between physical quantities of individual physical sources and physical quantities $O_j$ at an arbitrary position generated by the individual physical sources, though the method provisionally determines a physical quantity $u_i$ of each physical source, calculates a physical quantity $O_j$ by carrying out an operation of equation (1) based upon each physical quantity $u_i$, employs a value which minimizes a sum of squares of differences as a physical quantity of a physical source based upon the differences and corresponding proportional constants, the difference being a difference between the calculated physical quantity $O_j$ and corresponding known physical quantity $S_j$, repeats the calculation of the difference and the employment of the physical quantities $u_i$ for each physical source, repeats the iteration of the calculation of the difference and the employment of the physical quantities $u_j$ for each physical source until the sum of the squares of the differences which is obtained by repetition the processing becomes smaller than a predetermined threshold value. Determination of the estimation gains is not necessary and the speed of solution convergence can be increased due to the disregarding of estimation gains. Further, the method is applicable not only to the analysis of a measurable physical quantity corresponding to a physical source at an arbitrary point spaced apart from individual physical sources, but also analysis of a physical quantity at an arbitrary point due to individual physical sources. As a result, an extent of applicable physical quantities is enlarged, and analysis with high stability and high accuracy is achieved.

As to the physical quantity analyzing method according to claim 2, when the method analyzes a physical quantity of each physical source based upon physical quantities measured at predetermined plural positions spaced apart from the physical sources, in the case that physical quantities measurable at arbitrary positions spaced apart from the individual physical source can be calculated based upon predetermined operation formulae which include physical quantities of physical sources, and physical quantities measurable at the arbitrary positions spaced apart from plural physical sources are in a linear system. The method predetermines or estimates constants each of which represents a physical field generated at each predetermined position by a physical source, calculates a difference between a measured physical quantity at each predetermined position and a sum of products of each physical quantity and corresponding constant, determines and employs a value which minimizes a sum of squares of differences as a new physical quantity based upon the calculated differences and each constant, and iteratively repeats the calculation of the difference and the employing of the physical quantities $u_i$ for each physical source, until the sum of the squares of the differences which is obtained by the repetition of the processing becomes smaller than a predetermined threshold value. Determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing method according to claim 3, when the method analyzes a physical quantity $u_i$ of a physical source i based upon a physical quantity $S_j$ measured at plural measurement points j spaced apart from the physical source i, in the case that a physical quantity, which is measureable at plural measurement points j of which positions are known, and are spaced apart from individual physical source i of which position is known, can be calculated based upon predetermined operations including the physical quantity $u_i$ of the physical source i and that the physical quantity $S_j$ measurable at the plural measurement points j spaced apart from the physical source i is in a linear system, though the method comprising:

(1) predetermining constants $\alpha_{ij}$ each of which represents a physical field generated at a predetermined position by a physical source and having a unit quantity corresponding to the individual physical source, (2) provisionally estimating a physical quantity $u_i$ for each physical source, (3) calculating a physical quantity $O_j$ which is anticipated at the measurement point j by carrying out the operation of the equation:

$$O_j = \sum_{i=1}^{m} \alpha_{ij} \cdot u_i \qquad (1)$$

(4) calculating a difference $S_j - O_j$ between an actual measurement value $S_j$ at the measurement point j and the physical quantity $O_j$.

(5) obtaining a physical quantity $u_i$ as a provisional solution by carrying out operation of the quotation:

$$u_i = u_i + \sum_{j=1}^{n} \{\alpha_{ij}(S_j - O_j)\} / \sum_{j=1}^{n} \alpha_{ij}^2 \qquad (2)$$

(6) carrying out steps (3) to (5) for each physical source, (7) iteratively repeating steps (3) to (5) until the sum of the squares of the differences $S_j - O_j$ becomes less than a predetermined threshold value, and employing the physical quantity of each physical source which is finally obtained as analysis result. Determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing method according to claim 4, when the method for analyzing physical quantities involving magnetic sources within an object by measuring a magnetic field which is generated by the object with a plurality of magnetic field sensors, the method involves:

(1) predetermining constants $\alpha_{ij}$ each of which represents a unit quantity corresponding to the magnetic field generated at predetermined positions by a magnetic field source, (2) provisionally estimating a physical quantity $u_i$ for each magnetic field source positioned at a lattice point k (k=1, 2, ..., p) within the object, (3) calculating a magnetic field $O_j$ which is anticipated at the measurement point j by carrying out the operation of the equation:

$$O_j = \sum_{i=1}^{m} \alpha_{ij} \cdot u_i \qquad (1)$$

(4) calculating a difference $S_j - O_j$ between an actual measurement value $S_j$ of magnetic field at the measurement point j and the magnetic field $O_j$, (5) obtaining a physical quantity $u_i$ as a provisional solution by carrying out operation of the equation $$u_i = u_i + \sum_{j=1}^{n} \{\alpha_{ij}(S_j - O_j)\} / \sum_{j=1}^{n} \alpha_{ij}^2 \qquad (2)$$

(6) performing steps (3) to (5) for each magnetic field source, (7) iteratively repeating processing steps (3) to (5) until a sum of the squares of the differences $S_j - O_j$ is less than a predetermined threshold value. Determination of the estimation gains is not necessary and the speed of solution convergence can be increased because the estimation gains are disregarded. That is, analysis of a magnetic source can be performed at high speed.

As to the physical quantity analyzing method according to claim 5, the physical quantity $u_i$ represents a current component in an x-direction and a current component in a y-direction which are represented by the formula:

$$u_i = \begin{cases} P_{xi} (i = 1, 2, \ldots, p) \\ P_{yi} (i = p+1, p+2, \ldots, 2p) \end{cases} \qquad (3)$$

and the constant $\alpha_{ij}$ is given by the formula:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ \quad (i = p+1, p+2, \ldots, 2p) \end{cases} \qquad (4)$$

the current components in the x-, and the y-directions at each lattice point are analyzed by measuring z-direction components of the magnetic field.

As to the physical quantity analyzing method according to claim 6, when the method analyzes a physical quantity of a physical source which should be observable at a predetermined position as a result of the physical source, in a case where physical quantities are measurable at arbitrary positions spaced apart from the individual physical source, such quantities can be calculated based upon predetermined operation formulae which include physical quantity components corresponding to the physical sources, and physical quantities measurable at the arbitrary positions spaced apart from at least one physical source are in a linear system, when the method measures a physical quantity at a predetermined position which is proximal to at least one physical source, provisionally determines degrees each of which represents an influence at the predetermined position by the physical source, calculates a difference between a measured physical quantity at each predetermined position and a sum of products of each measured physical quantity and corresponding degree, determines and employs a value which minimizes a sum of squares of differences as a new physical quantity based upon the calculated differences and each physical quantity measurement value, repeats the calculation of the difference and the employment of the physical quantities $u_i$ for each physical source, iteratively repeats the calculation of the difference and the employment of the physical quantities $u_i$ for each physical source until the sum of the squares of the differences which is obtained by the repetition of the processing becomes smaller than a predetermined threshold value. Determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing method according to claim 7, when the method analyzes a physical quantity of a passive physical source which influences a observable physical quantity at a predetermined position which is caused by physical quantities of active physical sources, in a case that the physical quantities measurable at arbitrary positions spaced apart from the active physical sources can be calculated based upon predetermined operation formulae which include physical quantities of physical sources, and physical quantities measurable at the arbitrary positions spaced apart from the active physical sources are in a linear system. Though the method measures a physical quantity of the active physical source, provisionally determines a physical quantity of the passive physical source, calculates a difference between a measured physical quantity at a predetermined position and a sum of products of each measured physical quantity of the active physical source and the physical quantity of the passive physical source, employs a value which minimizes a sum of squares of differences as a new physical quantity based upon the calculated differences and each physical quantity measurement value of each active physical source, repeats the calculating of the difference and the employment of physical quantities $u_i$ for each physical source, iteratively repeating the calculation of the difference and the employment of the physical quantities $u_i$ for each physical source until the sum of the squares of the differences which is obtained by the repetition of the processing becomes smaller than a predetermined threshold value. Determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing method according to claim 8, when the method analyzes a physical quantity which is obtained at an arbitrary point within a region in which simultaneous linear equations including individual physical sources are realized based upon physical quantities of the individual physical sources, and proportion constants determined based upon the region. The method obtains the proportion constants which are determined based upon the region, provisionally determines physical quantities at plural predetermined positions which are predetermined, calculates a difference between a known physical quantity which is given within the region at each predetermined position and a sum of products of each physical quantity and corresponding proportion constant, employs a value which minimizes a sum of squares of differences as a new physical quantity based upon the calculated differences and each physical quantity measurement value of each active physical source, repeats the calculation of the difference and the employment of the physical quantities $u_i$ for each physical source, iteratively repeats the calculation of the difference and the employment of the physical quantities $u_i$ for each physical source until a sum of the squares of the differences which is obtained by the repetition of the processings becomes smaller than a predetermined threshold value. Determination of the estimation gains is not necessary and the speed of solution convergence can be increased because the estimation gains are disregarded. Further, an oxtent of applicable physical quantities is enlarged, and analysis with high stability and high accuracy is achieved. Furthermore, an operating load is significantly decreased and a time required for physical source analysis is shortened significantly.

As to the physical quantity analyzing method according to claim 9, this method obtains a new physical quantity based upon differences between actual physical quantities and products of each physical quantity and a corresponding proportion constant, a value which is obtained by dividing a sum of the products of each physical quantities and the corresponding proportion constant by a sum of squares of all of corresponding proportion constants, and a physical quantity which was most recently employed, operations which are similar to those of claim 8 are performed.

As to the physical quantity analyzing method according to claim 10, this method employs inverses of resistance values of a plurality of resistances which are represented in a three dimensional lattice shape which lattice is to approximate the region, as the proportion constants. The method employs current values at the lattice points as the actual physical quantities, and employs potentials at the lattice points as physical quantities which are subject of analysis. Potentials at each lattice points of a three dimensional lattice can be analyzed with small operation load within a short time period. Therefore, information of a living organism is analyzed by overlapping the analysis result of lattice points on an arbitrary plane with a cross sectional image of the living organism which image is obtained by X-ray CT (computer tomograph) or MRI (magnetic resonance imaging), the region of interest being determined within the living organism.

As to the physical quantity analyzing method according to claim 11, when the proportion constants are the inverses $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistors which are connected in x, y, z-directions to each lattice point $[k_x, k_y, k_z]$ of $N_x \times N_y \times N_z$ number of lattice points, and a sum $G_N[k_x, k_y, k_z]$ corresponding to actual connected resistors at the lattice point $[k_x, k_y, k_z]$ which sum $G_N$ is represented by the equation $$G_N[k_x, k_y, k_z] = G_x[k_x - 1, k_y, k_z] + \\ G_x[k_x, k_y, k_z] + G_y[k_x, k_y - 1, k_z] + G_y[k_x, k_y, k_z] + \\ G_z[k_x, k_y, k_z - 1] + G_z[k_x, k_y, k_z] \quad (5)$$

the actual physical quantities are supplied current (input current) $S[k_x, k_y, k_z]$ and flowing out current (output current) $O[k_x, k_y, k_z]$ at the lattice point $[k_x, k_y, k_z]$, and the physical quantities subject to analysis are potentials $u[k_x, k_y, k_z]$ at each lattice point $[k_x, k_y, k_z]$, though the method (1) obtaining $(N_x-1) \times N_y \times N_z$ number of $G_x[k_x, k_y, k_z]$, (2) obtaining $N_x \times (N_y-1) \times N_z$ number of $G_y[k_x, k_y, k_z]$, (3) obtaining $N_x \times N_y \times (N_z-1)$ number of $G_z[k_x, k_y, k_z]$, (4) obtaining $N_x \times N_y \times N_z$ number of $G_N[k_x, k_y, k_z]$, (5) obtaining $N_x \times N_y \times N_z$ number of $\beta[k_x, k_y, k_z]$ based upon the equation:

$$\beta[k_x, k_y, k_z] = 1/(G_N[k_x, k_y, k_z]^2 + \\ G_x[k_x - 1, k_y, k_z]^2 + G_x[k_x, k_y, k_z]^2 + G_y[k_x, k_y - 1, k_z]^2 + \\ G_y[k_x, k_y, k_z]^2 + G_z[k_x, k_y, k_z - 1]^2 + G_z[k_x, k_y, k_z]^2) \quad (6)$$

(6) calculating correction values $\Delta u$ of the potentials $u[k_x, k_y, k_z]$ based upon the formula:

$$\Delta u \leftarrow \beta[k_x, k_y, k_z]\{G_N[k_x, k_y, k_z](S[k_x, k_y, k_z] - \\ O[k_x, k_y, k_z]) - G_x[k_x - 1, k_y, k_z](S[k_x - 1, k_y, k_z] - O[k_x - 1, k_y, k_z]) - \\ G_x[k_x, k_y, k_z](S[k_x + 1, k_y, k_z] - O[k_x + 1, k_y, k_z]) - G_y[k_x, k_y - 1, k_z] \\ (S[k_x, k_y - 1, k_z] - O[k_x, k_y - 1, k_z]) - G_y[k_x, k_y, k_z](S[k_x, k_y + 1, k_z] - \\ O[k_x, k_y + 1, k_z]) - G_z[k_x, k_y, k_z - 1](S[k_x, k_y, k_z - 1] - \\ O[k_x, k_y, k_z - 1]) - G_z[k_x, k_y, k_z](S[k_x, k_y, k_z + 1] - O[k_x, k_y, k_z + 1])\} \quad (7)$$

(7) correcting the potential $u[k_x, k_y, k_z]$ by adding the calculated correction value $\Delta u$, (8) repeating the processing of steps (6) and (7) from 1 to $N_z$ for $k_z$, (9) repeating the processing of steps (6) to (8) from 1 $N_y$ for $k_y$,

(10) repeating the processing of steps (6) to (9) from 1 to $N_x$ for $k_x$, and

(11) repeating the processing of steps (6) to (10) until an estimated error becomes smaller than a predetermined threshold value, The interior of a living organism, or the like, may be modelled with a plurality of resistances which are interconnected to one another in a three dimensional lattice shape, then a potential at each lattice point is analyzed in the case that where a current flows into one of the lattice points and flows out from another lattice point. Further, determination of the estimation gains is not necessary and the speed of solution convergence can be incessed because the estimation gains are disregarded, so that operation load is significantly reduced.

As to the physical quantity analyzing method according to claim 12, when the potentials $u[k_x, k_y, k_z]$ of each lattice point $[k_x, k_y, k_z]$ which represents the analysis result obtained by the method according to claim 11, are employed as a proportion constant $\alpha_{ij}$, the known physical quantities are potentials measured at a surface of a region which is the subject to analysis, and the physical quantities subject to analysis are supplied current $S[k_x, k_y, k_z]$ and flowing out current $O[k_x, k_y, k_z]$ at each lattice point $[k_x, k_y, k_z]$, through the method of:

(1) provisionally determining a current which flows into one lattice point and flows out from another lattice point of a physical source region subject to analysis, (2) calculating an estimated value of a potential on a surface of the region by multiplying the provisionally determined physical quantity and the proportion constant, (3) calculating a correction value for a physical quantity based upon a difference between the measured potential and the estimated value of the potential, (4) correcting the physical quantity based upon the calculated correction value, (5) repeating the processing of steps (2) to (4) for each physical quantity, then (6) repeating the processing of steps (2) to (5) until an estimated error becomes smaller than a predetermined threshold value.

By utilizing the above method, the interior of a living organism, or the like, can be modelled with a plurality of resistances which are interconnected to one another in a three dimensional lattice shape. A potential at each lattice point is analyzed when a current flows into one of the lattice points and flows out from another lattice point. Analysis of the lattice point into which the current flows and the lattice points from which the current flows is performed based upon the analysis result and potentials which are measured on a surface of the living organism, or the like. Further, determination of the estimation gains is not necessary and the speed of solution convergence can be increased because the estimation gains are disregarded, so that operation load is extremely reduced.

As to the physical quantity analyzing method according to claim 13, the method:

(1) selects two physical quantities from among a plurality of physical quantities, (2) calculates a correction value for each physical quantity based upon the formula:

$$\Delta u_i \leftarrow \sum_{j=1}^{n} \{\alpha_{ij}(S_j - O_j)\} / \sum_{j=1}^{n} \alpha_{ij}^2 \quad (8)$$

(3) corrects corresponding physical quantities based upon each calculated correction value, (4) corrects a first physical quantity by carrying out the processing of steps (2) and (3), (5) corrects a second physical quantity by carrying out the processing of steps (2) and (3), (6) corrects the first physical quantity again by carrying out the processing of steps (2) and (3), (7) calculates a correction value for correcting the second physical quantity again, by carrying out the processing of step (2), (8) calculates a correction value for the first physical quantity by dividing a product of the correction values which are obtained in steps (6) and (7) by a difference between the correction value obtained in the step (4) and the correction value obtained in the step (6), (9) calculates a correction value for the second physical quantity by dividing a product of the correction values which are obtained in steps (5) and (7) by a difference between the correction value obtained in the step (4) and the correction value obtained in the step (6),

(10) corrects the physical quantities based upon one of the correction values obtained in steps (8) and (9),

(11) selects two other physical quantities and carries out the processing of steps (4) to (10), then

(12) repeats the processing of steps (4) to (11) until an estimated error becomes smaller than a predetermined threshold value.

Correction values are calculated once for the one of two physical quantities which are arbitrarily selected and twice for the other of the two physical quantities, and the final values of the physical quantities are immediately calculated by repeating the correction based upon the calculated correction values. Therefore, the processing load is significantly reduced and the time required is significantly reduced.

As to the physical quantity analyzing method according to claim 14, the method further comprises the steps of, calculating the estimated errors of $D[k_x, k_y, k_z] = (S[k_x, k_y, k_z] - O[k_x, k_y, k_z])$, $D[k_x-1, k_y, k_z] = (S[k_x-1, k_y, k_z] - O[k_x-1, k_y, k_z])$, $D[k_x+1, k_y, k_z] = (S[k_x+1, k_y, k_z] - O[k_x+1, k_y, k_z])$, $D[k_x, k_y-1, k_z] = (S[k_x, k_y-1, k_z] - O[k_x, k_y-1, k_z])$, $D[k_x, k_y+1, k_z] = (S[k_x, k_y+1, k_z] - O[k_x, k_y+1, k_z])$, $D[k_x, k_y, k_z-1] = (S[k_x, k_y, k_z-1] - O[k_x, k_y, k_z-1])$, $D[k_x, k_y, k_z+1] = (S[k_x, k_y, k_z+1] - O[k_x, k_y, k_z+1])$ and correcting the estimated errors based upon the formulae:

$D[k_x, k_y, k_z] \leftarrow (D[k_x, k_y, k_z] + G_N[k_x, k_y, k_z])\Delta u$ $D[k_x-1, k_y, k_z] \leftarrow (D[k_x-1, k_y, k_z] + G_x[k_x-1, k_y, k_z])\Delta u$ $D[k_x+1, k_y, k_z] \leftarrow (D[k_x+1, k_y, k_z] + G_x[k_x+1, k_y, k_z])\Delta u$ $D[k_x, k_y-1, k_z] \leftarrow (D[k_x, k_y-1, k_z] + G_y[k_x, k_y-1, k_z])\Delta u$ $D[k_x, k_y+1, k_z] \leftarrow (D[k_x, k_y+1, k_z] + G_y[k_x, k_y, k_z])\Delta u$ $D[k_x, k_y, k_z-1] \leftarrow (D[k_x, k_y, k_z-1] + G_z[k_x, k_y, k_z-1])\Delta u$ $D[k_x, k_y, k_z+1] \leftarrow (D[k_x, k_y, k_z+1] + G_z[k_x, k_y, k_z])\Delta u \quad (9)$ wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are employed instead of $(S[k_x, k_y, k_z] - O[k_x, k_y, k_z])$, $(S[k_x-1, k_y, k_z] - O[k_x-1, k_y, k_z])$, $(S[k_x+1, k_y, k_z] - O[k_x+1, k_y, k_z])$, $(S[k_x, k_y-1, k_z] - O[k_x, k_y-1, k_z])$, $(S[k_x, k_y+1, k_z] - O[k_x, k_y+1, k_z])$, $(S[k_x, k_y, k_z-1] - O[k_x, k_y, k_z-1])$, $(S[k_x, k_y, k_z+1]-O[k_x, k_y, k_z+1])$ in the formula:

$\Delta u \leftarrow \beta[k_x, k_y, k_z]\{G_N[k_x, k_y, k_z] (S[k_x, k_y, k_z] -$  (7)
$O[k_x, k_y, k_z]) - G_x[k_x-1, k_y, k_z] (S[k_x-1, k_y, k_z] - O[k_x-1, k_y, k_z]) -$
$G_x[k_x, k_y, k_z] (S[k_x+1, k_y, k_z] - O[k_x+1, k_y, k_z]) - G_y[k_x, k_y-1, k_z]$
$(S[k_x, k_y-1, k_z] - O[k_x, k_y-1, k_z]) - G_y[k_x, k_y, k_z] (S[k_x, k_y+1, k_z] -$
$O[k_x, k_y+1, k_z]) - G_z[k_x, k_y, k_z-1] (S[k_x, k_y, k_z-1] -$
$O[k_x, k_y, k_z-1]) - G_z[k_x, k_y, k_z] (S[k_x, k_y, k_z+1] - O[k_x, k_y, k_z+1])\}$ It is sufficient that $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are hold instead of holding of $S[k_x, k_y, k_z]$, $S[k_x-1, k_y, k_z]$, $S[k_x+1, k_y, k_z]$, $S[k_x, k_y-1, k_z]$, $S[k_x, k_y+1, k_z]$, $S[k_x, k_y, k_z-1]$, $S[k_x, k_y, k_z+1]$ and $O[k_x, k_y, k_z]$, $O[k_x-1, k_y, k_z]$, $O[k_x+1, k_y, k_z]$, $O[k_x, k_y-1, k_z]$, $O[k_x, k_y+1, k_z]$, $O[k_x, k_y, k_z-1]$, $O[k_x, k_y, k_z+1]$ so that the amount of memory required is decreased. And, in the repeat processing operations of $(S[k_x, k_y, k_z]-O[k_x, k_y, k_z])$, $(S[k_x-1, k_y, k_z]-O[k_x-1, k_y, k_z])$, $(S[k_x+1, k_y, k_z]-O[k_x+1, k_y, k_z])$, $(S[k_x, k_y-1, k_z]-O[k_x, k_y-1, k_z])$, $(S[k_x, k_y+1, k_z]-O[k_x, k_y+1, k_z])$, $(S[k_x, k_y, k_z-1]-O[k_x, k_y, k_z-1])$, $(S[k_x, k_y, k_z+1]-O[k_x, k_y, k_z+1])$ are not necessarily performed, but the estimated errors are easily corrected using the calculated correction values so that operations are simplified and required time for correcting estimated errors is shortened.

As to the physical quantity analyzing method according to claim 15, the method employs a normalized function of a function representing a sum of squares of calculated difference instead of the calculated difference, degrees of the functions which have characteristics of a parabola are unified to be 1 so that convergence speed of a solution is further increased.

As to the physical quantity analyzing method according to claim 16, the method employs a process for employing a value which minimizes a sum of squares of the difference as a new physical quantity instead of the processing for employment of a value which minimizes the sum of the squares of the difference as a new physical quantity, a processing which is similar to that of one of claims 1 through 15 is performed when the known physical quantities include no errors.

As to the physical quantity analyzing method according to claim 17, the method employs a processing for iteratively repeating the calculation of the difference and the employment of the physical quantities $u_i$ for each physical source until the sum of the absolute values of the difference which is obtained by the repetition of the processing becomes smaller than a predetermined threshold value. A processing which is similar to that of one of claims 1 through 16 is performed when the known physical quantities include no errors.

As to the physical quantity analyzing apparatus according to claim 18, when the apparatus analyzes a physical quantity $u_i$ corresponding to an unknown physical source in a physical system which may be, in part, modelled by equation:

$$O_j = \sum_{i=1}^{m} \alpha_{ij} \cdot u_i \quad (1)$$

relating physical quantities of individual physical sources and physical quantities $O_j$ at an arbitrary position which physical quantities have generated by the individual physical sources, the apparatus provisionally determines a physical quantity $u_i$ for each physical source by a physical quantity provisionally determining means, calculates a physical quantity $O_j$ by carrying out an operation of equation (1) based upon each physical quantity $u_i$, and employing a value which minimizes a sum of squares of differences as a physical quantity of a physical source based upon the differences and corresponding proportional constants, the difference being a difference between the calculated physical quantity $O_j$ and corresponding known physical quantity $S_j$ determined by a physical quantity renewing means, repeats the calculation of the difference and the employment of the physical quantities $u_i$ for each physical source by a first repetition controlling means, iteratively repeating the calculating of the difference by the first repetition controlling means and the employing of the physical quantities $u_i$ for each physical source until the sum of the squares of the differences which is obtained by the repetition of the processing becomes smaller than a predetermined threshold value as determined by a second repetition controlling means. The physical quantities $u_i$, of each physical source which are finally obtained as physical quantities $u_i$ of each physical source by the physical quantity employment means, may then be utilized.

Therefore, determination of the estimation gains is not necessary and the speed of solution convergence can be increased because the estimation gains are disregarded. Further, the method is applicable to not only analysis of a physical quantity corresponding to a physical source based upon physical quantities measurable at arbitrary points spaced apart from individual physical sources, but also analysis of a physical quantity, or characteristic, at an arbitrary point due to direct correspondence with individual physical sources. As a result, an extent of applicable physical quantities is enlarged, and analysis with high stability and high accuracy is achieved.

As to the physical quantity analyzing apparatus according to claim 19, the apparatus analyzes a physical quantity corresponding to physical source based upon physical quantities which can be measured at predetermined plural positions which are spaced apart from the actual physical sources. In this case, physical quantities measurable at arbitrary positions spaced apart from the individual physical sources can be calculated based upon predetermined operation formulae which formulae include components relating to physical quantities of the physical sources, and the physical quantities which are measurable at the arbitrary positions spaced apart from the plural physical sources are in a linear system. The apparatus predetermines constants each of which represents a physical field measurable at each predetermined position which has a unit quantity corresponding to the individual physical source by using a constant determining means; calculates a difference between a measured physical quantity at each predetermined position and a sum of products of each physical quantity and corresponding constant by using a difference calculating means; employs a value which minimizes the sum of squares of differences as a now physical quantity based upon the calculated differences and each constant by the physical quantity correcting means; repetitively operates the difference calculating means and the physical quantity correcting means for each physical source by using a first repetition controlling means; and iteratively operates the repetitive operations of the difference calculating means and the physical quantity correcting means for each physical source by using the first repetition controlling means; and employs the physical quantities of each physical source which are finally obtained as the physical quantities corresponding to each physical source by using a physical quantity employment means.

Therefore, determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing apparatus according to claim 20, the apparatus analyzes a physical quantity $u_i$ corresponding to a physical source i based upon an actual physical qunatity $S_j$ measured at plural measurement points j which are spaced apart from the physical source i. In this case, a physical quantity, which is measurable at plural measurement points j, which positions are known, and which positions are spaced apart from individual physical source i whose position is known, can be calculated based upon predetermined operations which involve the physical quantity $u_i$ of the physical source i and wherein the physical quantity $S_j$ measurable at the plural measurement points j spaced apart from the physical source i are in a linear system. The apparatus:

predetermines constants $\alpha_{ij}$ each of which represents a physical field measurable at each predetermined position which is generated by a physical source and which physical source has a unit quantity corresponding to the individual physical source by the means (1) for predetermining constants, provisionally determines a physical quantity $u_i$ corresponding to each physical source by the means (2) for provisionally determining physical quantity, calculates a physical quantity $O_j$ which is predicted at the measurement point j by carrying out the operation of the equation:

$$O_j = \sum_{i=1}^{m} \alpha_{ij} \cdot u_i \quad (1)$$

by the means (3) for calculating physical quantity, calculates a difference $S_j - O_j$ between an actual measurement value $S_j$ at the measurement point j and the physical quantity $O_j$ by the means (4) for calculating difference, obtains a physical quantity $u_i$ as a provisional solution by carrying out operation of the equation $$u_i = u_i + \sum_{j=1}^{n} \{\alpha_{ij}(S_j - O_j)\} / \sum_{j=1}^{n} \alpha_{ij}^2 \quad (2)$$

by the means (5) for obtaining physical quantity, carries out the processing of each of the means (3) to (5) for each physical source i by the means (6) for carrying out the operation of the means (3) to (5), iteratively repeats processing of each of the means (3) to (5) until the sum of the squares of the differences $S_j - O_j$ is less than a predetermined threshold value by the means (7) for continuing the repeating operation of the processing of each of the means (3) to (5), and employs the physical quantity $u_i$ of each physical source which is finally obtained by the means (8) for employing physical quantity.

Therefore, determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing apparatus according to claim 21, the apparatus analyzes physical quantities of magnetic sources within an object to be measured by measuring a magnetic field which is generated by the object using plural magnetic field sensors. The apparatus:

predetermines constants $\alpha_{ij}$ each of which represents a magnetic field, which is generated at each predetermined position by a magnetic field source having a unit quantity corresponding to the individual magnetic field source by the means (1) for predetermining constants, provisionally determine a physical quantity $u_i$ for each magnetic field source corresponding to a lattice point k (k=1, 2, . . . , p) within the object by the means (2) for provisionally determining physical quantity, calculates a magnetic field $O_j$ which is anticipated at the measurement point j by carrying out the operation of the equation $$O_j = \sum_{i=1}^{m} \alpha_{ij} \cdot u_i \quad (1)$$

by the means (3) for calculating magnetic field, calculates a difference $S_j - O_j$ between an actual measurement value $S_j$ of magnetic field at the measurement point j and the magnetic field $O_j$ determined by the means (4) for calculating difference, obtains a physical quantity $u_i$ as a provisional solution by carrying out operation of the equation:

$$u_i = u_i + \sum_{j=1}^{n} \{\alpha_{ij}(S_j - O_j)\} / \sum_{j=1}^{n} \alpha_{ij}^2 \quad (2)$$

by the means (5) for obtaining physical quantity, carries out the processing by each of the means (3) to (5) for each magnetic field source by the means (6) for carrying out the processing by each of the means (3) to (5), iteratively repeats processing of each of the means (3) to (5) until the sum of the squares of the differences $S_j - O_j$ is less than a predetermined threshold value by the means (7) for repeating the processing by each of the means (3) to (5), and employs the physical quantity $u_i$ which is finally obtained as the physical quantity $u_i$ corresponding to each physical source which is finally obtained as analysis result by the means (8) for employing physical quantity.

Therefore, determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing apparatus according to claim 22, the current component in an x-direction and a current component in a y-direction are represented by the formula $$u_i = \begin{cases} P_{xi} (i=1, 2, \ldots, p) \\ P_{yi} (i=p+1, p+2, \ldots, 2p) \end{cases} \quad (3)$$

are employed for a physical quantity $u_i$, and a constant given by the formula:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ \quad (i = p+1, p+2, \ldots, 2p) \end{cases} \quad (4)$$

is employed as a constant $\alpha_{ij}$. The current components in x- and y-directions at each lattice point are analyzed by measuring z-direction components of a magnetic field.

As to the physical quantity analyzing apparatus according to claim 23, the apparatus analyzes a physical quantity corresponding to each physical source which is expected to be observed at a predetermined position which is caused by the physical quantities of the physical sources. The physical quantities measurable at arbitrary positions spaced apart from the individual physical source can be calculated based upon operation of formulae which involve factors corresponding to physical quantities of physical sources, wherein physical quantities measurable at the arbitrary positions spaced apart from at least one physical sources are in a linear system. The apparatus measures a physical quantity at a predetermined position which is close to at least one physical source by using a physical quantity measuring means. Then, the apparatus provisionally determine degrees, each of which represents an influence at the predetermined position resulting from the physical source, by using a provisional degree determining means; thereafter calculates a difference between a measured physical quantity at each predetermined position and a sum of products of each measured physical quantity and corresponding degree by the difference calculating means; thereafter employs a value which minimize the sum of squares of differences as a new physical quantity based upon the calculated differences and each physical quantity measurement value by using a physical quantity correcting means; repetitively operates the difference calculating means and the physical quantity correcting means for each physical source by a first repetition controlling means; and iterates the repetition of the difference calculating means and the physical quantity correcting means by the first repetition controlling means for each physical source until the sum of the squares of the differences which is obtained by the repetition of the processings becomes smaller than a predetermined threshold value. The final values achieved for the physical quantities of each physical source which should be observed at the predetermined positions by the physical quantity employment means are then output as needed.

Therefore, determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing apparatus according to claim 24, the apparatus involves analyzing a physical quantity of a passive physical source which influences a physical quantity which should be observed at a predetermined position caused by physical quantities of active physical sources. The physical quantities measurable at arbitrary positions spaced apart from the active physical sources can be calculated based upon predetermined operation formulae which include components corresponding to physical quantities of physical sources, and physical quantities measurable at the arbitrary positions spaced apart from the active physical sources are in a linear system. The apparatus measures a physical quantity of an active physical source by using a physical quantity measuring means, provisionally determines a physical quantity of the passive physical source by a provisional physical quantity determining means, calculates a difference between a measured physical quantity at a predetermined position and a sum of products of each measured physical quantity of the active physical source and the physical quantity of the passive physical source by using a difference calculating means, employs a value which minimizes the sum of squares of differences as a new physical quantity based upon the calculated differences and each physical quantity measurement value of each active physical source by a physical quantity correcting means, repetitively operates the difference calculating means and the physical quantity correcting means for each physical source by a first repetition controlling means, and iterates the repetition of the difference calculating means and the physical quantity correcting means by the first repetition controlling means for each physical source until the sum of the squares of the differences, which is obtained by the repetition of the processing becomes smaller than a predetermined threshold value. The apparatus may then employ the physical quantities of each physical source which are finally obtained as physical quantities of the passive physical source by using a physical quantity employment means.

Therefore, determination of the estimation gains is not necessary and the speed of solution convergence can be increased because the estimation gains are disregarded. Further, an extent of applicable physical quantities is enlarged, and analysis with high stability and high accuracy is achieved.

As to the physical quantity analyzing apparatus according to claim 25, the apparatus analyzes a physical quantity which is obtained at an arbitrary point within a region in which simultaneous linear equations, involving individual physical sources, can be realized based upon physical quantities of the individual physical sources and proportion canstants determined based upon the region. The apparatus operates by:

pre-obtaining and holding the proportion consteants which are determined based upon the region by using a proportion constant holding means, provisionally determining physical quantities at a plurality of predetermined positions by a provisional physical quantity determining means, calculating a difference between a known physical quantity corresponding to a predetermined position within the region and a sum of products of each physical quantity and corresponding proportion constant by using a difference calculating means, employing a value which minimizes the sum of squares of differences as a new physical quantity based upon the calculated differences and each physical quantity measurement value of each active physical source by using a physical quantity renewing means, repeating the calculating of the difference by the difference calculating means and the employing of the physical quantities by the physical quantity renewing means for each physical source by a first repetition controlling means, and iterating the repetition of the calculating of the difference by the difference calculating means and employing of the physical quantities for each physical source until the sum of the squares of the differences which is obtained by the repetition of the processing becomes smaller than a predetermined threshold value, and then employing the physical quantity which is finally obtained as physical quantity for the predetermined position by a physical quantity employment means.

Therefore, determination of the estimation gains is not necessary and the speed of solution convergence can be increased because the estimation gains are disregarded. Further, an extent of applicable physical quantities is enlarged, and analysis with high stability and high accuracy is achieved. Furthermore, an operating load is significantly decreased and the time required for physical source analysis is significantly shortened.

As to the physical quantity analyzing apparatus according to claim 26, the apparatus employs means for calculating the sum of products of each physical quantity and a corresponding proportion constant which obtains a new sum by correcting a physical quantity which was most recently employed, based upon a product of a difference between the new physical quantity and the physical quantity which was most recently employed, and corresponding proportion constant, for every repetition processed by a first repetition controlling means, after a calculation of the sum of the products of each physical quantity and corresponding proportion constant is obtained, an operation load for calculating the sum in the repeating processing is significantly decreased so that the time required for analyzing physical quantity is shortened.

As to the physical quantity analyzing apparatus according to claim 27, the apparatus employs a difference calculating means which obtains a new difference based upon a product of a difference between the new physical quantity and the physical quantity which was most recently employed and a corresponding proportion constant, for each repetition processing by using a first repetition controlling means, after a calculation of the difference between the sum calculated by a means for calculating the sum of the products of each physical quantity and corresponding proportion constant, and the actual physical quantity at each predetermined position is obtained, an operation load for calculating the difference is significantly decreased so that a time required for analyzing physical quantity is shortened. Further, a memory capacity is decreased because a memory for holding the sum becomes unnecessary.

As to the physical quantity analyzing apparatus according to claim 28, the proportion constants are inverses: $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistors which are connected in x, y, z-directions to each lattice point $[k_x, k_y, k_z]$ of $N_x \times N_y \times N_z$ number of lattice points, and a sum $G_N[k_x, k_y, k_z]$ corresponding to actually connected resistances to the lattice point $[k_x, k_y, k_z]$ which sum $G_N$ is represented by the equation $$G_N[k_x, k_y, k_z] = G_x[k_x-1, k_y, k_z] + G_x[k_x, k_y, k_z] + G_y[k_x, k_y-1, k_z] + G_y[k_x, k_y, k_z] + G_z[k_x, k_y, k_z-1] + G_z[k_x, k_y, k_z], \quad (5)$$

the actual physical quantities are supplied current $S[k_x, k_y, k_z]$ and flowing out current $O[k_x, k_y, k_z]$ at the lattice point $[k_x, k_y, k_z]$, and the physical quantities which are the objects of analysis, are potentials $u[k_x, k_y, k_z]$ at each lattice point $[k_x, k_y, k_z]$. The apparatus obtains $(N_x-1) \times N_y \times N_z$ number of $G_x[k_x, k_y, k_z]$ by the means (1) for obtaining $(N_x-1) \times N_y \times N_z$ number of $G_x[k_x, k_y, k_z]$, obtains $N_x \times (N_y-1) \times N_z$ number of $G_y[k_x, k_y, k_z]$ by the means (2) for obtaining $N_x \times (N_y-1) \times N_z$ number of $G_y[k_x, k_y, k_z]$, obtains $N_x \times N_y \times (N_z-1)$ number of $G_z[k_x, k_y, k_z]$ by the means (3) for obtaining $N_x \times N_y \times (N_z-1)$ number of $G_z[k_x, k_y, k_z]$, obtains $N_x \times N_y \times N_z$ number of $G_N[k_x, k_y, k_z]$ by the means (4) for obtaining $N_x \times N_y \times N_z$ number of $G_N[k_x, k_y, k_z]$, obtains $N_x \times N_y \times N_z$ number of $\beta[k_x, k_y, k_z]$ based upon the equation $$\beta[k_x, k_y, k_z] = 1/(G_N[k_x, k_y, k_z]^2 + \quad (6)$$
$$G_x[k_x-1, k_y, k_z]^2 + G_x[k_x, k_y, k_z]^2 + G_y[k_x, k_y-1, k_z]^2 +$$
$$G_y[k_x, k_y, k_z]^2 + G_z[k_x, k_y, k_z-1]^2 + G_z[k_x, k_y, k_z]^2)$$

by the means (5) for obtaining $N_x \times N_y \times N_z$ number of $\beta[k_x, k_y, k_z]$, calculates correction values $\Delta u$ of the potentials $u[k_x, k_y, k_z]$ based upon the formula $$\Delta u \leftarrow \beta[k_x, k_y, k_z]\{G_N[k_x, k_y, k_z](S[k_x, k_y, k_z] - \quad (7)$$
$$O[k_x, k_y, k_z]) - G_x[k_x-1, k_y, k_z](S[k_x-1, k_y, k_z] - O[k_x-1, k_y, k_z]) -$$
$$G_x[k_x, k_y, k_z](S[k_x+1, k_y, k_z] - O[k_x+1, k_y, k_z]) - G_y[k_x, k_y-1, k_z]$$
$$(S[k_x, k_y-1, k_z] - O[k_x, k_y-1, k_z]) - G_y[k_x, k_y, k_z](S[k_x, k_y+1, k_z] -$$
$$O[k_x, k_y+1, k_z]) - G_z[k_x, k_y, k_z-1](S[k_x, k_y, k_z-1] -$$
$$O[k_x, k_y, k_z-1]) - G_z[k_x, k_y, k_z](S[k_x, k_y, k_z+1] - O[k_x, k_y, k_z+1])\}$$

by the means (6) for calculating correction values, corrects the potential $u[k_x, k_y, k_z]$ by adding the calculated correction value $\Delta u$ by the means (7) for correcting potentials, repeats the process for each of the means (5) and (7) from 1 to $N_z$ for $k_z$ by the means (8) for repeating process of the means (6) and (7), repeats the process for each of the means (6) to (8) from 1 to $N_y$ for $k_y$ by the means (9) for repeating process of the means (6) to (8), repeats the process for each of the means (6) to (9) from 1 to $N_x$ for $k_x$ by the means (10) for repeating process of the means (6) to (9), and repeats the process for each of the means (6) to (10) until an estimated error becomes smaller than a predetermined threshold value, and employs the potentials which are finally obtained as an analysis result by the means (11) for repeating process of the means (6) to (10).

Therefore, the interior of a living organism, or the like, can be modelled with a plurality of resistors which are interconnected to one another in a three dimensional lattice shape, and a potential at each lattice point can be analyzed in a case where a current flows into one of the lattice points and flows out from another lattice point. Further, determination of the estimation gains is not necessary and the speed of solution convergence can be increased because the estimation gains are disregarded, so that operation load is significantly reduced.

As to the physical quantity analyzing apparatus according to claim 29 wherein the potentials $u[k_x, k_y, k_z]$ of each lattice point $[k_x, k_y, k_z]$, which is the analysis result obtained by the apparatus according to claim 28, are employed as proportion constant $\alpha_{ij}$, the known physical quantities are potentials measured at a surface of a region subject to analysis, and the physical quantities subject to analysis are supplied current $S[k_x, k_y, k_z]$ and flowing out current $O[k_x, k_y, k_z]$ at each lattice point $[k_x, k_y, k_z]$ is measured and/or determined. The apparatus operates by:

provisionally determining a current which flows into one lattice point and flows out from another lattice point of a physical source which is the subject of analysis by the means (1) for provisionally determining current flowing into and current flowing out, calculating an estimated value of a potential on a surface of the region subject to analysis by multiplying the provisionally determined physical quantity and the proportion constant by the means (2) for calculating estimated value of potential, calculating a correction value for one physical quantity based upon a difference between the measured potential and the estimated value of the potential by the means (3) for calculating correction value, correcting the one physical quantity based upon the calculated correction value by the means (4) for correcting the one physical quantity, repetitively operating each of the means (2) to (4) for all physical quantities by the means (5) for repetitively operating each of the means (2) to (4), and repetitively operating each of the means (2) to (5) until an estimated error becomes smaller than a predetermined threshold value by the means (6) for iteratively operating each of the means (2) to (5). The final results are employed by the means for employing physical quantities.

Therefore, by utilizing this apparatus, the interior of a living organism, or the like, can be modelled using a plurality of resistors which are interconnected to one another in a three dimensional lattice shape. A potential at each lattice point can be analyzed for a current flowing into one of the lattice points and a current flowing out from another lattice point. Analysis of the lattice point into which the current flows and the lattice points from which the current flows is performed based upon the analysis result and potentials which are measured on a surface of the living organism, or the like. Further, determination of the estimation gains is not necessary and the speed of solution convergence can be increased because the estimation gains are disregarded, so that operation load is significantly reduced.

As to the physical quantity analyzing apparatus according to claim 30, the apparatus:

selects two physical quantities from among a plurality of physical quantities by the means (1) for selecting two physical quantities, calculates a correction value for each physical quantity based upon the formula $$\Delta u_i = \sum_{j=1}^{n} \{\alpha_{ij}(S_j - O_j)\} / \sum_{j=1}^{n} \alpha_{ij}^2 \quad (8)$$

by the means (2) for calculating a correction value, corrects corresponding physical quantities based upon each calculated correction value by the means (3) for correcting a corresponding physical quantity, corrects a first physical quantity by operating each of the means (2) and (3) by the means (4) for correcting a first physical quantity, corrects a second physical quantity by operating each of the means (2) and (3) by the means (5) for correcting a second physical quantity, corrects the first physical quantity again by operating each of the means (2) and (3) by the means (6) for correcting a first physical quantity again, calculates a correction value for correcting the second physical quantity again, by operating the means (2) by the means (7) for correcting a second physical quantity again, calculates a correction value by the means (8) for calculating a correction value for the first physical quantity for the first physical quantity by dividing a product of the correction values which are obtained by operating each of the means (6) and (7) by a difference between the correction value which is obtained by operating the means (4) and the correction value obtained by operating the means (6), calculates a correction value by the means (9) for calculating a correction value for the second physical quantity for the second physical quantity by dividing a product of the correction values which are obtained by operating each of the means (5) and (7) by a difference between the correction value which is obtained by operating the means (4) and the correction value which is obtained by operating the means (6), corrects the physical quantities based upon one of the correction values which are obtained by operating each of the means (8) and (9) by the means (10) for correcting the physical quantities, selects other two physical quantities and for operating each of the means (4) to (10) by the means (11) for selecting other two physical quantities, and repetitively operates each of the means (4) to (11) until an estimated error becomes smaller than a predetermined threshold value, and employs the physical quantities which are obtained as the analysis result by the means (12) for iteratively operating each of means (4) to (11).

Therefore, correction values are calculated once for the one of two physical quantities which are arbitrarily selected, and twice for the two additional physical quantities, and the physical quantities finally reached are immediately calculated by repeating the correction based upon the calculated correction values. Therefore, the processing load is significantly reduced and the required time is significantly shortened.

As to the physical quantity analyzing apparatus according to claim 31, the apparatus further comprises:

means for calculating the estimated errors of $D[k_x, k_y, k_z] = (S[k_x, k_y, k_z] - O[k_x, k_y, k_z])$, $D[k_x-1, k_y, k_z] = (S[k_x-1, k_y, k_z] - O[k_x-1, k_y, k_z])$, $D[k_x+1, k_y, k_z] = (S[k_x+1, k_y, k_z] = O[k_x+1, k_y, k_z])$, $D[k_x, k_y-1, k_z] = (S[k_x, k_y-1, k_z] - O[k_x, k_y, k_z])$ $D[k_x, k_y+1, k_z] = (S[k_x, k_y+1, k_z] - O[k_x, k_y+1, k_z])$, $D[k_x, k_y, k_z-1] = (S[k_x, k_y, k_z-1] - O[k_x, k_y, k_z-1])$ $D[k_x, k_y, k_z+1] = (S[k_x, k_y, k_z+1] - O[k_x, k_y, k_z+1])$ and means for correcting the estimated errors based upon the formulae $D[k_x, k_y, k_z] \leftarrow (D[k_x, k_y, k_z] + G_N[k_x, k_y, k_z])\Delta u$ $D[k_x-1, k_y, k_z] \leftarrow (D[k_x-1, k_y, k_z] + G_x[k_x-1, k_y, k_z])\Delta u$ $D[k_x+1, k_y, k_z] \leftarrow (D[k_x+1, k_y, k_z] + G_x[k_x, k_y, k_z])\Delta u$ $D[k_x, k_y-1, k_z] \leftarrow (D[k_x, k_y-1, k_z] + G_y[k_x, k_y-1, k_z])\Delta u$ $D[k_x, k_y+1, k_z] \leftarrow (D[k_x, k_y+1, k_z] + G_y[k_x, k_y, k_z])\Delta u$ $D[k_x, k_y, k_z-1] \leftarrow (D[k_x, k_y, k_z-1] + G_z[k_x, k_y, k_z-1])\Delta u$ $D[k_x, k_y, k_z+1] \leftarrow (D[k_x, k_y, k_z+1] + G_z[k_x, k_y, k_z])\Delta u \quad (9)$, wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are employed instead of $(S[k_x, k_y, k_z]-O[k_x, k_y, k_z])$, $(S[k_x-1, k_y, k_z]-O[k_x-1, k_y, k_z])$, $(S[k_x+1, k_y, k_z]-O[k_x+1, k_y, k_z])$, $(S[k_x, k_y-1, k_z]-O[k_x, k_y-1, k_z])$, $(S[k_x, k_y+1, k_z]-O[k_x, k_y+1, k_z])$, $(S[k_x, k_y, k_z-1]-O[k_x, k_y, k_z-1])$, $(S[k_x, k_y, k_z+1]-O[k_x, k_y, k_z+1])$, in the formula $$\Delta u \leftarrow \beta[k_x, k_y, k_z]\{G_N[k_x, k_y, k_z] (S[k_x, k_y, k_z] - \quad (7)$$
$$O[k_x, k_y, k_z]) - G_x[k_x-1, k_y, k_z] (S[k_x-1, k_y, k_z] - O[k_x-1, k_y, k_z]) -$$
$$G_x[k_x, k_y, k_z] (S[k_x+1, k_y, k_z] - O[k_x+1, k_y, k_z]) - G_y[k_x, k_y-1, k_z]$$
$$(S[k_x, k_y-1, k_z] - O[k_x, k_y-1, k_z]) - G_y[k_x, k_y, k_z] (S[k_x, k_y+1, k_z] -$$
$$O[k_x, k_y+1, k_z]) - G_z[k_x, k_y, k_z-1] (S[k_x, k_y, k_z-1] -$$
$$O[k_x, k_y, k_z-1]) - G_z[k_x, k_y, k_z] (S[k_x, k_y, k_z+1] - O[k_x, k_y, k_z+1])\}$$

and it is sufficient that $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are held in a memory instead of holding $S[k_x, k_y, k_z]$, $S[k_x-1, k_y, k_z]$, $S[k_x+1, k_y, k_z]$, $S[k_x, k_y-1, k_z]$, $S[k_x, k_y+1, k_z]$, $S[k_x, k_y, k_z-1]$, $S[k_x, k_y, k_z+1]$ and $O[k_x, k_y, k_z]$, $O[k_x-1, k_y, k_z]$, $O[k_x+1, k_y, k_z]$, $O[k_x, k_y-1, k_z]$, $O[k_x, k_y+1, k_z]$, $O[k_x, k_y, k_z-1]$, $O[k_x, k_y, k_z+1]$ so that memory capacity can be decreased. In the repeat processing operations of $(S[k_x, k_y, k_z]-O[k_x, k_y, k_z])$, $(S[k_x-1, k_y, k_z]-O[k_x-1, k_y, k_z])$, $(S[k_x+1, k_y, k_z]-O[k_x+1, k_y, k_z])$, $(S[k_x, k_y-1, k_z]-O[k_x, k_y-1, k_z])$, $(S[k_x, k_y+1, k_z]-O[k_x, k_y+1, k_z])$, $(S[k_x, k_y, k_z-1]-O[k_x, k_y, k_z-1])$, $(S[k_x, k_y, k_z+1]-O[k_x, k_y, k_z+1])$ are not necessarily performed, but the estimated errors are easily corrected using the calculated correction values so that operations are simplified and the time required for correcting estimated errors is shortened.

As to the physical quantity analyzing apparatus according to claim 32, the apparatus employs physical quantity calculating means which employs a normalized function of a function representing a sum of squares of a calculated difference instead of the calculated difference. Opening degrees of the functions which have characteristics of a parabola are unified to be 1 so that the speed of solution convergence is further raised.

As to the physical quantity analyzing apparatus according to claim 33, the apparatus employs a means which employs a value which minimizes the sum of squares of the difference as a new physical quantity instead of the means which employs a value which minimizes the sum of the squares of the difference as a new physical quantity. An operation which is similar to that of one of claims 18 through 32 is performed when the known physical quantities are error free.

As to the physical quantity analyzing apparatus according to claim 34, the apparatus employs a means which iteratively repeats the calculation of the difference and the employment of the physical quantities $u_i$ for each physical source until the sum of the absolute values of the differences which is obtained by the repetition of the processing becomes smaller than a predetermined threshold value, instead of the means which repeats the repetition of the calculating of the difference and the employing of the physical quantities $u_i$ for each physical source until the sum of the squares of the differences which is obtained by the repetition of the processings becomes smaller than a predetermined threshold value, an operation which is similar to that of one of claims 18 through 33 is performed when the known physical quantities include no errors.

BRIEF DESCRIPTION OF THE DRAWINGS

FIG. 11(A) is a diagram illustrating a waveform of an electrocardiogram in which an alternate current component having a frequency of 50 Hz is mixed;

FIG. 11(B) is a diagram illustrating a waveform of an electrocardiogram which is obtained by reducing the alternating current component from the electrocardiogram in FIG. 11(A);

FIG. 13(A) is a diagram illustrating a waveform of a radiated sound wave;

FIG. 13(B) is a diagram illustrating a waveform of a received sound wave;

FIG. 13(C) is a diagram illustrating an impulse response estimation result when no noise exists;

FIG. 13(D) is a diagram illustrating an impulse response estimation result when noises exist;

BEST MODE FOR PERFORMING THE INVENTION

Hereinafter, referring to the attached drawings, the present invention is explained in detail.

Figure 1:
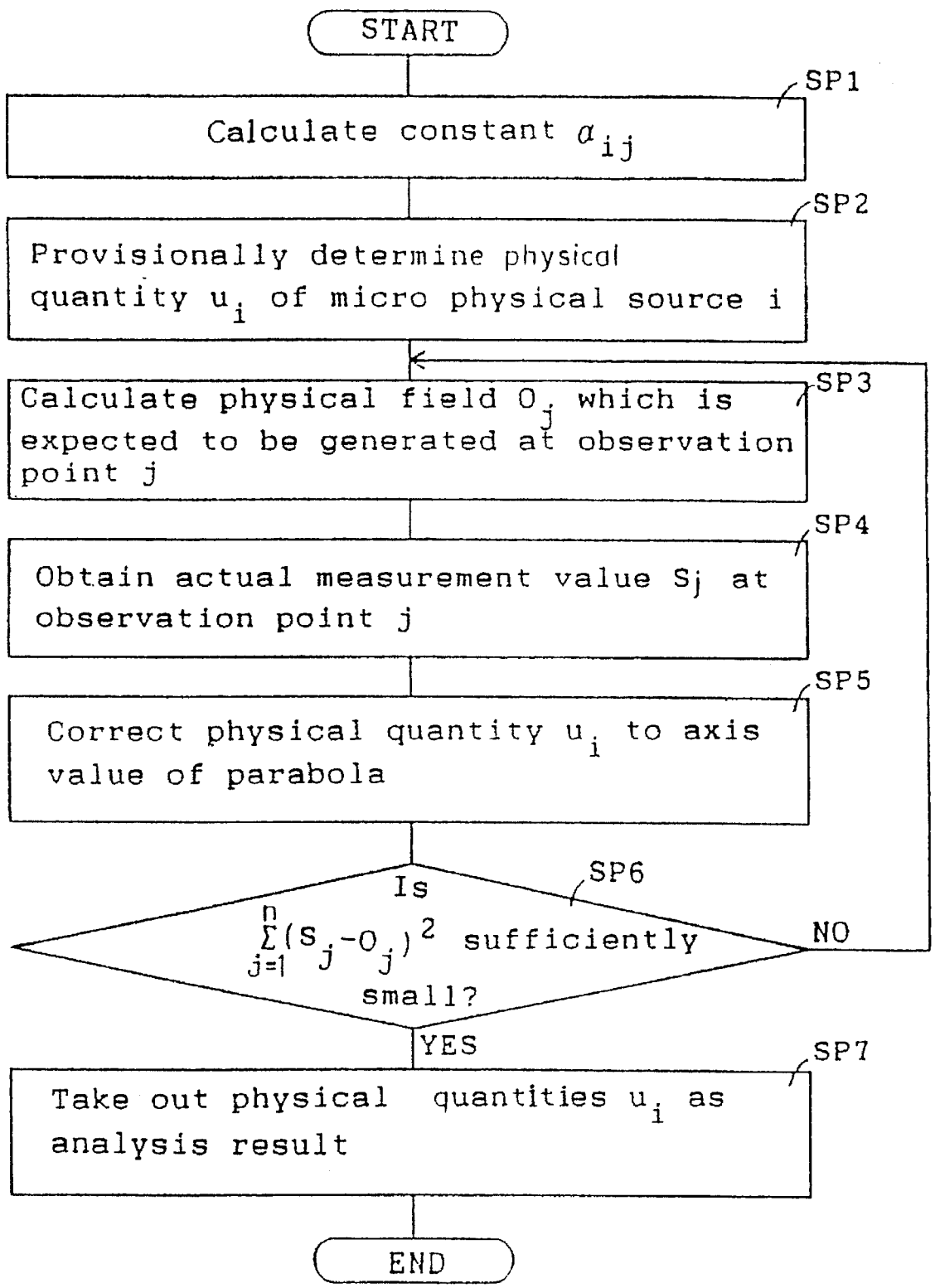
FIG. 1 is a flowchart illustrating a physical quantity analyzing method according to an embodiment of the present invention.

FIG. 1 is a flowchart illustrating a physical quantity analyzing apparatus according to an embodiment of the present invention.

When the positions of a plurality (m-number) of micro physical sources, and the positions of a plurality (n-number) of observation points are determined, respectively, and when a system is a linear system, in step SP1, constants $\alpha_{ij}$ are calculated from positional relationships between each micro physical source i (i=1, 2, ..., m) and each observation point j (j=1, 2, ..., n). In step SP2, a physical quantity $u_i$ of each micro physical source i is provisionally determined (for example, all physical quantities are determined to be 0). In step SP3, a physical field $O_j$ which is expected to exist at the observation point j is calculated by performing the operation of the equation:

$$O_j = \sum_{i=1}^{m} \alpha_{ij} \cdot u_i \qquad (1)$$

in step SP4, an actual physical field measurement value $S_j$ at the observation point j is obtained.

Then in step SP5, a physical quantity $u_i$ as a provisional solution is obtained by performing the operation of the equation:

$$u_i = u_i + \sum_{j=1}^{n} \{\alpha_{ij}(S_j - O_j)\} / \sum_{j=1}^{n} \alpha_{ij}^2 \qquad (2)$$

using the constant $\alpha_{ij}$ and the difference between the actual measurement value $S_j$ and the physical field $O_j$.

The processing in steps SP3, SP4 and SP5 are sequentially carried out for each micro physical source i.

Thereafter, in step SP6, it is determined whether or not a sum of squares of the difference between the actual measurement value $S_j$ and the physical field $O_j$ has become sufficiently small. If it is determined that the sum has not become sufficiently small, the processing in step SP3 is carried out again, However, if it is determined, in step SP6, that the sum has become sufficiently small, in step SP7, the physical quantities $u_i$ which are finally obtained are outputted as an analysis result, and the series of processing is finished.

More particularly, a sum of the squares of difference between the actual measurement value $S_j$ and the physical field $O_j$ which is represented by the equation:

$$E = \sum_{j=1}^{n} (S_j - O_j)^2 \qquad (10)$$

is employed as an evaluation function E. Wherein, for a given value of $$S_j - O_j = (S_j - O_j + \alpha_{ij} u_i) - \alpha_{ij} u_i$$

the difference is separated into a term which include no unknown physical quantity $u_i$ and a term which includes an unknown physical quantity $u_i$. Therefore, the latter equation (10) is equivalent to the following equation.

$$\begin{aligned} E &= \sum_{j=1}^{n} (S_j - O_j + \alpha_{ij} u_i) - \alpha_{ij} u_i)^2 \qquad (11) \\ &= A_i^2 u_i^2 - 2A_i B_i u_i + C_i \\ &= (A_i u_i - B_i)^2 + C_i - B_i^2 \end{aligned}$$

Wherein, $A_i^2$, $A_i B_i$, and $C_i$ are given by the following equations.

$$A_i^2 = \sum_{j=1}^{n} \alpha_{ij}^2 \qquad (12)$$

$$A_i B_i = \sum_{j=1}^{n} \{\alpha_{ij}(S_j - O_j + \alpha_{ij} u_i)\} \qquad (13)$$

$$C_i = \sum_{j=1}^{n} (S_j - O_j + \alpha_{ij} u_i)^2 \qquad (14)$$

Figure 2:
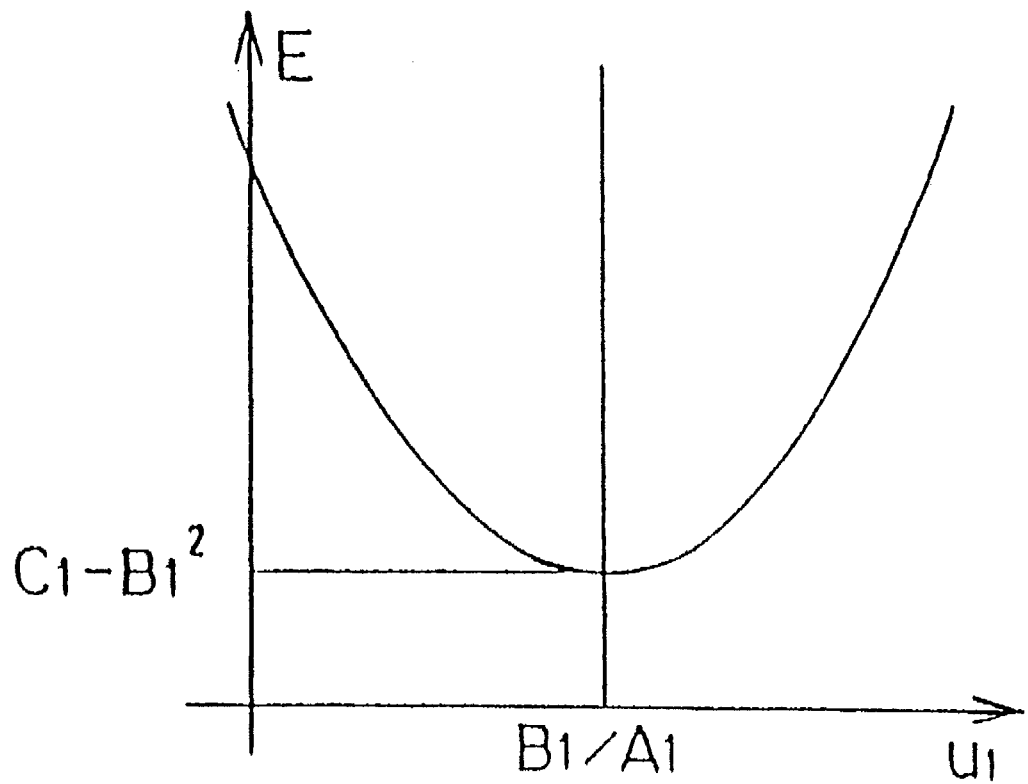
FIG. 2 is a diagram illustrating an example of an error function.

As is apparent from equation (11), the evaluation function E is parabolic and has an axis of $B_i/A_i$, and a minimum value of $C_i - B_i^2$ with respect to $u_i$ as is illustrated in FIG. 2. That is, the evaluation function is an m-th degree dimensional paraboloid in its entirety, and has a unique convergence characteristic. Therefore, correction of $u_i$ to an axis value ($u_i \leftarrow B_i/A_i$) is equivalent to asymptoticness to a solution. Further, the equation:

$$u_i = u_i + \sum_{j=1}^{n} \{\alpha_{ij}(S_j - O_j)\} / \sum_{j=1}^{n} \alpha_{ij}^2 \qquad (2)$$

is obtained by substituting the latter equations (12) and (13) for the correction formula so as to obtain a result and by putting the result in order.

Figure 3:
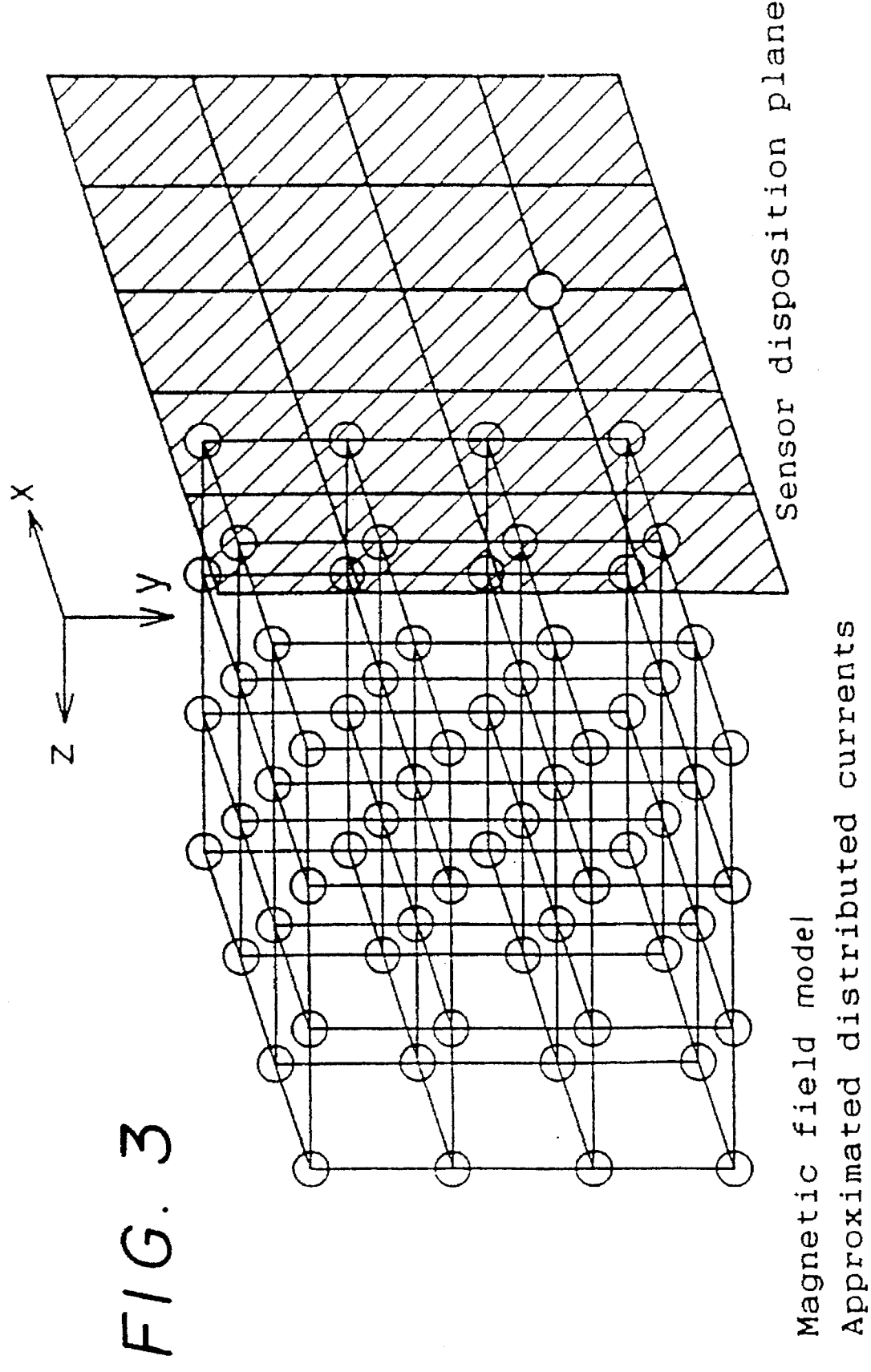
FIG. 3 is a schematic view illustrating a relationship between a magnetic source model which has approximated its distributed currents using a lattice shape and a magnetic sensor disposition plane.

FIG. 3 is a schematic diagram illustrating a relationship between a magnetic sensor disposition plane and a magnetic source model which approximates distributed currents in a lattice shape. FIG. 3 illustrates the relationship between the magnetic sensor disposition plane and the magnetic source model when magnetic fields generated from an object are detected by magnetic sensors and distributed currents within the object are measured based upon the detected magnetic fields.

In FIG. 3, assume that n-number of magnetic sensors are disposed for m-number of magnetic fields. When z-direction components of the magnetic fields are measured, the magnetic sources have x- and y-direction current components. Further when a target region is approximated by p-number of three dimensional grids or nodes (lattice points), two independent current dipoles in the x- and y-directions are assigned to each grid coordinate. That is, m=2p.

It is assumed that an x-direction current component of a grid k (k=1, 2, ..., p) is determined to be $P_{xk}$, a y-direction current component of a grid k (k=1, 2, ..., p) is determined to be $P_{yk}$, a coordinate of the grid is determined to be $(x_k, y_k, z_k)$, and a coordinate of an observation point j is determined to be $(x_j, y_j, z_j)$. It is also assumed that a diameter of a pickup coil of a magnetic sensor is disregarded and that a flux density at the center of the pickup coil is measured so that $\alpha_{ij}$ becomes the equation:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ \quad (i = p+1, p+2, \ldots, 2p) \end{cases} \quad (4)$$

from Biot-Savart's law under the equation:

$$u_i = \begin{cases} P_{xi} \ (i = 1, 2, \ldots, p) \\ P_{yi} \ (i = p+1, p+2, \ldots, 2p) \end{cases} \quad (3)$$

When the assumptions are made as above, a system is a linear system similar to the equation:

$$O_j = \sum_{i=1}^{m} \alpha_{ij} \cdot u_i \quad (1)$$

processing which is similar to the above processing is carried out so that distributed currents within a magnetic source are calculated.

To stabilize the estimation by the equation:

$$u_i = u_i + \sum_{j=1}^{n} \{\alpha_{ij}(S_j - O_j)\} / \sum_{j=1}^{n} \alpha_{ij}^2 \quad (2)$$

an opening degree of each parabola is unified to be 1 by previously performing normalization ($\alpha_{ij}' = \alpha_{ij}/A_i$). Further, to correct an estimated value using a normalized constant $\alpha_{ij}'$, an operation of $u_i' = u_i/A_i$ is carried out.

By carrying out the series of analyzing processings, current components at each grid are estimated at high speed with accuracy.

The embodiment is not limited to the above specific example. It is applicable to a light quantity analyzing method by employing light quantity sensors of which light collecting characteristics are known, for example. It is also applicable to various analyzing methods by employing sensors each having a directivity which is known.

Second Embodiment

Figure 4:
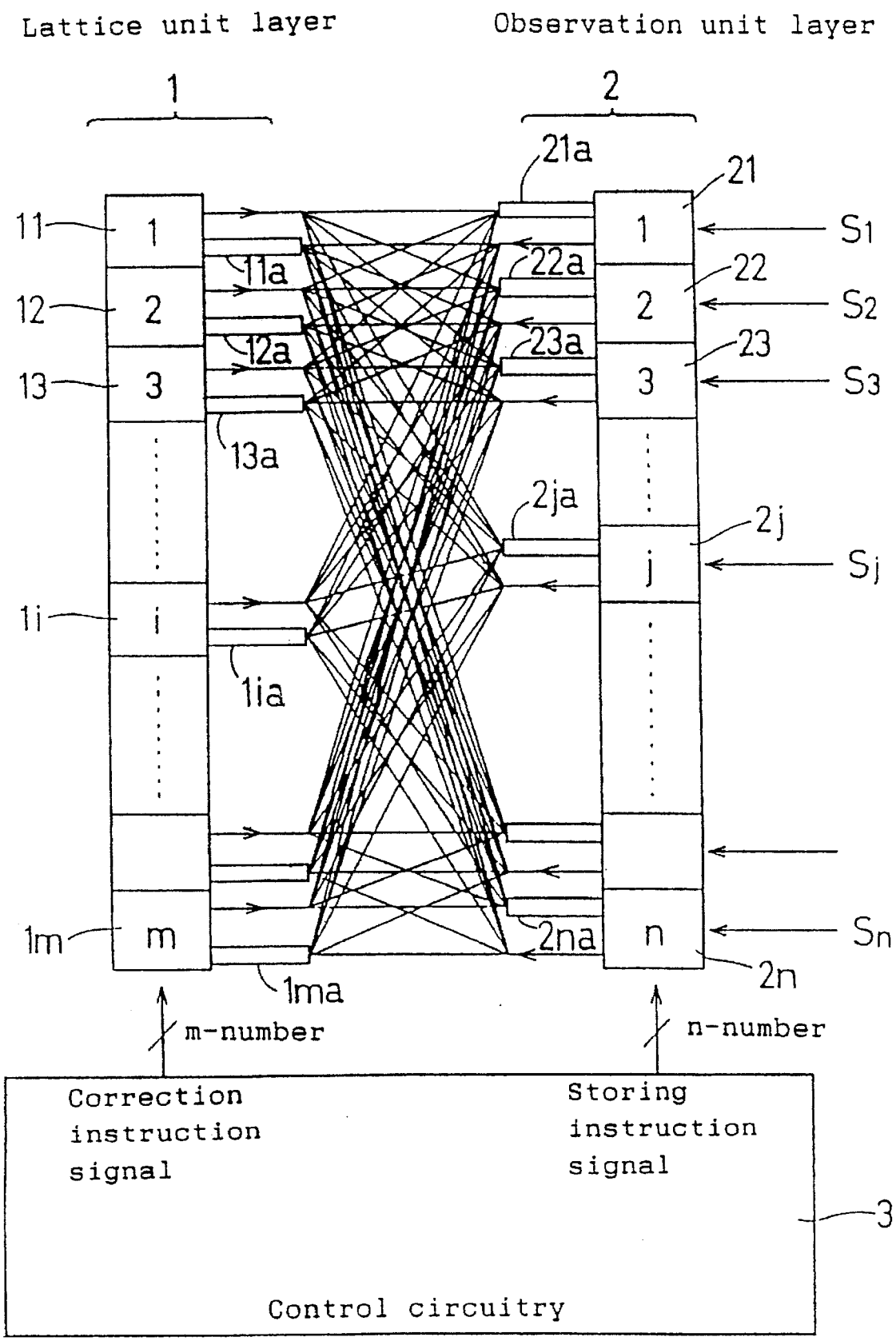
FIG. 4 is a block diagram illustrating a physical quantity analyzing apparatus according to an embodiment of the present invention.

FIG. 4 is a block diagram illustrating a physical quantity analyzing apparatus according to an embodiment of the present invention. The apparatus comprises a lattice unit layer 1 which includes lattice units 11, 12, ..., 1m, a number of which is equal to a number of physical sources selected for analysis, and correction units 11a, 12a, ..., 1ma which correspond to each lattice unit 11, 12, ..., 1m, an observation unit layer 2, which includes observation units 21, 22, ..., 2n a number of which is equal to a number of observation points, and physical field operation units 21a, 22a, ..., 2na which correspond to each observation unit 21, 22, ..., 2n, and control circuitry 3 which controls the lattice unit layer 1 and the observation unit layer 2. The control circuitry 3 simultaneously supplies a storing instruction signal to all observation units 21, 22, ..., 2n, and sequentially supplies a correction instruction signal to each lattice unit 11, 12, ..., 1m.

Figure 5:
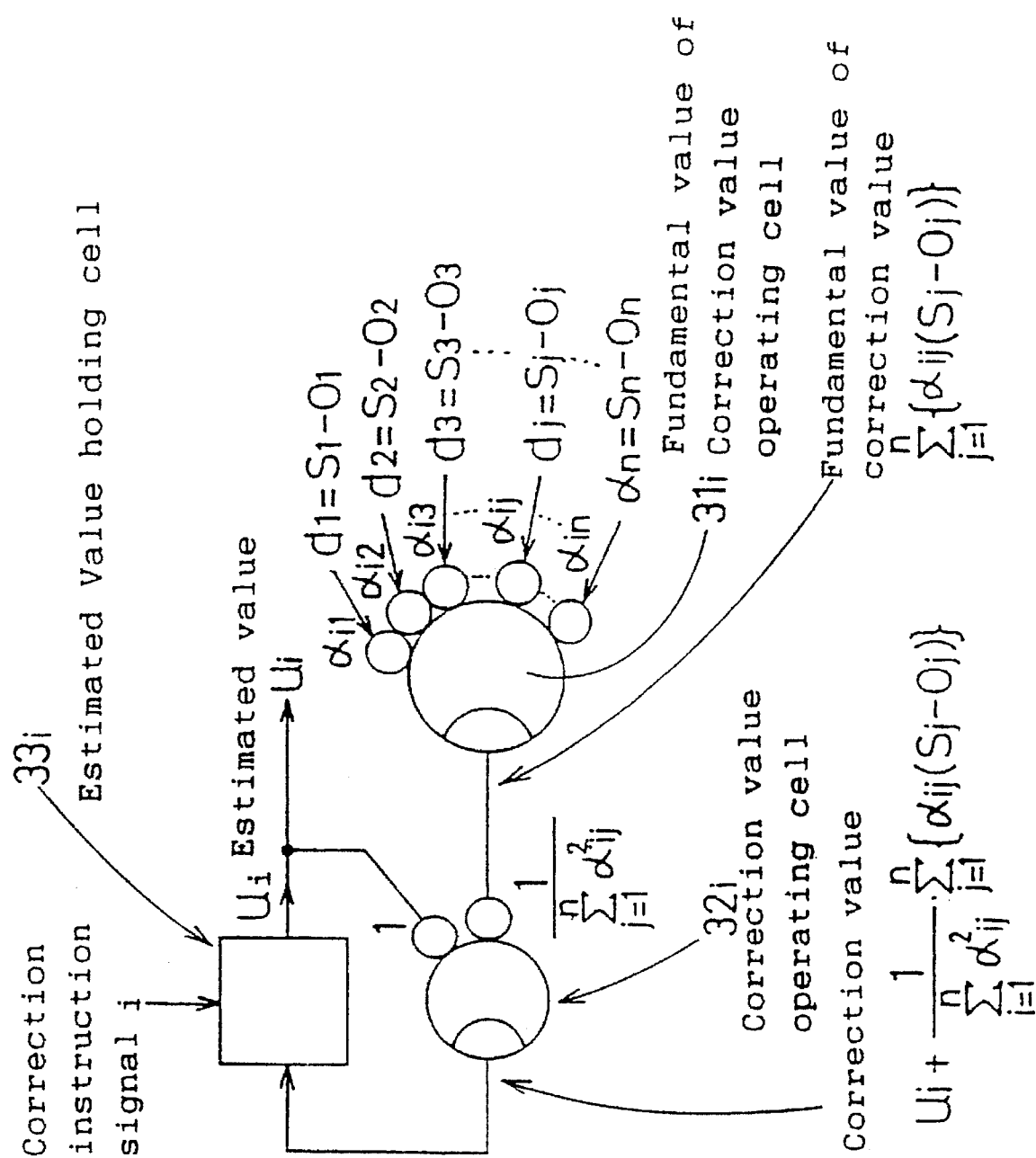
FIG. 5 is a block diagram illustrating a grid unit and a correction unit in detail.

FIG. 5 is a block diagram illustrating a lattice unit 11 and a correction unit 1ia in detail. A fundamental value of correction value operating cell 31i, a correction value operating cell 32i and an estimated value holding cell 33i are included therein.

The fundamental value of correction value operating cell 31i includes n-numbered input terminals and constant multiplying functions each of which is given to each input terminal. An output value $(S_j - O_j)$ from each observation unit 21, 22, ..., 2n is input into a corresponding input terminal. The fundamental value of correction value operating cell 31i outputs a fundamental value of correction value represented by a formula:

$$\sum_{j=1}^{n} \{\alpha_{ij}(S_j - O_j)\} \quad (15)$$

based upon the constant $\alpha_{ij}$ and the output value $(S_j - O_j)$.

The correction value operating unit 32i includes two input terminals and constant multiplying functions each of which is connected to each input terminal. One of the functions is a function for multiplying a constant of 1, while the other of the functions is a function for multiplying a constant of $$1 / \sum_{j=1}^{n} \alpha_{ij}^2. \quad (16)$$

An estimated value $u_i$ prior to the estimation for this time output from the estimated value holding cell 33i is supplied to the input terminal for multiplying the constant of 1, while a fundamental value of correction value is supplied to the other input terminal. The correction value operating cell 32i obtains a correction value represented by the equation $$u_i = u_i + \sum_{j=1}^{n} \{\alpha_{ij}(S_j - O_j)\} / \sum_{j=1}^{n} \alpha_{ij}^2 \quad (2)$$

based upon the constants and the supplied values and supplies the correction value to the estimated value holding cell 33i.

The estimated value holding cell 33i holds a new correction value supplied from the correction value operating cell 32i in response to the correction indicating signal which is supplied from the control circuitry 3.

Further, a neuron device can be employed as the fundamental value of correction value operating cell 31i. The fundamental value of correction value operating cell 31i may be constituted by employing only multipliers and adders, instead of the neuron device, because it is sufficient that a linear portion of a saturation function of a neuron device is used.

Figure 6:
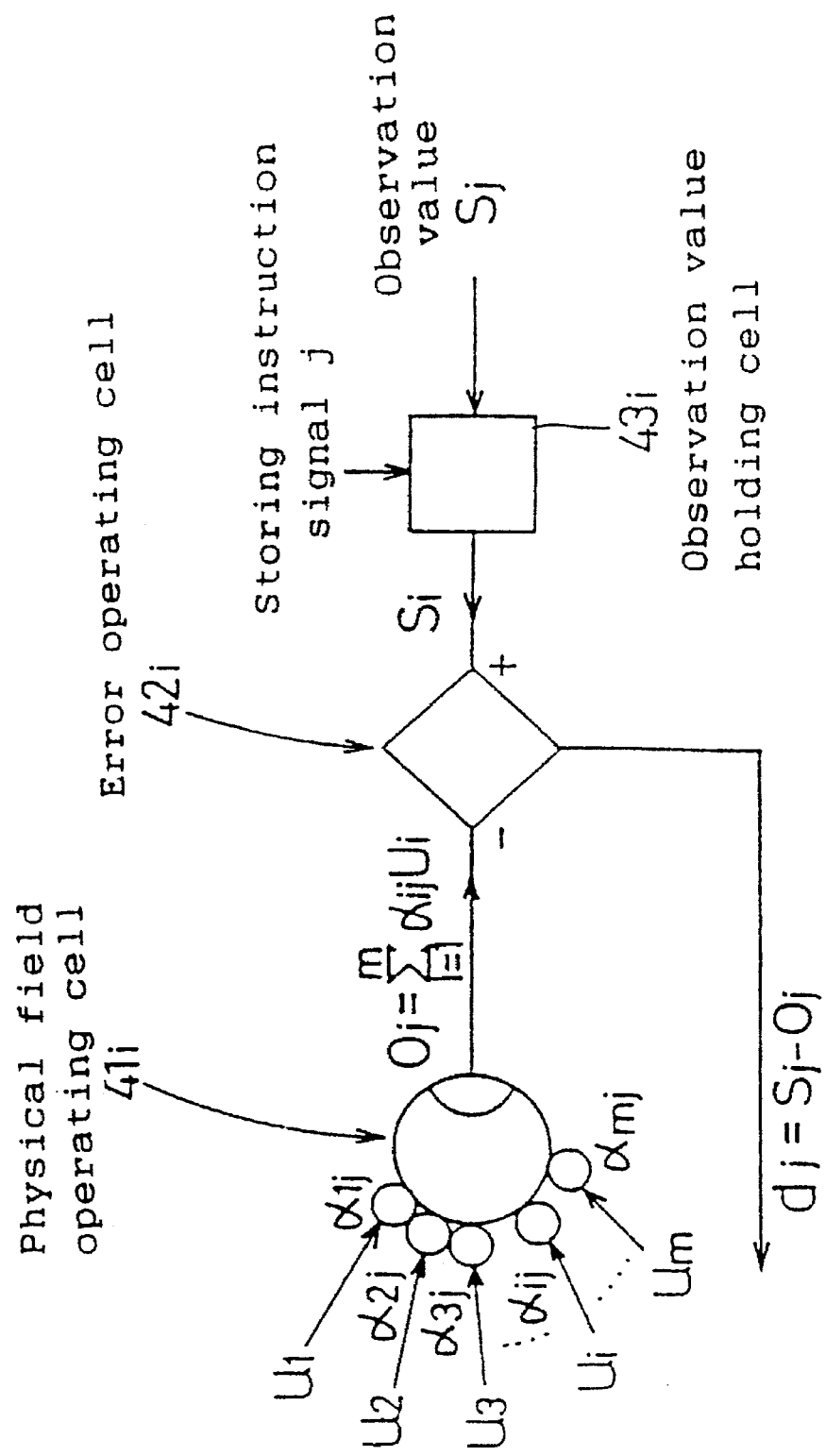
FIG. 6 is a block diagram illustrating a observation unit and a physical field operating unit in detail.

FIG. 6 is a block diagram illustrating the observation unit 2i and the physical field operating unit 2ia in detail. A physical field operating cell 41i, error operating cell 42i, and observation value holding cell 43i are included therein.

The physical field operating cell 41i includes m-numbered input terminals and constant multiplying functions, each of which is connected to each input terminal. An output value $u_i$ from each lattice unit $11, 12, \ldots, 1m$ is input to corresponding input terminal. The physical field operating cell $41i$ outputs a physical field operation value represented by the equation $$O_j = \sum_{i=1}^{m} \alpha_{ij} \cdot u_i \qquad (1)$$

based upon the constant $\alpha_{ij}$ and the output value $u_i$.

The observation value holding cell $43i$ newly holds an observation value in response to the storing indicating signal supplied from the control circuitry 3.

The error operating unit $42i$ outputs a value as an error, the value being obtained by subtracting the physical field operation value from the observation value which is detected by a sensor for detecting a physical quantity of a predetermined species.

Therefore, physical quantities are analyzed at high speed with high accuracy similar to the system illustrated by the flowchart in FIG. 1, by outputting the correction indicating signals, and storing indicating signals from the control circuitry 3.

Figure 7:
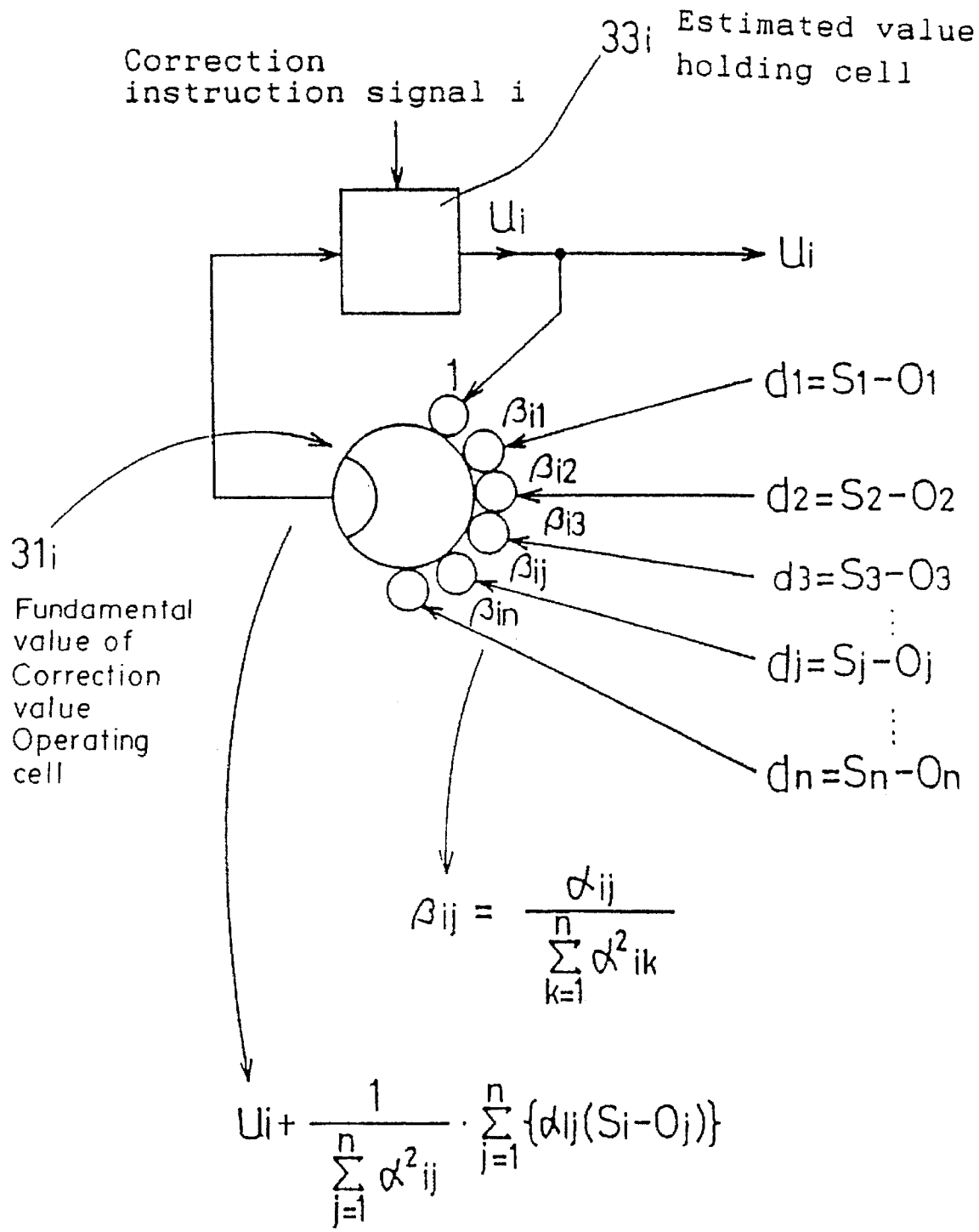
FIG. 7 is a block diagram illustrating a grid unit and a correction unit in detail.

FIG. 7 is a diagram illustrating the lattice unit $1i$ and the correction unit $1ia$ in detail. The arrangement in FIG. 7 differs from the arrangement in FIG. 6 in that the correction value operating cell $32i$ is omitted. An input terminal which receives the estimated value as input has a multiplying function based upon a constant of 1, and each of other input terminals has a multiplying function based upon a constant which is obtained by multiplying the formula:

$$1 / \sum_{j=1}^{n} \alpha_{ij}^2 \qquad (16)$$

to the constant $\alpha_{ij}$ by each input terminal in FIG. 5, so that a new correction value operating cell is constituted.

In this case, the arrangement is simplified and a function which is similar to that of the embodiment in FIG. 5 is performed.

Figure 8:
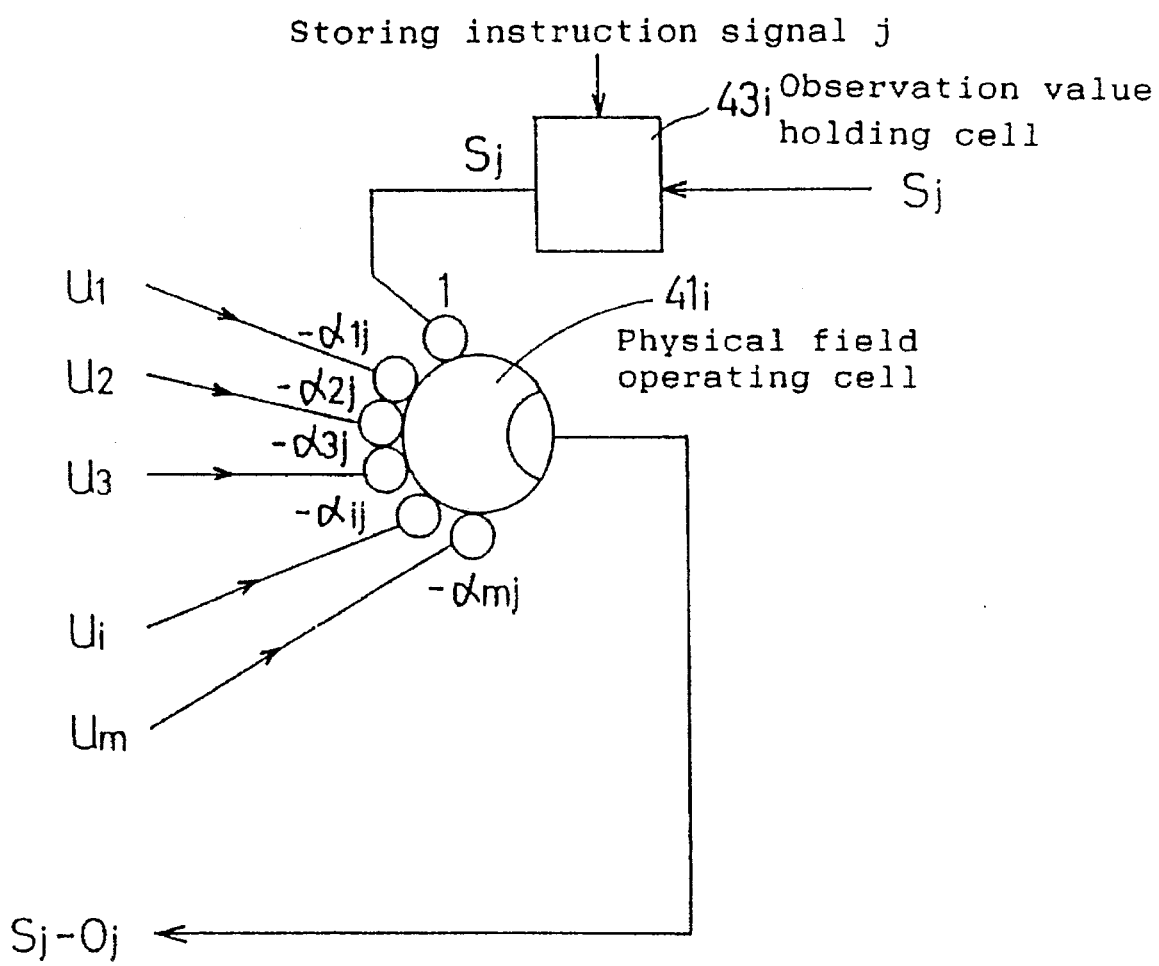
FIG. 8 is a block diagram illustrating a observation unit and a physical field operating unit in detail.

FIG. 8 is a diagram illustrating the observation unit $2i$ and the physical field operating unit $2ia$ in detail. The arrangement in FIG. 8 differs from the arrangement in FIG. 6 in that the error operating unit $42i$ is omitted. Each of the input terminals of the physical field operating unit $41i$ has a multiplying function based upon a constant which is obtained by multiplying $-1$ to the constant $\alpha_{ij}$ by each input terminal in FIG. 6, and an input terminal which receives the observation value as an input, has a multiplying function based upon a constant of 1 so that a new correction value operating cell is constituted.

In this case, the arrangement is simplified and a function which is similar to that of the embodiment in FIG. 6 is performed.

Figure 9:
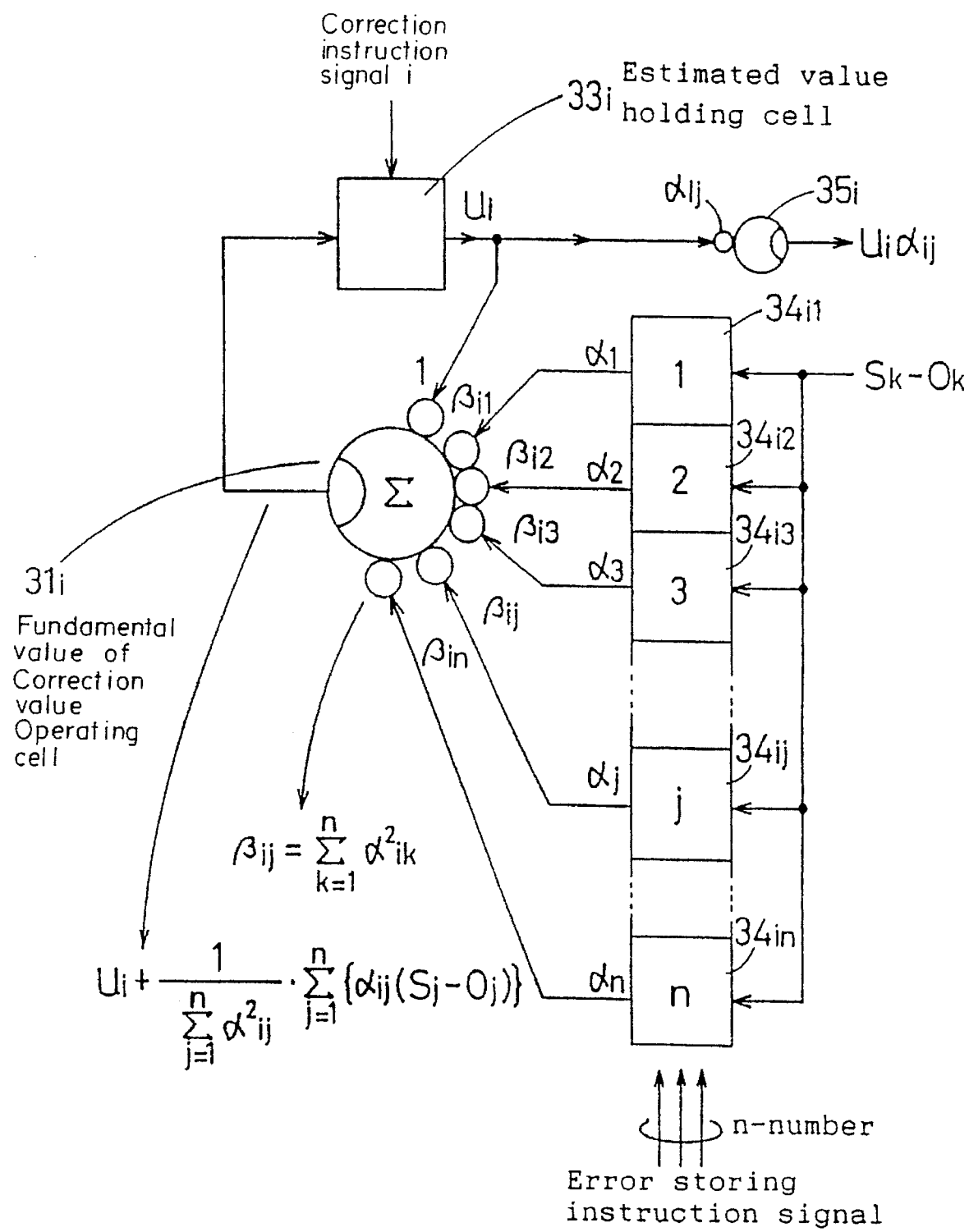
FIG. 9 is a block diagram illustrating a grid unit and a correction unit in detail.

FIG. 9 is a block diagram illustrating the lattice unit $1i$ and the correction unit $1ia$ in detail. The arrangement in FIG. 9 differs from the arrangement in FIG. 7 in that error storing cells $34i1, 34i2, \ldots, 34in$ (sample and hold circuitries, for example) for holding sequentially supplied errors, are further provided. A multiplying cell $35i$ for multiplying the constant $\alpha_{ij}$ to the estimated value $u_i$ is further provided.

In this case, the arrangement is simplified by decreasing the number of observation units to 1, and a function which is similar to that of the embodiment in FIG. 7 is performed.

Third Embodiment

Figure 10:
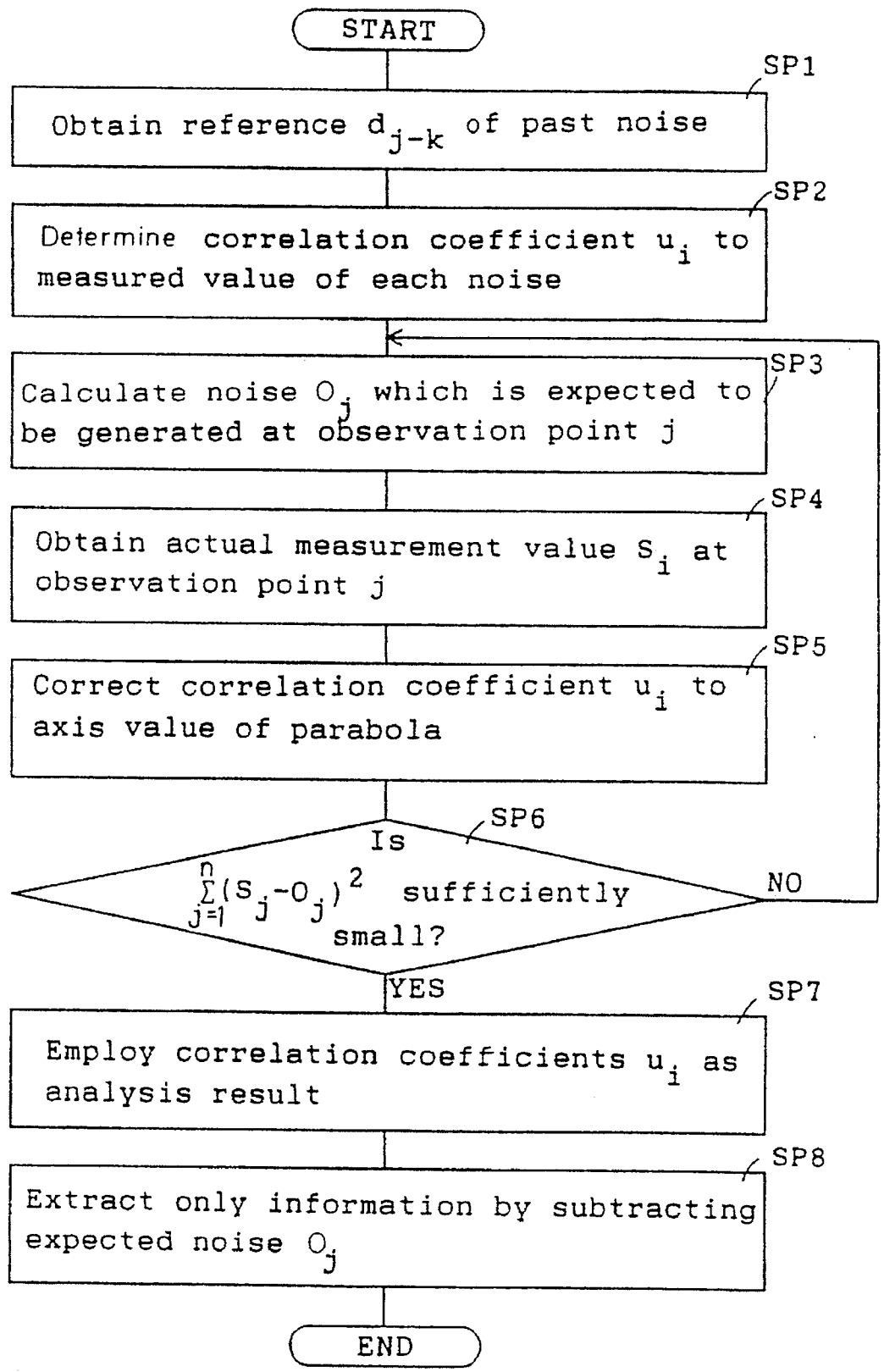
FIG. 10 is a flowchart explaining an adaptive noise cancelling method according to another embodiment of the present invention.

FIG. 10 is a flowchart portraying an adaptive noise canceling method according to another embodiment of the present invention.

In step SP1, a reference $\alpha_{j-k}$ of a past noise with respect to the present time is obtained, in step SP2, a correlation coefficient (a value representing mixing degree) $u_i$ to a measured value of each noise is provisionally determined. In step SP3, a noise $O_j$ which is anticipated at an observation point $j$ is calculated by carrying out an operation of the equation:

$$O_j = \sum_{k=0}^{m} \alpha_{j-k} u_k \qquad (17)$$

In step SP4, an actual measurement value $S_j$ at the observation point $j$ is obtained.

Then, in step SP5, a correlation coefficient $u_i$ as a provisional solution is obtained by carrying out an operation of the formula:

$$u_i = u_1 + \sum_{k=0}^{m} \{\alpha_{j-k}(S_j - O_j)\} / \sum_{k=0}^{m} \alpha_{j-k}^2 \qquad (18)$$

using the reference $\alpha_{j-k}$ and a difference between the actual measurement value $S_j$ and the expected noise $O_j$.

The processing in steps SP3, SP4 and SP5 are sequentially carried out for a noise i at all times.

Thereafter, in step SP6, it is determined whether or not a sum of squares of differences between the actual measurement value $S_j$ and the expected noise $O_j$ becomes sufficiently small. When it is determined that the sum does not become sufficiently small, the processing in step SP3 is carried out again. On the contrary, when it is determined that the sum becomes sufficiently small, in step SP7, correlation coefficients $u_i$ which have finally been obtained are employed as an analysis result. In step SP8, the only information that is extracted is by subtracting the expected noise $O_j$, which is obtained based upon the reference $\alpha_{j-k}$, and the correlation coefficient $u_i$ from a signal in which information and noise are mixed, then the series of processing is finished.

FIGS. 11(A) and 11(B) are diagrams illustrating waveforms in a noise canceling method according to a specifically adopted example.

FIGS. 11(A) and 11(B) illustrate a case in which an alternating current component by 50 Hz is reduced {refer to FIG. 11(B)} from an electrocardiogram {refer to FIG. 11(A)} in which the alternating current component is mixed.

As is apparent from FIGS. 11(A) and 11(B), it is not necessary that estimation gains (so called step sizes) should be determined as in a case of a conventional adaptive noise canceler, and an electrocardiogram with accuracy is obtained by reducing noise with high accuracy.

Fourth Embodiment

Figure 12:
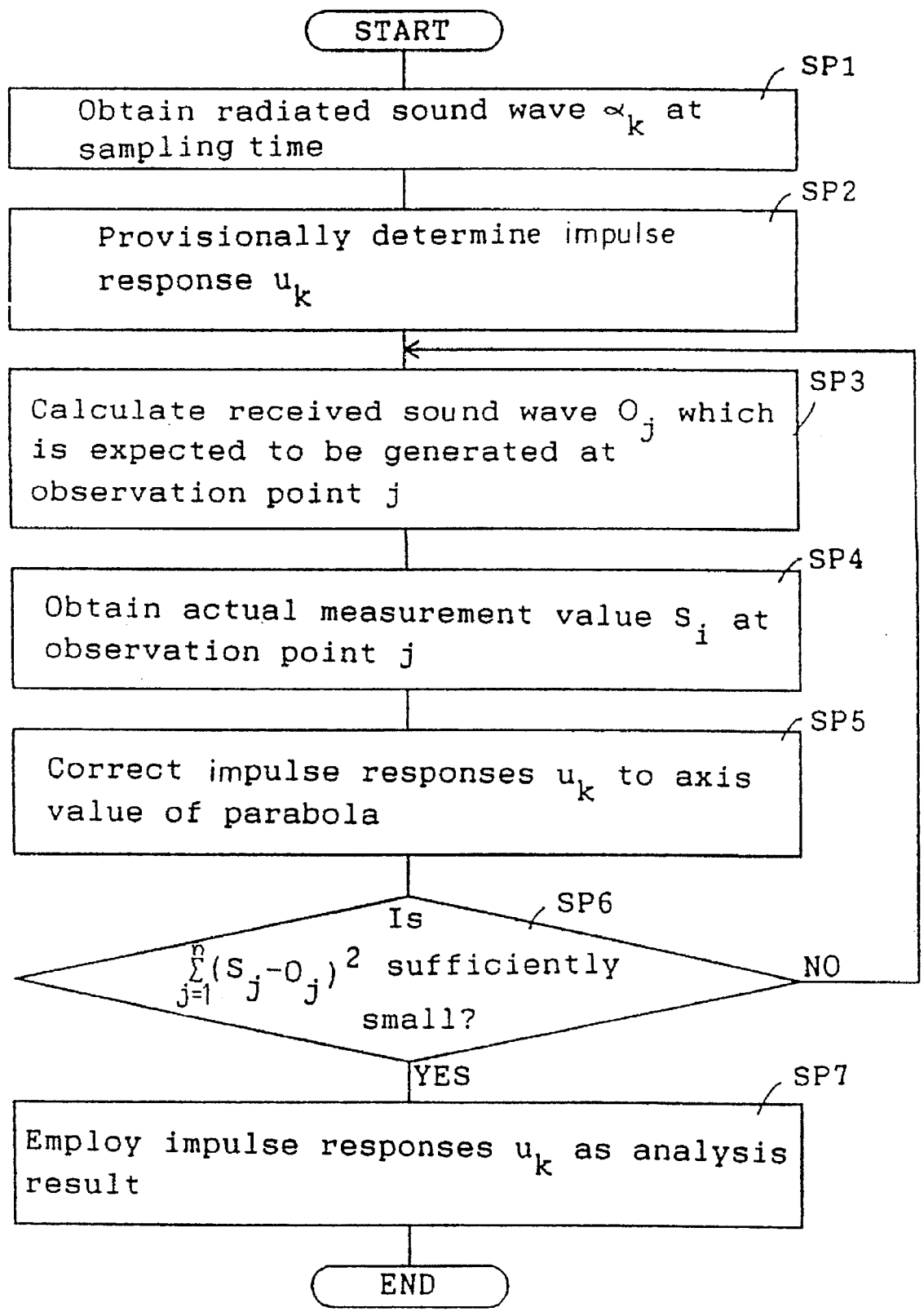
FIG. 12 is a flowchart illustrating an echo searching method according to a further embodiment of the present invention.

FIG. 12 is a flowchart representing an echo searching method according to a further embodiment of the present invention.

In step SP1, a radiated sound wave $\alpha_k$ is obtained at each sampling time. In step SP2, an impulse response $u_k$ of a physical source which is the object of searching is provisionally determined. In step SP3, an anticipated received sound wave $O_j$ which is expected to be generated at an observation point $j$ is calculated by carrying out an operation of the equation:

$$O_j = \sum_{k=0}^{m} u_{j-k} \alpha_k \qquad (19)$$

In step SP4, an actual measurement value $S_j$ at the observation point $j$ is obtained. Wherein, m represents a sample number during one cycle of the radiated sound wave, and n represents a total sampling number of the received sound wave.

Then, in step SP5, an impulse response $u_k$ as a provisional solution is obtained by carrying out an operation of the formulae:

$$u_k \leftarrow \begin{cases} u_k + \sum_{i=0}^{m} \{\alpha_i(S_{j+k} - O_{j+k})\} / \sum_{i=0}^{m} \alpha_i^2 \\ (0 < k < n - m) \\ u_k + \sum_{i=0}^{m} \{\alpha_i(S_{j+k} - O_{j+k})\} / \sum_{i=0}^{m} \alpha_i^2 \\ (k > n - m) \end{cases} \quad (20)$$

using the received sound wave $\alpha_k$ and a difference between the actual measurement value $S_j$ and the anticipated sound wave $O_j$.

The processing in steps SP3, SP4 and SP5 are sequentially carried out for a radiated sound wave $\alpha_k$ at all corresponding time.

Thereafter, in step SP6, it is determined whether or not a sum of squares of difference between the actual measurement value $S_j$ and the anticipated received sound wave $O_j$ becomes sufficiently small. When it is determined that the sum does not become sufficiently small, the processing in step SP3 is carried out again. On the contrary, when it is determined that the sum becomes sufficiently small, in step SP7, impulse responses $u_k$ which are finally obtained are employed as an analysis result, and the series of processing is finished.

The reason for calculating a sum of m-number in equation (19) and the upper portion in formulae (20), is that the radiated sound wave is supposed to be only one cycle. The reason for calculating a sum of (u–k)-number in the lower portion of formulae (20) is that an observation time period of the received sound wave is finite and only a received sound wave corresponding to only a part of the radiated sound wave is obtained.

FIG. 13 diagrams illustrate waveforms of the echo searching according to a specific example.

When a received sound wave illustrated in FIG. 13(B) is obtained based upon the radiated sound wave illustrated in FIG. 13(A), and when no noise exists, the impulse response estimation result illustrated in FIG. 13(C) may be obtained. When a noise (1%) exists, the impulse response estimation result illustrated in FIG. 13(D) may be obtained.

As is apparent from FIGS. 13, an impulse response with extremely high accuracy is obtained when no noise exists, and an impulse response with comparatively high accuracy is obtained even when a noise to some degree exists.

Though the embodiment is described for a sound wave, it is of course possible that the embodiment is applicable to an electromagnetic wave, or the like.

Each of the methods according to the third and the fourth embodiments employs values which suit analysis of objects instead of the constants in the first embodiment, and the estimated values are different from the estimated values in the first embodiment, but the processing based upon the employed values and the estimated values are similar to those of the first embodiment. Therefore, apparatus corresponding to the third and the fourth embodiments are easily obtained by applying these methods to the apparatus according to the second embodiment. When these methods are applied to an adaptive noise canceler, an observation value is supplied to one observation unit and the value of each observation unit is supplied to a neighbouring observation unit sequentially, instead of individual observation values being supplied to each observation unit 21, 22, . . . , 2n.

Fifth Embodiment

Figure 14:
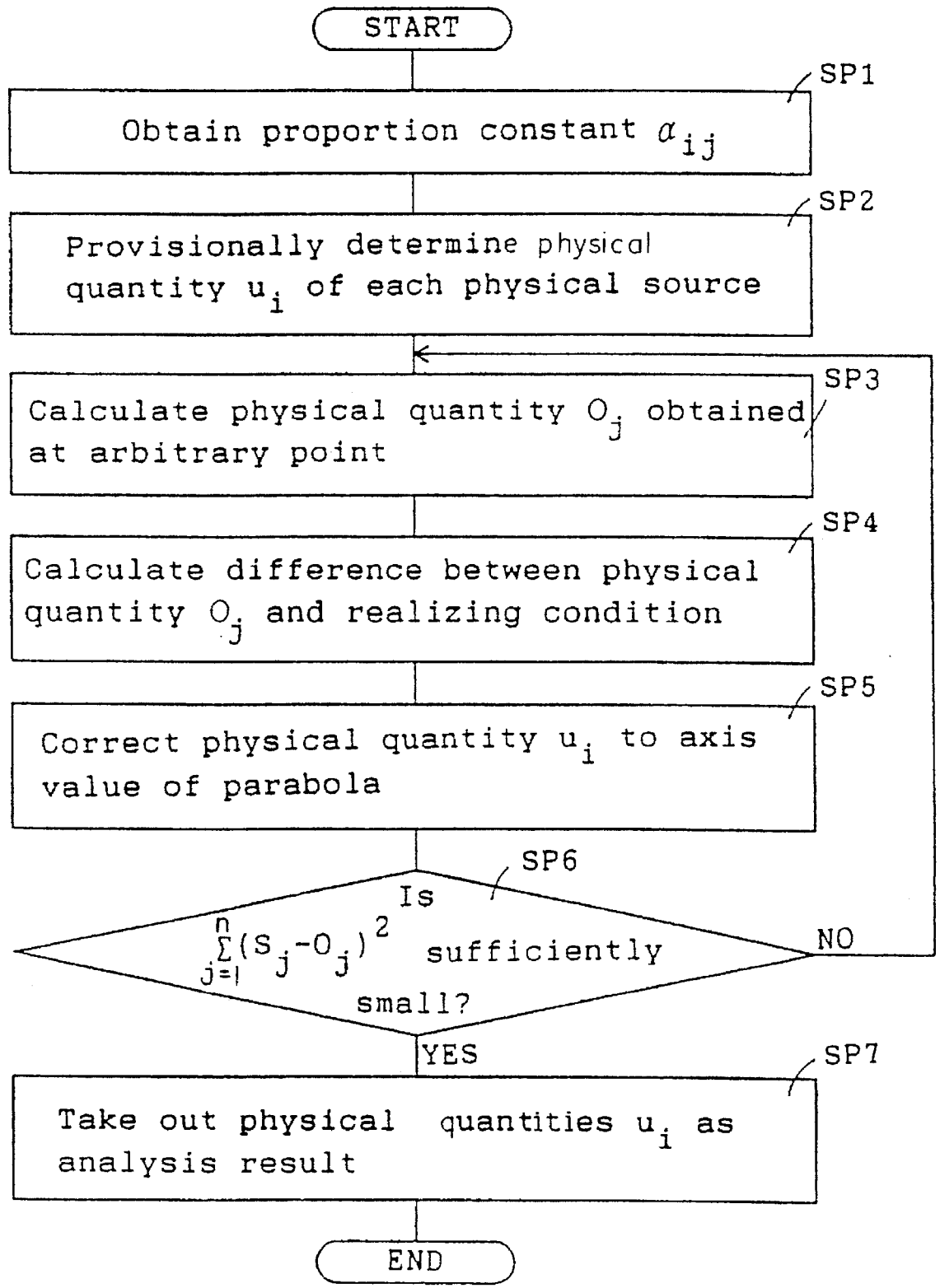
FIG. 14 is a flowchart explaining a physical quantity analyzing method according to a still further embodiment of the present invention.

FIG. 14 is a flowchart which assists in explaining a physical quantity analyzing method according to a still further embodiment of the present invention. The flowchart shows a method for analyzing physical quantities $O_j$ which are obtained at arbitrary positions within a region which satisfies simultaneous linear equations and includes individual physical sources, based upon physical quantities $u_i$ of the individual physical sources and proportion constants $\alpha_{ij}$ determined based upon the region.

In step SP1, proportion constants $\alpha_{ij}$ are obtained based upon characteristics of a region. In step SP2, a physical quantity $u_i$ of each physical source is provisionally determined (for example, all physical quantities are determined to be 0). In step SP3, a physical quantity $O_j$ obtained at an arbitrary point is calculated by carrying out the operation of the equation:

$$O_j = \sum_{i=1}^{m} \alpha_{ij} \cdot u_i \quad (1)$$

In step SP4, a difference between a realizing condition (known physical quantities given to the region) $S_j$ and the physical quantity $O_j$ is calculated.

In step SP5, a physical quantity $u_i$ as a provisional solution is obtained by carrying out operation of the equation:

$$u_i = u_i + \sum_{j=1}^{n} \{\alpha_{ij}(S_j - O_j)\} / \sum_{j=1}^{n} \alpha_{ij}^2 \quad (2)$$

using the difference and the proportion constants $\alpha_{ij}$.

The processing in steps SP3, SP4 and SP5 are sequentially carried out for all physical sources.

Thereafter, in step SP6, it is determined whether or not a sum of squares of the difference between the realizing condition $S_j$ and the physical quantity $O_j$ has become sufficiently small. When it is determined that the sum has not become sufficiently small, the processing in step SP3 is carried out again. On the contrary, when it is determined that the sum has become sufficiently small, in step SP7, physical quantities $u_i$ which are finally obtained are employed as analysis results, and the series of processing is finished.

More specifically, when the sum of squares of the difference between the realizing condition $S_j$ and the physical quantity $O_j$ is employed as an evaluation function E as is represented in the equation:

$$E = \sum_{j=1}^{n} (S_j - O_j)^2 \quad (10)$$

the relationships of the equations (11) through (14) are obtained. Therefore, asymptoticness to a solution is performed by correction of $u_i$ to an axis value, and high speed convergence is achieved. Further, when $u_i$ is corrected to the axis value, a division operation based upon the equation:

$$A_i^2 = \sum_{j=1}^{n} \alpha_{ij}^2 \quad (12)$$

is necessary. But, the value of the equation (12) is a constant which can be previously calculated, therefore a number of times for dividing in the series of processings can be extremely decreased so that a time period required for analysis can be significantly shortened by calculating an inverse of the equation (12) in advance.

But, the operation of the equation (1) is necessarily performed for each series of processing so that the operation load is insufficiently decreased. In this regard, the inventors have found that the physical quantity $O_j$ can be corrected by carrying out an operation of the formula:

$$O_j \leftarrow O_j + \alpha_{ij} \Delta u_i \quad (21)$$

based upon a correction value $\Delta u_i$ for correcting a physical quantity $u_i$ to an axis value, corresponding proportion constant $\alpha_{ij}$, and a preceeding physical quantity $O_j$.

Therefore, an operation load is significantly decreased so that a time period required for analysis is further shortened by utilizing formula (21) instead of equation (1).

Further, $S_j$ and $O_j$ are not necessarily stored so that a memory capacity is decreased by previously calculating $D_j = S_j - O_j$ and by carrying out an operation of the formula:

$$D_j = D_j - \alpha_{ij}\mu_i \quad (22)$$

instead of formula (21).

When this embodiment is applied to a finite element method the operation load which is necessary at each series of processing is significantly decreased as described above. Therefore, analysis of physical quantities is performed easily and at high speed, even when a region subject to analysis has a coefficient matrix of an extremely large degree.

Figure 15:
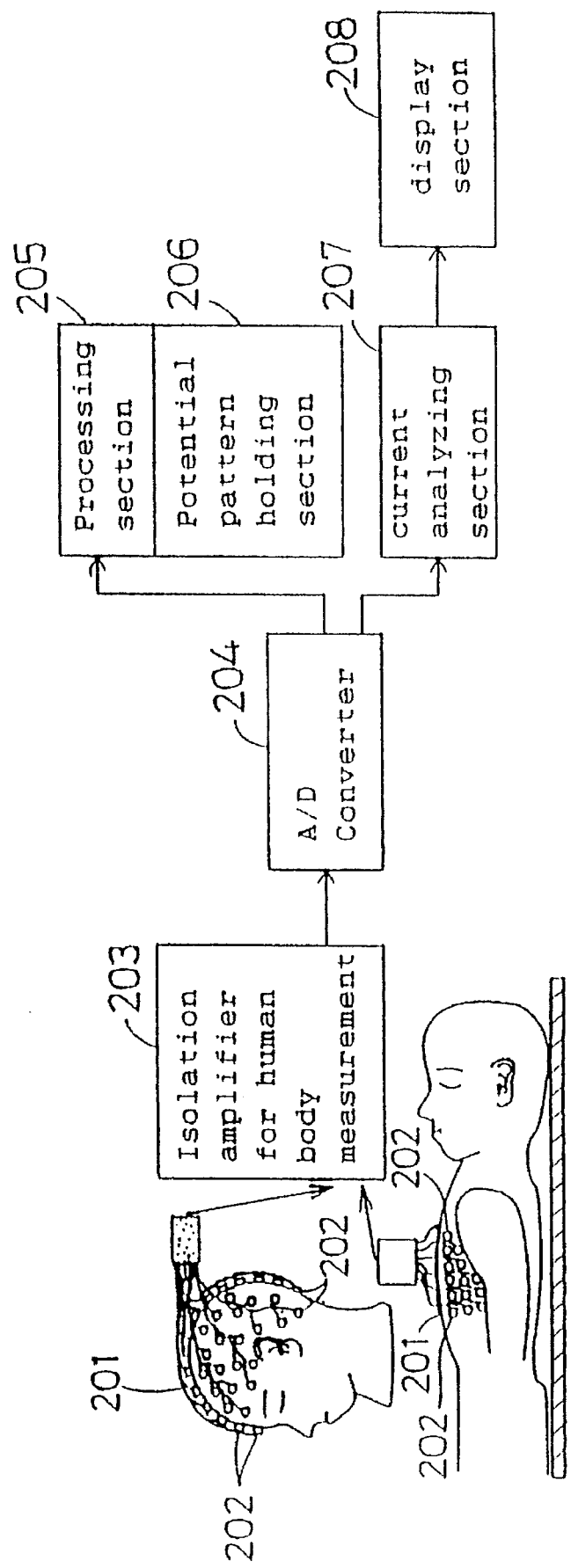
FIG. 15 is a schematic view of an apparatus which visualize an electrically active condition within a living organism based upon potential distribution data on a surface of the living organism collected by a plurality of electrodes.
Figure 16:
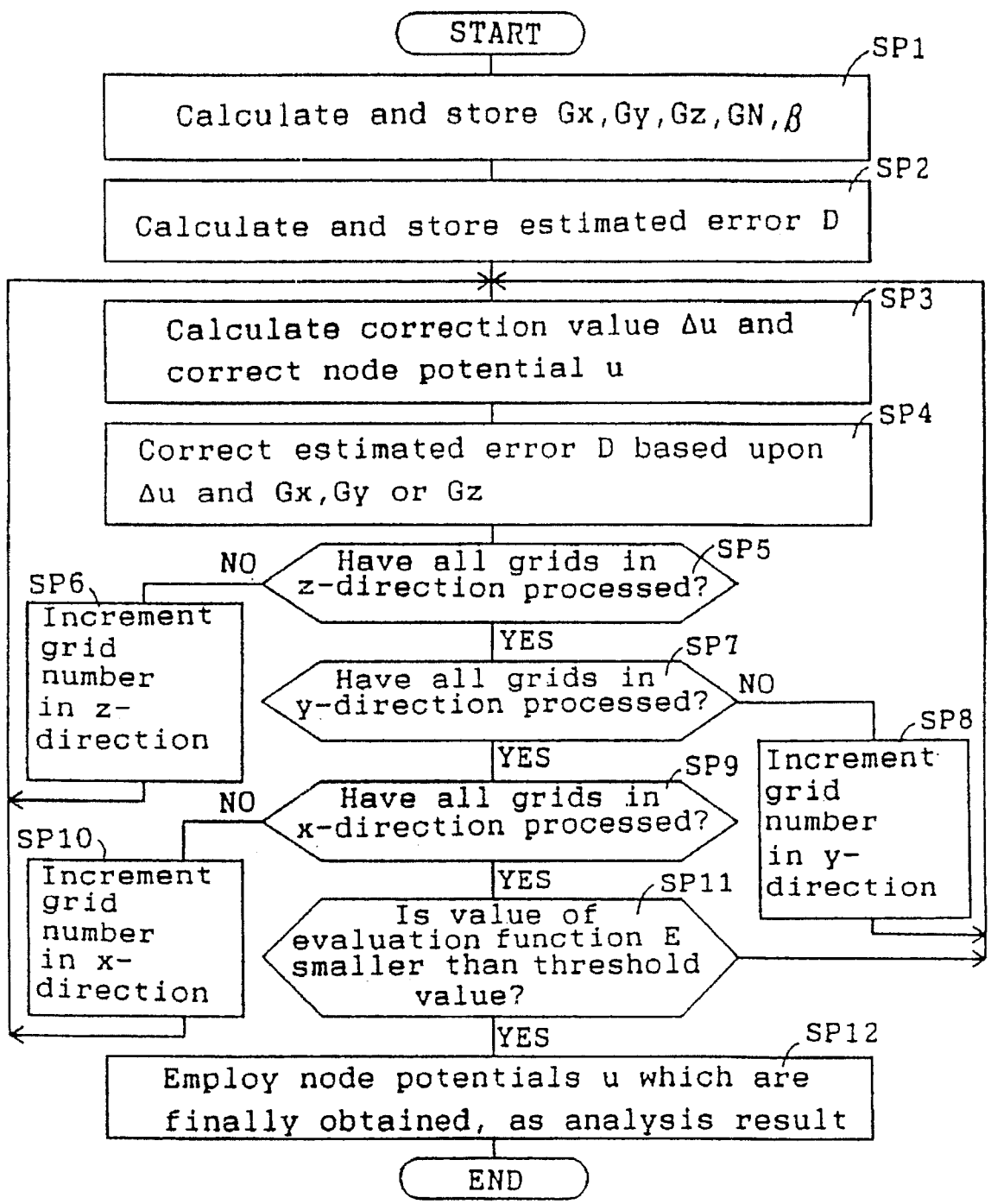
FIG. 16 is a flowchart explaining a specific example of a physical quantity analyzing method for obtaining a potential pattern as a part of processing for the apparatus in FIG. 15.

FIG. 15 is a diagram schematically illustrating an apparatus which visualizes electrically active condition within a living organism based upon distributed potential data on a surface of the living organism which are collected by a plurality of electrodes. FIG. 16 is a flowchart explaining a physical quantity analyzing method, according to a specific example, for obtaining a potential pattern, the flowchart being a part of processing which performed by the apparatus in FIG. 15. The apparatus in FIG. 15 comprises a base member 201 which is worn on a head, thorax, or the like, of a human body. Electrometers 202 which are mounted in a predetermined pattern at predetermined positions on the base member 201. Output signal from each electrometer 202 is guided to an A/D converter 204 through an insulation amplifier 203 for human body measurement so that the output signal is transformed into a digital signal. The digital signal is supplied to a processing section 205. The processing section 205 includes a potential pattern holding section 206. The processing section 205 carries out the processing shown in FIG. 16 so as to obtain a potential pattern and the potential pattern is held by the potential pattern holding section 206. The apparatus further comprises a current analyzing section 207 for analyzing currents within a human body based upon the potential pattern after the potential pattern has obtained, and a display section 208 for displaying the analysis result obtained by the current analyzing section 207.

The electrometer 202 includes an energizing mechanism such as a spring, so as to contact the electrometer 202 to a surface of a human body, for example. It is preferable that a relative position of the electrometer 202 with respect to the base body 201 can be detected under a pressed condition of the electrometer 202 to a human body.

The current analyzing section 207 utilizes obtained potential patterns as proportion constants $\alpha_{ij}$, and analyzes currents within a human body by performing processing which is similar to that of the first embodiment.

Figure 17:
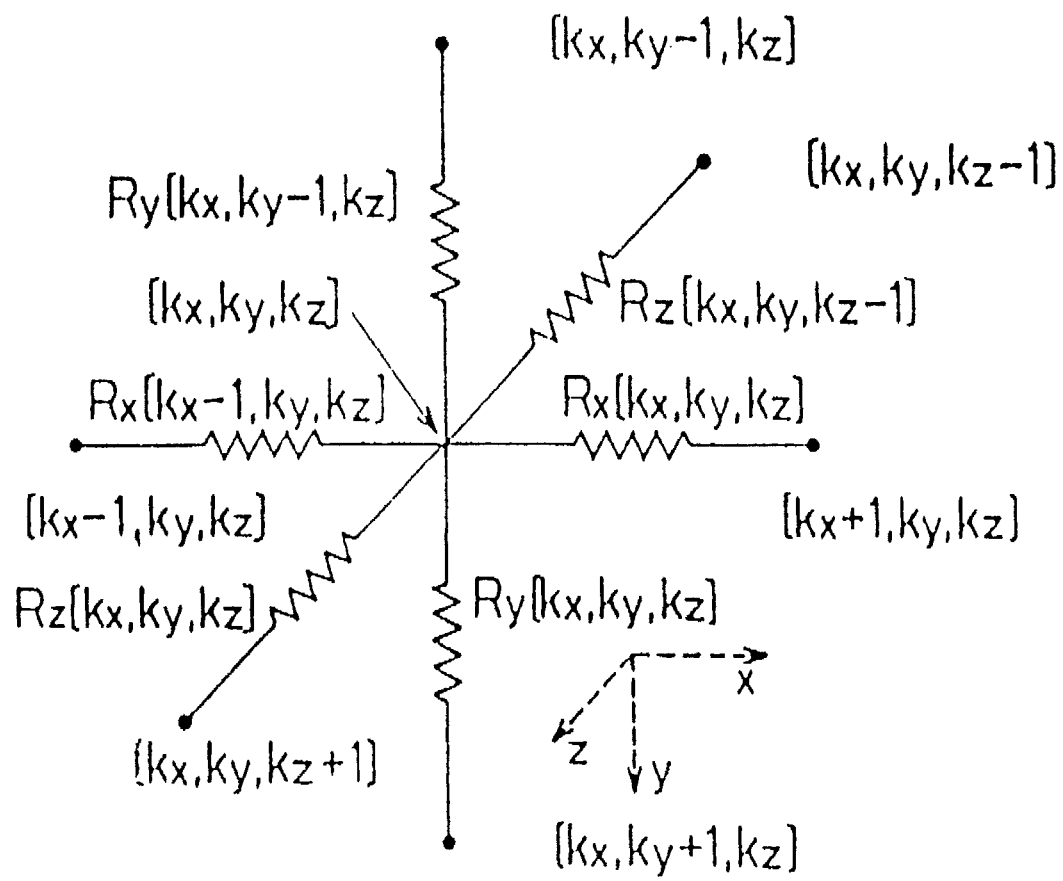
FIG. 17 is a diagram illustrating a part of a three dimensional lattice shaped resistance network in an enlarged manner.

Also, prior to carrying out the processing based upon the flowchart in FIG. 16, a three dimensional shape of intestines within a human body may previously have been determined by MRI (magnetic resonance imaging), X-ray CT (X-ray computer tomograph) or the like, and a three dimensional region subject to analysis is modelled with a three dimensional lattice shaped resistance network having a predetermined pitch (5 mm pitch, for example) using resistivities which are obtained based upon known medical information, or by other measurement methods. Though the apparatus visualizes an electrically active condition within a human body based upon the potential distribution data on a surface of the human body, it is premised on the potential distribution on the surface of the human body, under a condition that a unit current is supplied to one edge of an arbitrary resistance within the three dimensional region, and should be calculated for all resistances included within the three dimensional region. It is supposed that the number of nodes in x-, y-, and z-directions of the three dimensional lattice shaped resistance network are represented by $N_x$, $N_y$ and $N_z$, a potential of a node $[k_x, k_y, k_z]$ being represented by $u[k_x, k_y, k_z]$ as is illustrated in FIG. 17. Values of resistances which are connected to the node $[k_x, k_y, k_z]$ in the x-direction, are represented by $R_x[k_x-1, k_y, k_z]$ and $R_x[k_x, k_y, k_z]$. Values of resistances which are connected to the node $[k_x, k_y, k_z]$ in the y-direction are represented by $R_y[k_x, k_y-1, k_z]$ and $R_y[k_x, k_y, k_z]$. Values of resistances which are connected to the node $[k_x, k_y, k_z]$ in the z-direction are represented by $R_z[k_x, k_y, k_z-1]$ and $R_z[k_x, k_y, k_z]$ as are illustrated in FIG. 17. A supplied current which is forcibly supplied to the node $[k_x, k_y, k_z]$ from exterior is represented by $S[k_x, k_y, k_z]$, a flowing out current which flows out from the node $[k_x, k_y, k_z]$ through the resistance which is connected to the node $[k_x, k_y, k_z]$, is represented by $O[k_x, k_y, k_z]$. Inverses of each resistance value $R_x[k_x-1, k_y, k_z]$, $R_x[k_x, k_y, k_z]$, $R_y[k_x, k_y-1, k_z]$, $R_y[k_x, k_y, k_z]$, $R_z[k_x, k_y, k_z-1]$ and $R_z[k_x, k_y, k_z]$ are represented by $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$ and $G_z[k_x, k_y, k_z]$, and a sum $G_N[k_x, k_y, k_z]$ corresponding to the actual connected resistances represented by the equation:

$$G_N[k_x, k_y, k_z] = G_x[k_x - 1, k_y, k_z] + \quad (5)$$
$$G_x[k_x, k_y, k_z] + G_y[k_x, k_y - 1, k_z] + G_y[k_x, k_y, k_z] +$$
$$G_z[k_x, k_y, k_z - 1] + G_z[k_x, k_y, k_z]$$

On the right hand side of equation (5), only terms corresponding to the actually connected resistances are subject to processing.

Therefore, the flowing out current $O[k_x, k_y, k_z]$ is calculated by the equation:

$$O[k_x, k_y, k_z] = G_N[k_x, k_y, k_z]u[k_x, k_y, k_z] - \quad (23)$$
$$G_x[k_x - 1, k_y, k_z]u[k_x - 1, k_y, k_z] - G_x[k_x, k_y, k_z]u[k_x + 1, k_y, k_z] -$$
$$G_y[k_x, k_y - 1, k_z]u[k_x, k_y - 1, k_z] - G_y[k_x, k_y, k_z]u[k_x + 1, k_y, k_z] -$$
$$G_z[k_x, k_y, k_z - 1]u[k_x, k_y, k_z - 1] - G_z[k_x, k_y, k_z]u[k_x + 1, k_y, k_z + 1]$$

based upon Ohm's law.

Further, to realize Kirchhoff's first law, it is sufficient that the node potential $u[k_x, k_y, k_z]$ which makes the flowing in current $S[k_x, k_y, k_z]$ and the flowing out current $O[k_x, k_y, k_z]$ equal to one another, is obtained for each node. Kirchhoff's second law is satisfied by determining an unknown physical quantity as the node potential $u[k_x, k_y, k_z]$. That is, it is sufficient that node potentials $u[k_x, k_y, k_z]$ which minimize a value of an evaluation function E which is represented by the equation:

$$E = \sum_{k_x=1}^{N_x} \sum_{k_y=1}^{N_y} \sum_{k_z=1}^{N_z} (S[k_x, k_y, k_z] - O[k_x, k_y, k_z])^2 \quad (24)$$

are calculated.

Under the above condition, in step SP1, $(N_x-1) \times N_y \times N_z$-number of $G_x[k_x, k_y, k_z]$, $N_x \times (N_y-1) \times N_z$-number of $G_y[k_x, k_y, k_z]$, $N_x \times N_y \times (N_z-1)$-number of $G_z[k_x, k_y, k_z]$, $N_x \times N_y \times N_z$-number of $G_N[k_x, k_y, k_z]$, and $N_x \times N_y \times N_z$-number of $\beta[k_x, k_y, k_z]$ having the relationship of the equation (6) are calculated and stored. Each term on the right hand side of the equation (6) is obtained so as to represent the actual connections. Therefore, a maximum number of proportion constants having a value other than 0 in a column direction of a matrix is 7, even when a number of nodes becomes extremely large. Consequently, memory capacity for holding a coefficient matrix can be sufficiently small in comparison to a degree of the matrix.

In step SP2, $N_x \times N_y \times N_z$-number of estimated errors $D[k_x, k_y, k_z] = S[k_x, k_y, k_z] - O[k_x, k_y, k_z]$ are calculated and stored.

Then, in step SP3, correction quantities Δu for correcting unknown node potentials u[$k_x$, $k_y$, $k_z$] to axis values based upon the formula:

$$\Delta u \leftarrow \beta[k_x, k_y, k_z] (G_N[k_x, k_y, k_z]D[k_x, k_y, k_z] - \quad (25)$$
$$G_x[k_x - 1, k_y, k_z]D[k_x - 1, k_y, k_z] - G_x[k_x, k_y, k_z]D[k_x + 1, k_y, k_z] -$$
$$G_y[k_x, k_y - 1, k_z]D[k_x, k_y - 1, k_z] - G_y[k_x, k_y, k_z]D[k_x, k_y + 1, k_z] -$$
$$G_z[k_x, k_y, k_z - 1]D[k_x + 1, k_y, k_z - 1] - G_z[k_x, k_y, k_z]D[k_x, k_y, k_z + 1])$$

are calculated and the node potentials u[$k_x$,$k_y$, $k_z$] are corrected.

In step SP4, the estimated error is corrected by carrying out the operation of the formulae:

$$D[k_x, k_y, k_z] \leftarrow (D[k_x, k_y, k_z] + G_N[k_x, k_y, k_z])\Delta u$$

$$D[k_x-1, k_y, k_z] \leftarrow (D[k_x-1, k_y, k_z] + G_x[k_x-1, k_y, k_z])\Delta u$$

$$D[k_x+1, k_y, k_z] \leftarrow (D[k_x+1, k_y, k_z] + G_x[k_x, k_y, k_z]) \Delta u$$

$$D[k_x, k_y-1, k_z] \leftarrow (D[k_x, k_y-1, k_z] + G_y[k_x, k_y-1, k_z])\Delta u$$

$$D[k_x, k_y+1, k_z] \leftarrow (D[k_x, k_y+1, k_z] + G_y[k_x, k_y, k_z]) \Delta u$$

$$D[k_x, k_y, k_z-1] \leftarrow (D[k_x, k_y, k_z-1] + G_z[k_x, k_y, k_z-1])\Delta u$$

$$D[k_x, k_y, k_z+1] \leftarrow (D[k_x, k_y, k_z+1] + G_z[k_x, k_y, k_z])\Delta u \quad (9)$$

Thereafter, in step SP5, it is determined whether or not $k_z$ reaches $N_z$. When it is determined that $k_z$ does not reach $N_z$, in step SP6, $k_z$ is incremented, then the processing in step SP3 is carried out again. On the contrary, when it is determined in step SP5 that $k_z$ is equal to $N_z$, in step SP7, it is determined whether or not $k_y$ reaches $N_y$. When it is determined that $k_y$ does not reach $N_y$, then in step SP8, $k_y$ is incremented, then the processing in step SP3 is carried out again. On the contrary, when it is determined in step SP7 that $k_y$ is equal to $N_y$, then in step SP9, it is determined whether or not $k_x$ reaches $N_x$. When it is determined that $k_x$ does not reach $N_x$, in step SP10, $k_x$ is incremented, then the processing in step SP3 is carried out again. On the contrary, when it is determined in step SP9 that $k_x$ is equal to $N_x$, then in step SP11, it is determined whether or not the value of the evaluation function E is smaller than a predetermined threshold value. When it is determined that the value of the evaluation function E is smaller than the predetermined threshold value, in step SP12, the node potentials u[$k_x$, $k_y$, $k_z$] which are finally obtained are employed, and the series of processing is finished. On the contrary, when the value of the evaluation function E is equal or greater than the predetermined threshold value, $k_x$, $k_y$, and $k_z$ are reset to initial values and the processing in step SP3 is carried out again.

By carrying out the above series of processing, an analysis of unknown potentials is performed in a region which is subject to analysis which is a head, thorax, or the like, of a human body. Specifically, when a head of a human body is subjected to analysis, a number of unknown potentials is about 40,000, while a thorax of a human body is the subject of analysis, a number of unknown potentials is about 480,000. In each case, an analysis result with sufficient accuracy was obtained using a work station having a main memory with a capacity of 64 MB. As to a required time, in the former case, 3,000 repetition processings were carried out which required 144 seconds, while in the latter case, 3,000 repetition processings were carried out which required 1986 seconds.

When the potential pattern obtained by the above processing is employed as proportion constants $\alpha_{ij}$, potential distribution data on a surface of a human body are employed as known physical quantities $S_j$, and processing which is similar to those of the first embodiment is carried out, flowing into and flowing out condition of a current at gride (nodes) which are determined within the human body.

More particularly, the following are supposed. Potential distribution data for the surface of a human body obtained under an assumption that a unit current flows into a node [1, 1, 1] and a current flows out from a node [2, 1, 1] are employed as proportion constants of a first row among the proportion constants $\alpha_{ij}$ of (a number of nodes −1)×3 rows. Potential distribution data on a surface of a human body obtained under an assumption that a unit current flows into a node [1, 1, 1] and a current flows out from a node [1, 2, 1] are employed as proportion constants of a second row among the proportion constants $\alpha_{ij}$ of (a number of nodes −1) ×3 rows. Potential distribution data on a surface of a human body obtained under an assumption that a unit current flows into a node [1, 1, 1] and a current flows out from a node [1, 1, 2] are employed as proportion constants of a third row among the proportion constants $\alpha_{ij}$ of (a number of nodes −1)×3 rows. Similarly, proportion constants of all rows other than the three rows are employed.

When proportion constants $\alpha_{ij}$ of all rows are employed by the above manner, the relationship of the equation:

$$O_j = \sum_{i=1}^{m} \alpha_{ij} \cdot u_i \quad (1)$$

is satisfied. Therefore, flowing into and flowing out condition of nodes which are determined within a human body is analyzed by performing analysis processing which is similar to those of the first embodiment.

Figure 18B:
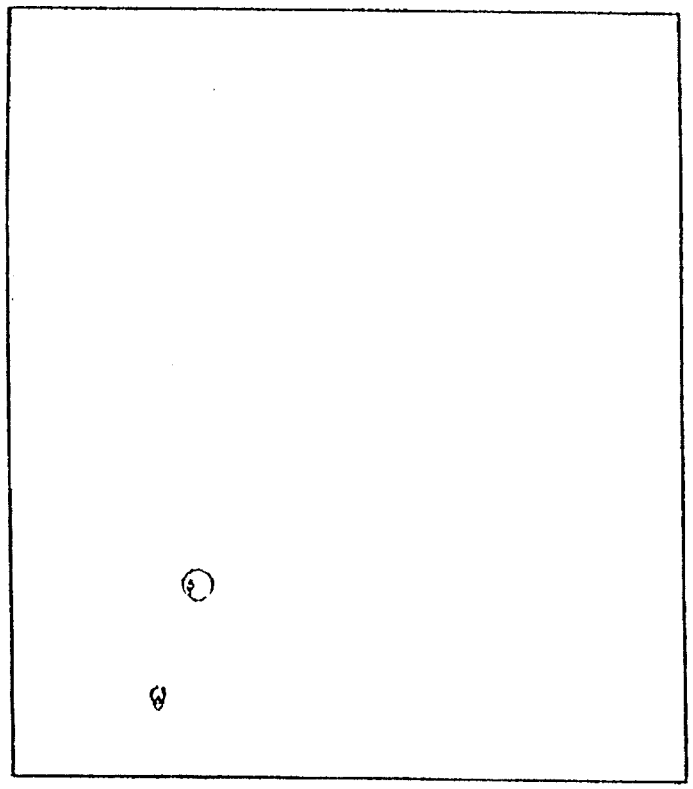
FIG. 18(B) is a diagram illustrating a current source analysis result.
Figure 18A:
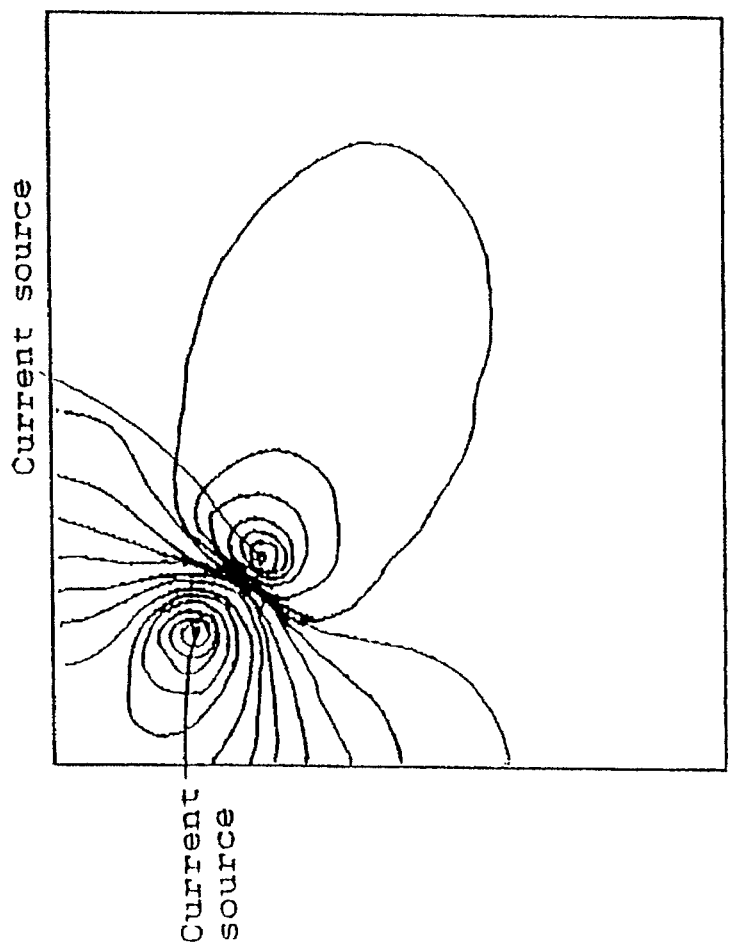
FIG. 18(A) is a diagram illustrating two current sources.

Specifically, current sources illustrated in two dimensional equipotential lines in FIG. 18(A) are supposed, potential distribution data are obtained by carrying out the processing in FIG. 16, then analysis processing similar to those of the first embodiment are carried out by employing the potential distribution data as proportion constants. As a result, a current source analysis result illustrated in FIG. 18(B) is obtained.

Further, the analysis processing which is similar to that of the flowchart in FIG. 16 is necessarily carried out based upon an analysis result of flowing into and flowing out condition of currents at nodes which are determined within a human body, for analyzing current distribution within a human body. But, when each current flowing in corresponding resistance is employed as a known physical quantity instead of the supplied current S[$k_x$, $k_y$, $k_z$] and the flowing out current O[$k_x$, $k_y$, $k_z$], a current distribution within a human body is obtained by carrying out analysis which is similar to those of the first embodiment by employing the potential distribution data as proportion constants which are obtained by carrying out analysis similar to that in the flowchart in FIG. 16.

Sixth Embodiment

Figure 19:
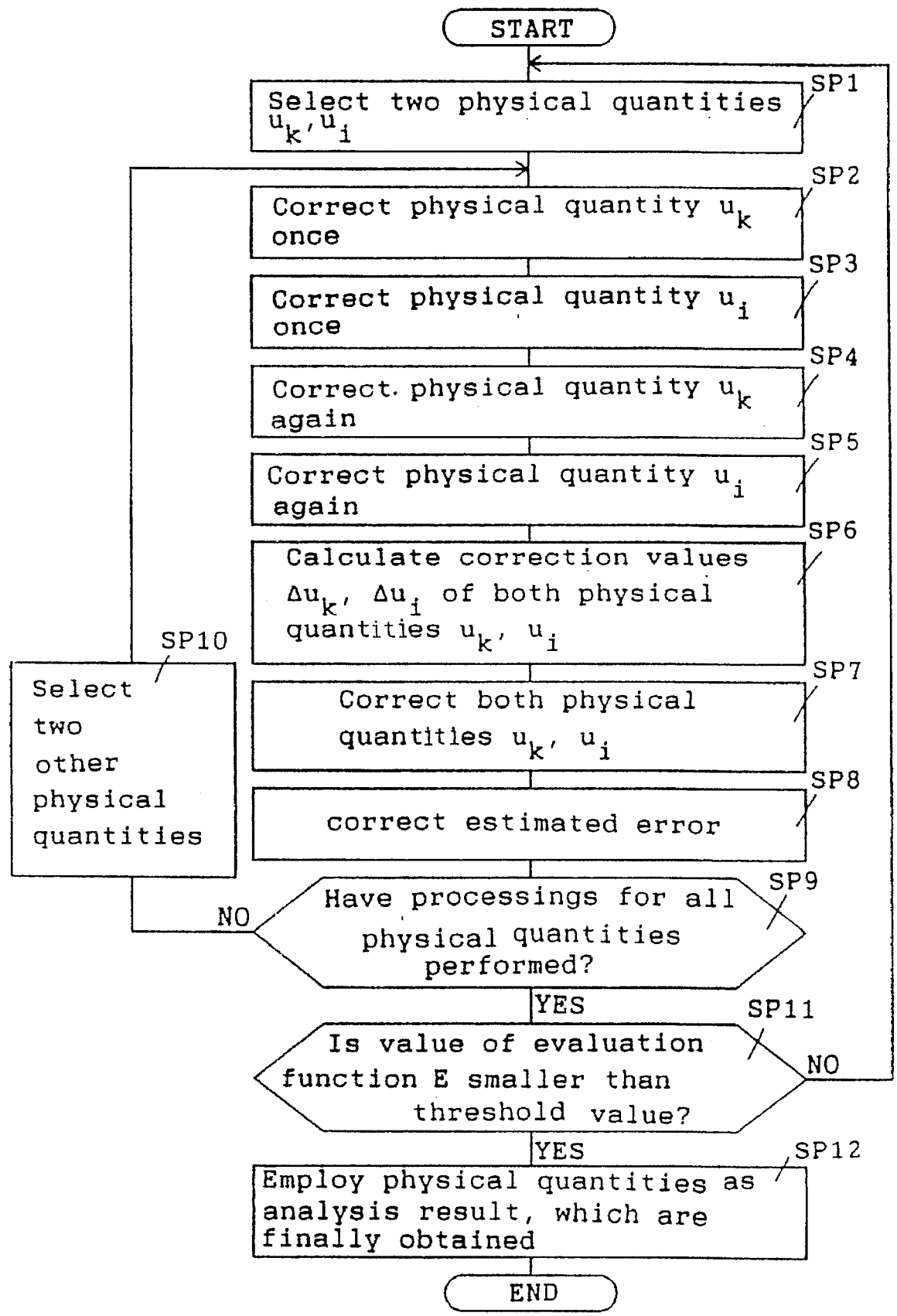
FIG. 19 is a flowchart explaining a physical quantity analyzing method according to a yet further embodiment of the present invention.

FIG. 19 is a flowchart explaining a physical quantity analyzing method according to a yet further embodiment of the present invention.

In step SP1, two physical quantities are selected from among a plurality of physical quantities which are subject to analysis, in step SP2, one of the selected physical quantities (hereinafter, referred to as a physical quantity $u_k$) is corrected once by a method which is similar to the method according to the fifth embodiment, in step SP3, the other of the physical quantities (hereinafter, referred to as a physical quantity $u_i$) is corrected once by a method which is similar to the method according to the fifth embodiment. Then, in steps SP4 and SP5, the physical quantities $u_k$, $u_i$ are corrected again as similar as in steps SP2 and SP3. Thereafter, in step SP6, correction values $\Delta u_k$, $\Delta u_i$ for the both physical quantities $u_k$, $u_i$ are calculated based upon the correction values which are obtained in the processings of steps SP3, SP4 and SP5, the correction values $\Delta u_k$, $\Delta u_i$ being necessary for minimizing a value of an evaluation function E determined based upon the both physical quantities $u_k$, $u_i$. In step SP7, physical quantities $u_k$, $u_i$ are corrected based upon the calculated correction values $\Delta u_k$, $\Delta u_i$. In step SP8, an estimated error D is corrected based upon the correction values and corresponding proportion constants. In step SP9, it is determined whether or not the processing is carried out for each physical quantity. When it is determined that there exist some physical quantities for which the processing is not carried out, in step SP10, two other physical quantities are selected, then the processing of step SP2 is carried out. When it is determined in step SP9 that the processings are carried out for all physical quantities, in step SP11, it is determined whether or not the value of the evaluation function E is smaller than the predetermined threshold value. When it is determined that the value of the evaluation function E is smaller than the threshold value, in step SP12, physical quantities which are finally obtained are employed, and the series of processing is completed. However, when it is determined that the value of the evaluation function E is equal to or greater than the threshold value, the processing in step SP1 is carried out again.

Figure 20:
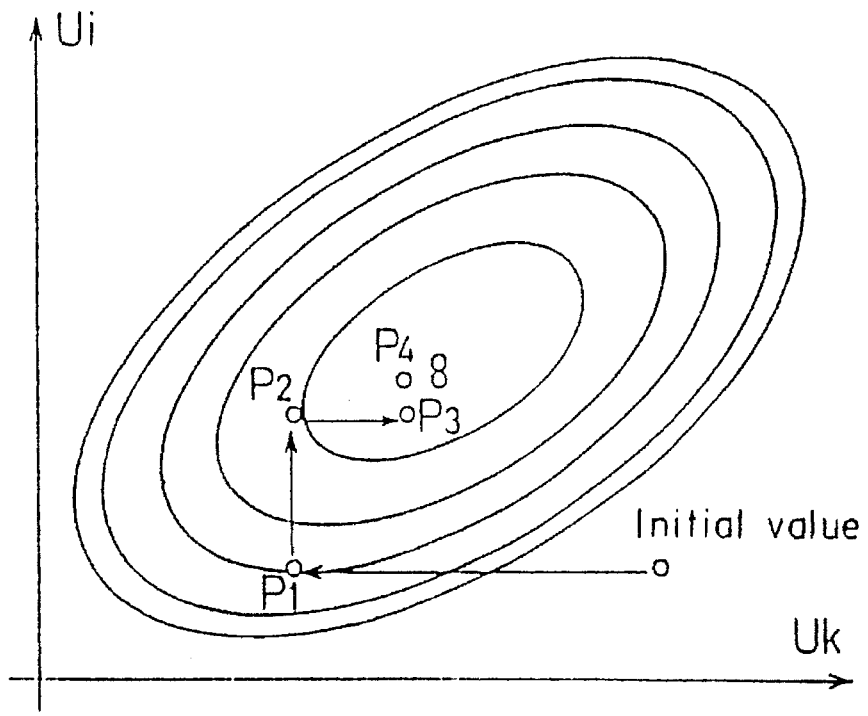
FIG. 20 is a diagram illustrating an example of an error evaluating function when two physical quantities to be corrected are selected.
Figure 21:
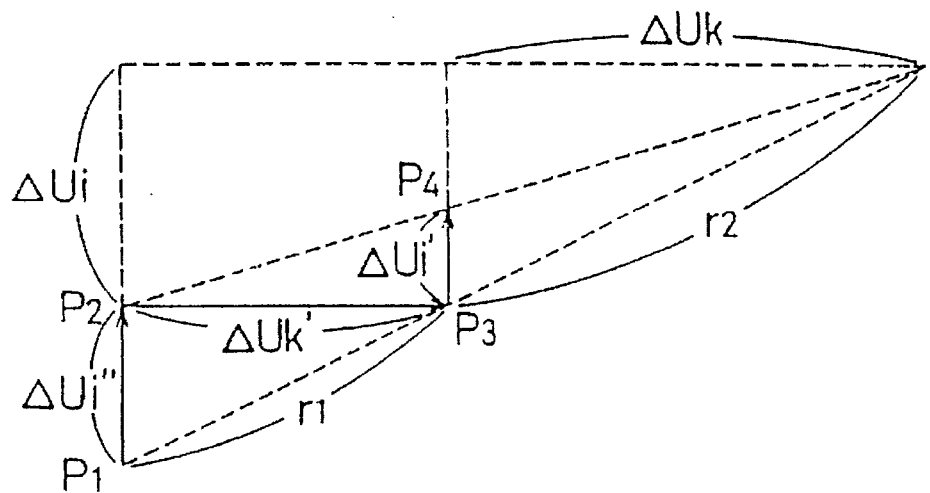
FIG. 21 is a schematic view explaining a principle of correction value calculating based upon the flowchart in FIG. 19.

In the fifth embodiment, if a number of physical quantities to be corrected is one, the evaluation function E is a parabola. If a number of physical quantities to be corrected is two, the evaluation function E is a paraboloid as is illustrated in FIG. 20. By carrying out the processing in step SP2, a point on the paraboloid is obtained which is illustrated with $P_1$ in FIG. 20, then by sequentially carrying out the processing in steps SP3, SP4 and SP5, points $p_2$, $p_3$ and $p_4$ on the paraboloid are obtained, the points $p_2$, $p_3$ and $p_4$ are nearer to the center of the paraboloid than the point $p_1$. Relationships between these points $p_1$, $p_2$, $p_3$ and $p_4$ are illustrated in FIG. 21. When it is assumed that a distance between the points $p_1$ and $p_2$ is represented by $\Delta u_i''$, a distance between the points $p_3$ and $p_4$ is represented by $\Delta u_i'$, a distance between the points $p_2$ and $p_3$ is represented by $\Delta u_k'$, a distance between the points $p_1$ and $p_3$ is represented by $r_1$, a distance between the point $p_3$ and the center of the paraboloid is represented by $r_2$, a distance in a $u_i$-axis direction between the point $p_2$ and the center of the paraboloid is represented by $\Delta u_i$, and a distance in a $u_k$-axis direction between the point $p_4$ and the center of the paraboloid is represented by $\Delta u_k$. The following equations representing proportion relationships:

$$r_2 : \Delta u_i' = (r_1 + r_2) : \Delta u_i'' \tag{26}$$

$$r_2 : \Delta u_k = r_1 : \Delta u_k' \tag{27}$$

$$r_2 : \Delta u_i = r_1 : \Delta u_i'' \tag{28}$$

Therefore, from the equation (26), the following equation is obtained:

$$r_2 = \Delta u_i' r_1 / (\Delta u_i'' - \Delta u_u') \tag{29}$$

By substituting the equation (29) for the equations (27) and (28), $\Delta u_k$ and $\Delta u_i$ are obtained which are represented by the following equations:

$$\Delta u_k = \Delta u_i' \Delta u_k' / (\Delta u_i'' - \Delta u_i') $$

$$\Delta u_i = \Delta u_i' \Delta u_i'' / (\Delta u_i'' - \Delta u_i') \tag{30}$$

Further, correction of the estimated error D in step SP8 is performed by the following formula:

$$D_j \leftarrow D_j - \alpha_{ji} \Delta u_k - \alpha_{jk} \Delta u_i$$

As is apparent from the foregoing, after two arbitrary physical quantities are selected and correction processing is alternately carried out twice for each physical quantity, the correction quantities which are necessary for transition of both physical quantities to the center of the paraboloid are easily calculated.

Seventh Embodiment

Figure 22:
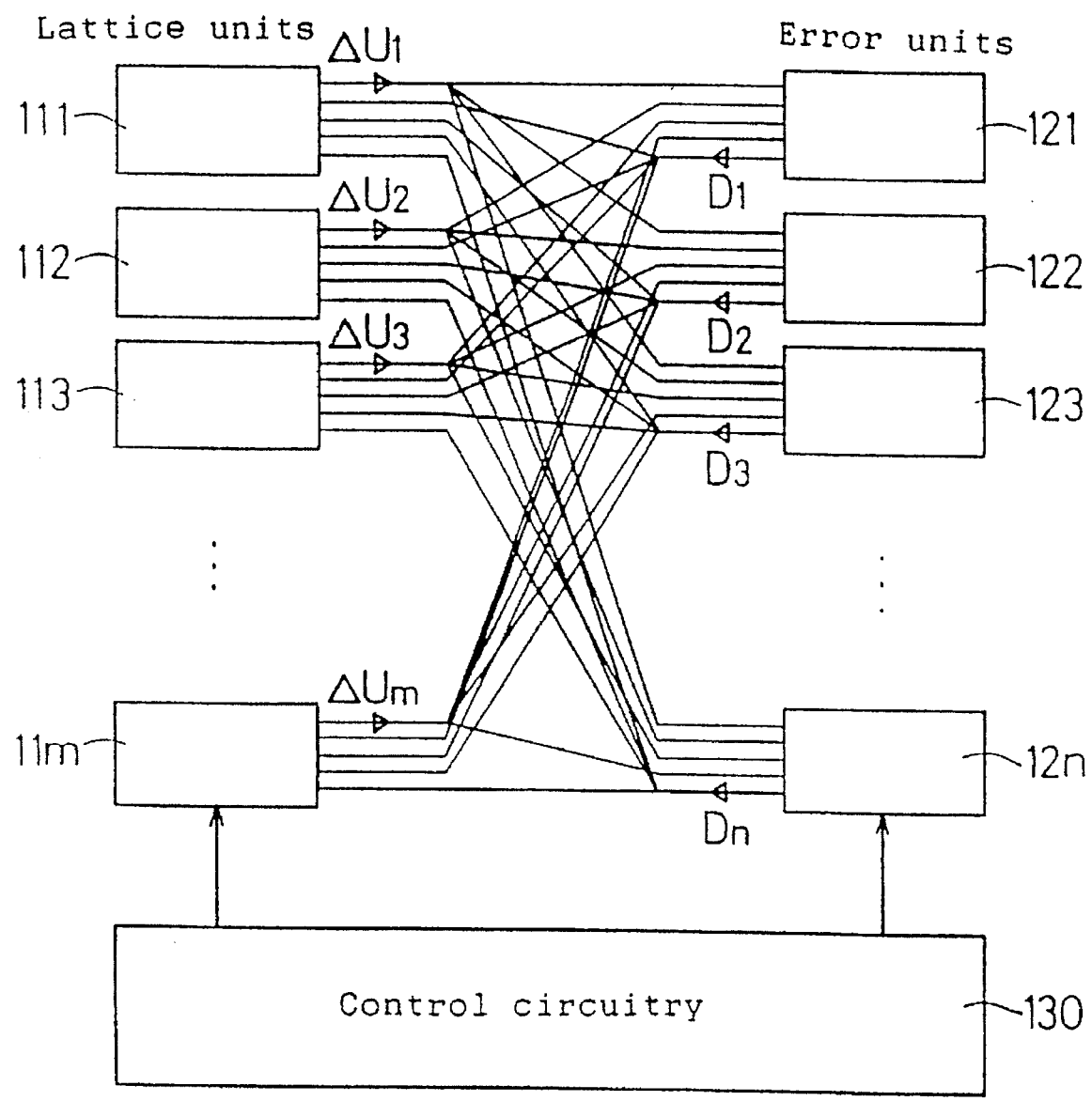
FIG. 22 is a block diagram illustrating a physical quantity analyzing apparatus according to another embodiment of the present invention.

FIG. 22 is a block diagram illustrating a physical quantity analysis apparatus according to another embodiment of the present invention.

The apparatus includes lattice units 111, 112, . . . ,11m (a number of which equals to a number of physical sources subject to analysis), error units 121, 122, . . . , 12n (a number of which equals to a number of realizing conditions), and control circuitry 130 for controlling the lattice units and the error units. controlling the lattice units and the error units.

Figure 23:
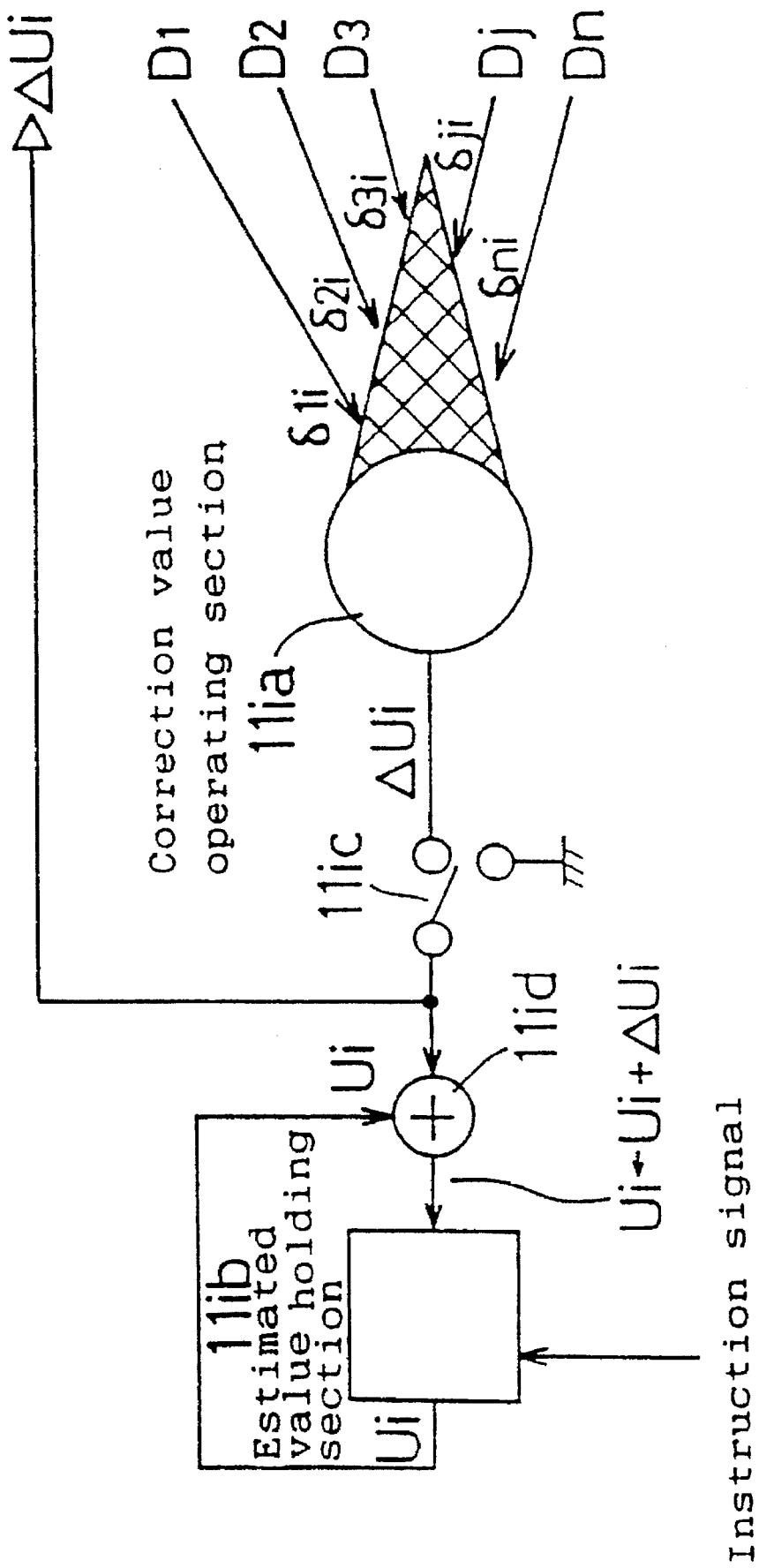
FIG. 23 is a block diagram illustrating a grid unit in detail.

FIG. 23 is a block diagram illustrating one lattice until 11i in detail. The lattice unit 11i includes a correction quantity calculating section 11ia for receiving error values $D_j$ supplied from error units $12_j$ and for calculating a correction quantity $\Delta u_i$ of corresponding physical source $u_i$, an estimated value holding section 11ib for holding a estimated value $u_i$ of a physical quantity, a selection section 11ic for selecting an allowance condition and an inhibition condition of outputting of the correction value $u_i$ from the correction value calculating section 11ia, and an estimated value correcting section 11id for adding the correction quantity $\Delta u_i$ which is an output from the selection section 11ic and the estimated value $u_i$ which is held by the estimated value holding section 11ib so as to obtain a new estimated value and for supplying the new estimated value to the estimated value holding section 11ib. Further, the correction quantity $\Delta u_i$ which is an output from the selection section 11ic is used as input to the error units. The correction quantity calculating section 11ia holds constants $\delta_{ij}(=\beta_i\alpha_{ij})$ therein corresponding to the error signals (error values) $D_j$, and the correction quantity calculating section 11ia carries out an operation of the formula:

$$\sum_{j=1}^{n} \{\alpha_{ij}(S_j - O_j)\} / \sum_{j=1}^{n} \alpha_{ij}^2 \tag{31}$$

and outputs the correction quantity $\Delta u_i$.

Figure 24:
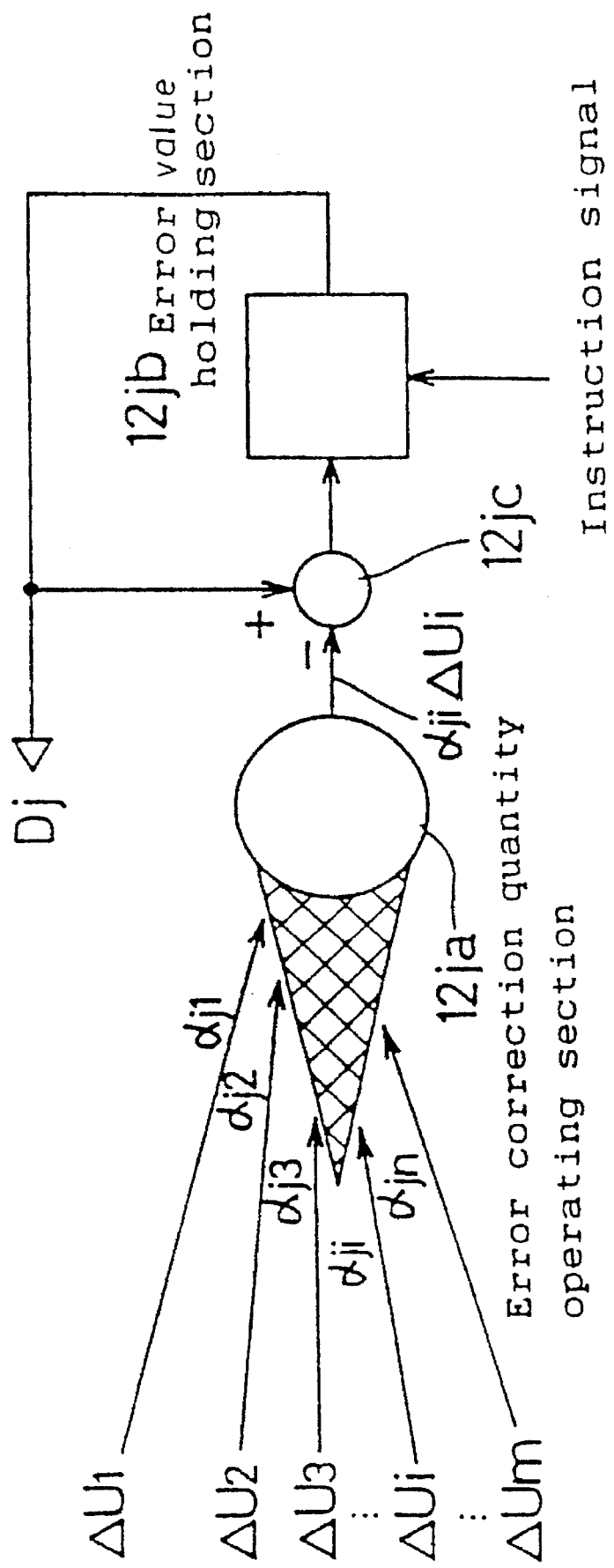
FIG. 24 is a block diagram illustrating an error correcting value operating unit in detail.

FIG. 24 is a block diagram illustrating one error unit 12j in detail. The error unit 12j includes an error correction quantity operating section 12ja for receiving the correction quantities $\Delta u_i$ output from the lattice units 11i and for outputing a correction quantity $\alpha_{ij}\Delta u_i$ for corresponding error $D_j$, an error value holding section 12jb for holding an error value $D_j$, and an error value correcting section 12jc which subtracts the error correction quantity $\alpha_{ij}\Delta u_i$ output from the error correction quantity operating section 12ja from the error value $D_j$ stored in the error value holding section 12jb so as to obtain a new error value and supplies the new error value to the error value holding section 12jb. Further, the error value $D_j$ held in the error value holding section 12jb is used as input to the lattice units. The error correction quantity operating section 12ja holds constants $\alpha_{ij}$ therein corresponding to the correction quantity $\Delta u_i$, and the error correction quantity operating section 12ia carries out an operation of $\alpha_{ij}\Delta u_i$ and outputs the error correction quantity.

The control circuitry 130 outputs a selection control signal for selectively operating the selection section 11ic, outputs an instruction signal for instructing the estimated value holding section 11ib to hold the output value from the estimated value correcting section 11id, and outputs an instruction signal for instructing the error value holding section 12jb to hold the output value from the error value correcting section 12jc.

Therefore, the apparatus of this embodiment performs functions which are similar to those of the fifth embodiment. As is apparent from the foregoing, only the estimated value holding sections 11ib and the error value holding sections 12jb require memory so that a memory requirement is significantly decreased. That is, significant decreasing of the memory capacity and the significant decrease in the time required for physical source analysis are both achieved.

Eighth Embodiment

Figure 26:
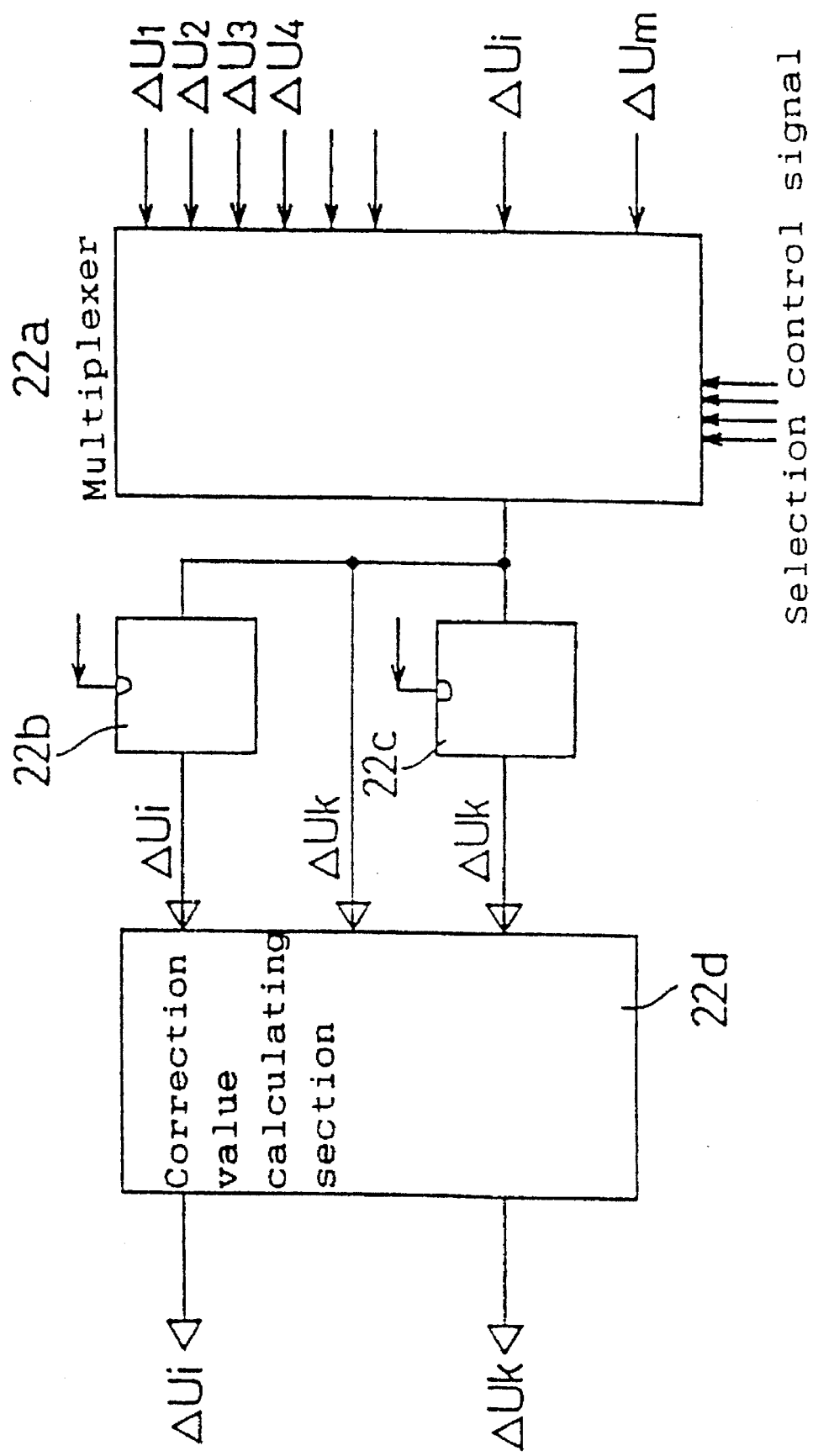
FIG. 26 is a block diagram illustrating a correction value operating unit for calculating a correction value for a center of an ellipse.
Figure 27:
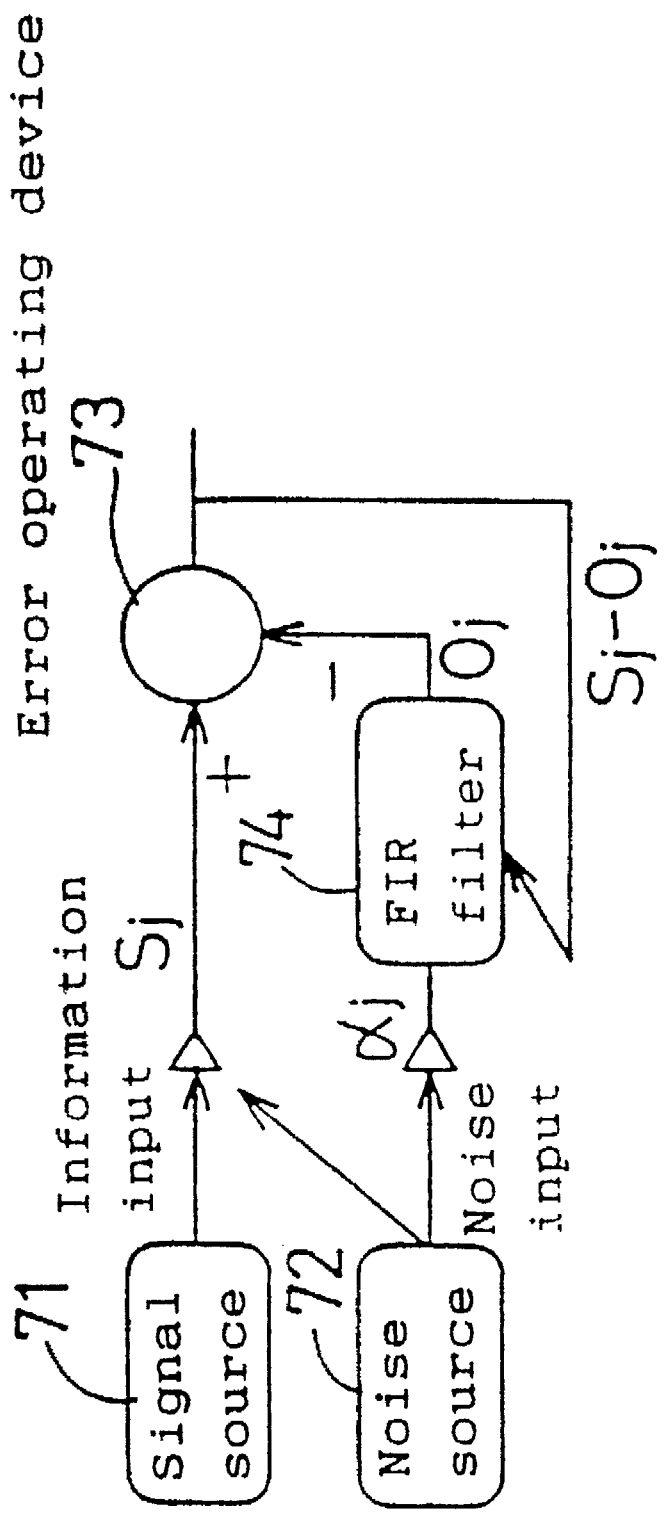
FIG. 27 is a block diagram illustrating a conventional adaptive noise canceler.
Figure 28:
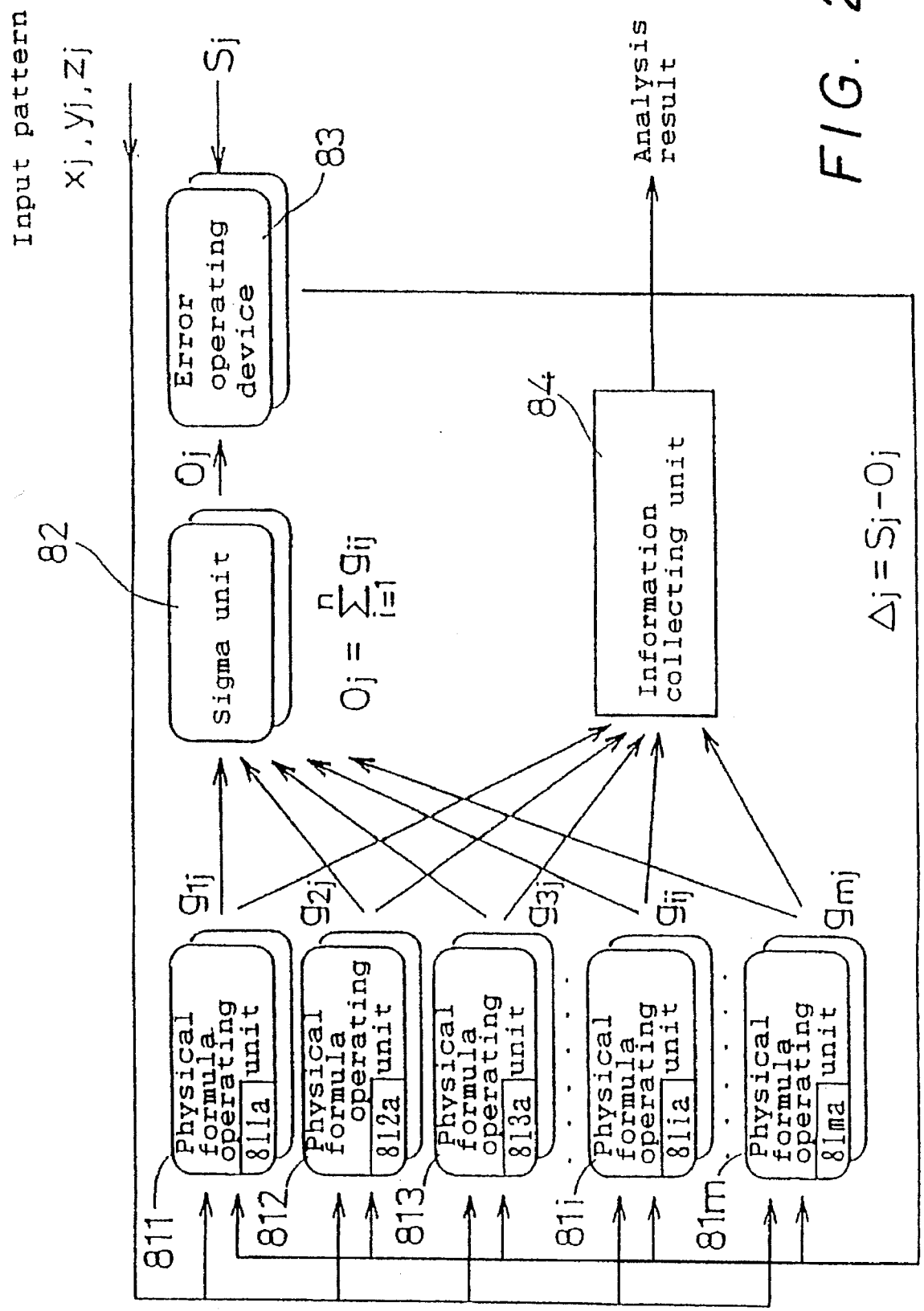
FIG. 28 is a block diagram illustrating a conventional physical quantity analyzing apparatus.

FIG. 26 is a block diagram illustrating one lattice unit 21i having the depicted arrangement, while FIG. 26 is a block diagram illustrating a correction quantity calculating unit 22 for calculating correction quantities corresponding to the center of a paraboloid. Further, the arrangement of the error correction quantity operating unit is the same as that of FIG. 23, hence the error correction quantity operating unit has been omitted from the figure and this description.

Figure 25:
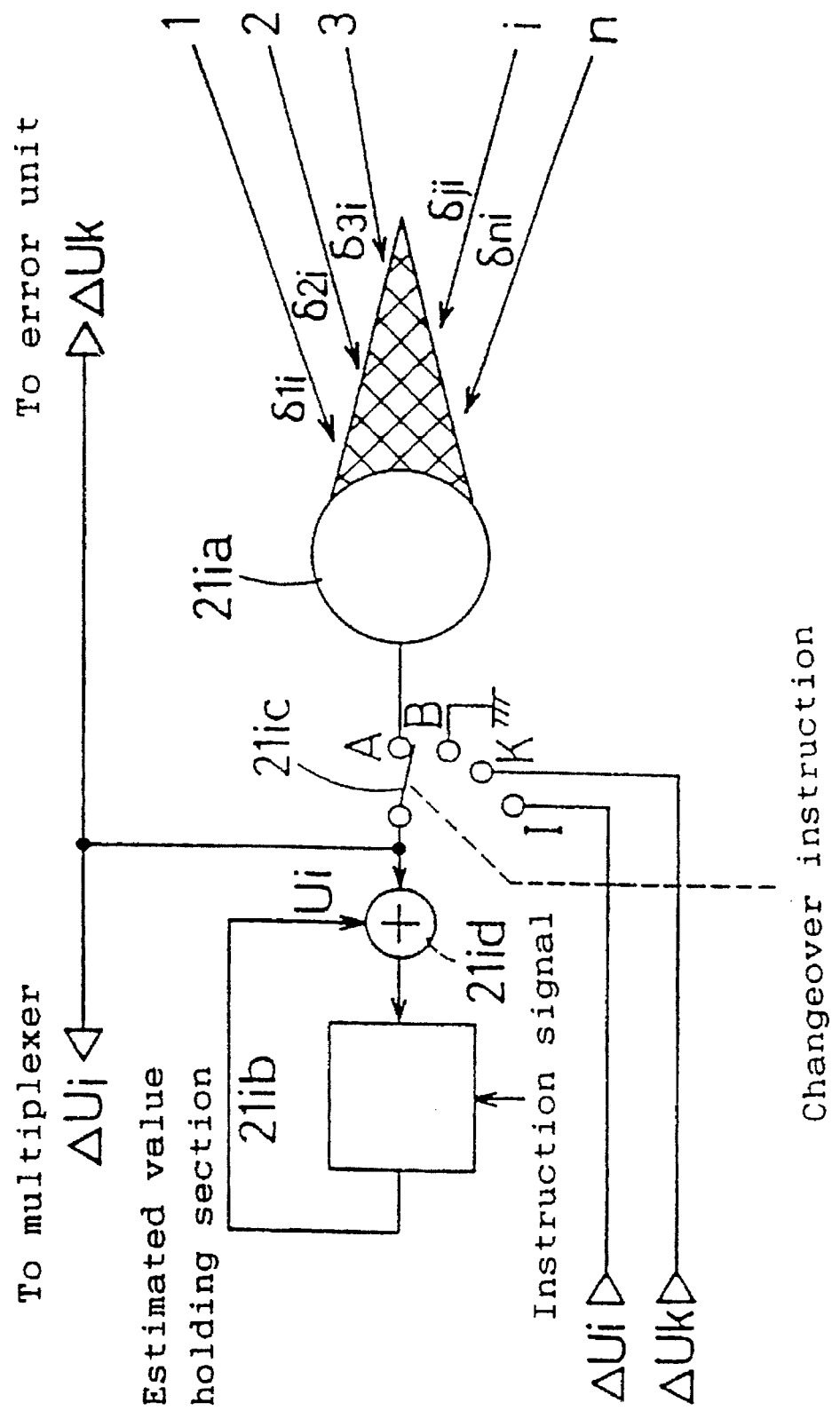
FIG. 25 is a block diagram illustrating a grid unit having another arrangement in detail.

As is illustrated in FIG. 25, the lattice unit 21i is similar to the arrangement in FIG. 23, but is different in that a selection section 21ic for selecting the correction quantity $\Delta u_i$ (output from the correction quantity calculating section 11ie) and two correction quantities $\Delta u_j$ and $\Delta u_k$ (output from the correction quantity calculating unit 22) is employed rather than the selection section 11ic, and the correction quantity selected by the selection section 21ic is employed as an input to the correction quantity calculating section 22.

As illustrated in FIG. 26, the correction quantity calculating section 22 includes a multiplexer 22a (which receives the correction quantities $\Delta u_i$ output from all lattice units 21i), a pair of correction quantity holding sections 22b and 22c (for holding two correction quantities $\Delta u_j$ and $\Delta u_k$, respectively, which are selected by the multiplexer 22a), and a correction quantity calculating section 22d (to which the correction quantities held by both correction quantity holding sections 22b and 22c are supplied as standard values for regulating correction directions, and which receives one of the correction quantities and carries out the operation of the equation (30) so as to obtain and output two correction quantities $\Delta u_j$ and $\Delta u_k$).

Further, in this embodiment, the control circuitry 130 supplies a selection control signal to the multiplexer 22a, and the control circuitry 130 supplies the instruction signal to the correction quantity holding sections 22b and 22c selectively, the instruction signal instructing that the correction quantity output from the multiplexer 22a is to be held. Therefore, one correction quantity is selected by the multiplexer 22a and is held by one correction quantity holding section, then the other correction quantity is selected by the multiplexer 22a and is held by the other correction quantity holding section, thereafter the two correction quantities $\Delta u_j$ and $\Delta u_k$ are alternately selected by the multiplexer 22a and processing which is similar to that of the sixth embodiment is carried out so that correction quantities $\Delta u_j$ and $\Delta u_k$, corresponding to the center of the paraboloid, are calculated. Further, functions of other components are similar to those of the seventh embodiment, and corresponding detailed description is therefore omitted.

The present invention is not limited to the above embodiments. Various design changes within an extent of the spirit of the present invention are applicable.

A total number of physical quantities which are to be analyzed is determined properly by taking an even balance between an accuracy in physical quantity analysis result which is desired, and a processing capability of a processing apparatus for performing physical quantity analysis processing into consideration. By limiting a region for performing physical quantity analysis to a region of concern, processing capacity is improved without lowering an analysis accuracy when the processing capacity is of great importance, on the other hand, analysis accuracy is improved without lowering a processing capacity when the analysis accuracy is of great importance.

Possibility in Industrial Utilization

As is apparent from the foregoing, physical quantity analysis methods and apparatus therefore, calculate a physical quantity corresponding to a given physical source within an extremely short time period, and with high accuracy, in comparison to a conventional analysis techniques using a super computer. This is accomplished by correcting an estimated physical quantity so as to minimize a sum of squares of differences between physical quantity measurement values obtained at plural positions spaced apart from the physical sources of interest, such as current sources within a human body, and products of physical quantities estimated at the measurement time, and constants representing physical fields at the measurement positions generated by the physical sources. The inventive methods and apparatus are preferably applied to a human body current source measurement, human body magnetic field source measurement, and adaptive noise canceling apparatus, or the like.

What is claimed is:

1. A physical quantity analyzing method for determining a physical quantity for an unknown physical source in a physical system, which physical quantity $u_i$ has a relationship with an expected physical $O_j$ at an arbitrary observation position j based on a constant $\alpha_{ij}$ given by the equation:

$$O_j = \sum_{i=1}^{m} \alpha_{ij} \cdot u_i \tag{1}$$

for the method comprising the steps of:

determining a provisional physical quantity value $u_i$ for each of a plurality of individual physical sources i in a physical system, calculating an expected physical quantity value $O_j$ based on a constant $\alpha_{ij}$ and carrying out equation (1) for each provisional physical quantity value, measuring a known physical quantity value $S_j$ for each arbitrary observation point j, determining determined physical quantity values which minimize a sum of a square of a difference between the expected physical quantity value $O_j$ and corresponding known physical quantity value $S_j$, both $O_j$ and $S_j$ are for an arbitrary observation point j, repeating calculation of the difference and determination of the determined physical quantity values for each physical source based on the difference and a previously determined physical quantity values, iteratively repeating the calculation of the difference and the determination of the determined physical quantity value for each physical source until a sum of the square of the difference becomes smaller than a predetermined threshold value, and employing the determined physical quantity values which are finally obtained as the physical quantity value $u_i$ for each physical source.

2. A physical quantity analyzing method for determining a physical source quantity of each physical source based upon observation quantity values measured at predetermined plural positions which are spaced apart from the physical sources, wherein the observation quantity values measured at predetermined plural positions can be calculated based upon predetermined operation formulae which include physical source quantities for physical sources, and wherein the observation quantity values measured at the predetermined positions are in a linear system, the method comprising the steps of:

predetermining constants, each of which represents a physical field, existing between each predetermined position and each physical source, calculating a provisional physical source quantity value, measuring a physical observation quantity value at each predetermined position, calculating a difference between a measured observation physical quantity value at each predetermined position and a value provided as a sum of products of each physical source quantity value and corresponding constant, determining physical source quantity values which minimize a sum of squares of differences as new physical source quantity values based upon the calculated differences and corresponding constants, repeating the calculation of the difference and the determination of a new physical source quantity value for each physical source, iteratively repeating the calculation of the difference and the determination of the new physical source quantity value for each physical source until a sum of the square of the differences which is obtained by the repetition of the processing becomes smaller than a predetermined threshold value, and employing the new physical source quantity values obtained as physical source quantity values for their respective physical sources.

3. A physical quantity analyzing method for determining a physical quantity $u_i$ of a physical source i based upon a physical quantity measurement value $S_j$ as measured at plural measurement points j spaced apart from the physical source i, wherein the positions of the plural measurement points j are known, and are spaced apart from individual physical sources i of which positions also are known, and wherein the physical quantity measurement value $S_j$ is in a linear system, the method comprising the steps of:

(1) predetermining constants $\alpha_{ij}$ each of which represents a physical field between each predetermined position and each physical source, (2) provisionally determining a provisional value for a physical quantity $u_i$ for each physical source i, (3) calculating an expected quantity value $O_j$ at each measurement point j by carrying out the equation:

$$O_j = \sum_{i=1}^{m} \alpha_{ij} \cdot u_i, \quad (1)$$

(4) measuring an actual measurement value $S_j$ at each measurement point j, (5) calculating a difference between the measurement value $S_j$ and the expected quantity value $O_j$, (6) obtaining a provisional solution value for the physical quantity $u_i$ by carrying out the equation:

$$u_i = u_1 + \sum_{j=1}^{n} \{\alpha_{ij}(S_j - O_j)\} / \sum_{j=1}^{n} \alpha_{ij}^2, \quad (2)$$

(7) carrying out steps (3) to (6) for each physical source, and (8) iteratively repeating steps (3) to (6) until a sum of the squares of the differences between $S_j$ and $O_j$ is smaller than a predetermined threshold value, and employing the provisional solution value which is finally obtained as an analysis result.

4. A physical quantity analyzing method for analyzing physical quantities of magnetic sources within an object for measurement by measuring a magnetic field which is generated by the object using plural magnetic field sensors, the method comprising the steps of:

(1) predetermining constants $\alpha_{ij}$ which represents a magnetic field generated between each predetermined position and each magnetic field source, (2) determining a provisional value for a physical quantity $u_i$ which represents each magnetic field source i which is positioned at a lattice point k(k=1, 2, ... p) within the object, (3) calculating an expected magnetic field value $O_j$ which is expected to exist at each measurement point j by carrying out the equation:

$$O_j = \sum_{i=1}^{m} \alpha_{ij} \cdot u_i, \quad (1)$$

(4) measuring an actual measurement value $S_j$ of the magnetic field at each measurement point j, (5) calculating a difference between the actual magnetic field measurement value $S_j$ and the expected magnetic field value $O_j$, (6) obtaining a provisional solution value for the physical quantity $u_i$ by carrying out the equation:

$$u_i = u_1 + \sum_{j=1}^{n} \{\alpha_{ij}(S_j - O_j)\} / \sum_{j=1}^{n} \alpha_{ij}^2, \quad (2)$$

(7) carrying out steps (3) to (6) for each of the magnetic field sources, and (8) iteratively repeating steps (3) to (6) until a sum of the squares of the differences between $S_j$ and $O_j$ is smaller than a predetermined threshold value, and employing the provisional solution value which is finally obtained as an analysis result.

5. A physical quantity analyzing method according to claim 4, wherein the physical quantity $u_i$ has a x-direction current component and a y-direction current component which are represented by a formula:

$$u_i = \begin{cases} P_{xi} (i = 1, 2, \ldots, p) \\ P_{yi} (i = p+1, p+2, \ldots, 2p) \end{cases} \quad (3)$$

wherein the constant $\alpha_{ij}$ is given by a formula:

$$\alpha_{ij} = \begin{cases} \dfrac{K_j(y_j - y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (Y_j - Y_{i-p})^2 + (z_j - z_{i-p})^2\}^{3/2}} \\ \quad (i = p+1, p+2, \ldots, 2p) \end{cases} \quad (4)$$

and wherein, $K_j$ is a sensitivity correction coefficient at the measurement point j.

6. A physical quantity analyzing method for determining a measurable physical quantity for each physical source which may be observed at a predetermined position due to a physically measurable aspect of the physical sources, in a case where a physical quantity is measurable at a predetermined position which is spaced apart from the individual physical source, which quantity can be calculated based upon known formulae which include physical quantity values of said physical sources, and measurable physical quantity values measurable at the predetermined position spaced apart from at least one physical source which are in a linear system, the method comprising the steps of:

measuring a physical quantity $u_i$ at a predetermined position which is proximal to at least one physical source, provisionally determining degrees of influence by the physical source on the predetermined position calculating a difference between a measured physical quantity value at each predetermined position and a sum of products of each measured physical quantity value and corresponding degree, determining a physical quantity value which minimizes a sum of squares of differences for each new physical quantity based upon the calculated differences and each physical quantity measurement value, repeating the calculation of the difference and the determination of physical quantities $u_i$ for each physical source, and continuing to repeat the calculation of the difference and the determination of the physical quantities $u_i$ for each physical source until a sum of the squares of the differences which is obtained by the repetition of the processing becomes smaller than a predetermined threshold value, and employing the physical quantities of each physical source which are finally obtained at the predetermined positions.

7. A physical quantity analyzing method for determining a passive physical quantity value of a passive physical source which passive source influences an observable physical quantity value which may be detected at a predetermined position which is caused by active physical quantity values of active physical sources, wherein observable physical quantity values at arbitrary positions spaced apart from the active physical sources can be calculated based upon predetermined operation formulae, and observable physical quantity values at the arbitrary positions are in a linear system, the method comprising the steps of:

measuring the active physical quantity value for each active physical source, determining a provisional passive physical quantity value, calculating a difference between the observable physical quantity and a sum of products of each active physical quantity value and the passive physical quantity value, determining the passive physical quantity value which minimizes the sum of squares of differences to get a new passive physical quantity value based upon the calculated difference and each active physical quantity value, repeating the calculation of the difference and the determination of physical quantities for each physical source, iteratively repeating the calculation of the difference and the determination of the physical quantities for each physical source until the sum of the squares of the differences becomes smaller than a predetermined threshold value, and employing the new passive physical quantity value of each passive physical source which is finally obtained.

8. A physical quantity analyzing method for determining a physical quantity value of a physical source at an arbitrary point within a region which satisfies simultaneous linear equations having individual physical quantity values for each individual physical source and proportion constants determined based upon the region, the method comprising the steps of:

determining the proportion constants based on characteristics of the region, determining a provisional physical quantity value for each plural predetermined position, measuring a known physical value for the arbitrary point, calculating a difference between the known physical quantity value and a sum of products of each provisional physical quantity and corresponding proportion constant, determining a value which minimizes a sum of squares of differences as a new physical quantity based upon the calculated differences and each physical quantity measurement value of each active physical source, repeating the calculation of the difference and the employment of physical quantities for each physical source, iteratively repeating of the calculation of the difference and the employment of the physical quantities for each physical source until the sum of the squares of the differences which is obtained by the repetition of the processings becomes smaller than a predetermined threshold value, and employing the physical quantity which is finally obtained as a physical quantity for the predetermined position.

9. A physical quantity analyzing method as set forth in claim 8, wherein the method employs inverses of resistance values for a plurality of resistances which are interconnected in a three dimensional lattice which approximates the region, as the proportion constants, employs current values at the lattice points as the actual physical quantities, and employs potentials at the lattice points as physical quantities which are objects for analysis.

10. A physical quantity analyzing method in which proportion constants are inverses: $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistances which are connected in x, y, z-directions to each lattice point $[k_x, k_y, k_z]$ of $N_x \times N_y \times N_z$ number of lattice points, and a sum $G_N[k_x, k_y, k_z]$ corresponding to resistances connected to the lattice point $[k_x, k_y, k_z]$ which sum is represented by the equation:

$$G_N[k_x, k_y, k_z] = G_x[k_x-1, k_y, k_z] + G_x[k_x, k_y, k_z] + G_y[k_x, k_y-1, k_z] + G_y[k_x, k_y, k_z] + G_z[k_x, k_y, k_z-1] + G_z[k_x, k_y, k_z]$$

and wherein flowing in current $S[k_x, k_y, k_z]$ and flowing out current $O[k_x, k_y, k_z]$ are present at the lattice point $[k_x, k_y, k_z]$, and physical quantities subject to analysis are potentials $u[k_x, k_y, k_z]$ at each lattice point $[k_x, k_y, k_z]$, wherein the method comprises the steps of:

(1) obtaining $(N_x-1) \times N_y \times N_z$ number of $G_x[k_x, k_y, k_z]$, (2) obtaining $N_x \times (N_y-1) \times N_z$ number of $G_y[k_x, k_y, k_z]$, (3) obtaining $N_x \times N_y \times (N_z-1)$ number of $G_z[k_x, k_y, k_z]$, (4) obtaining $N_x \times N_y \times N_z$ number of $G_N[k_x, k_y, k_z]$, (5) obtaining $N_x \times N_y \times N_z$ number of $\beta[k_x, k_y, k_z]$ based upon the equation:

$$\beta[k_x, k_y, k_z] = 1/(G_N[k_x, k_y, k_z]^2 + G_x[k_x-1, k_y, k_z]^2 + G_x[k_x, k_y, k_z]^2 + G_y[k_x, k_y-1, k_z]^2 + G_y[k_x, k_y, k_z]^2 + G_z[k_x, k_y, k_z-1]^2 + G_z[k_x, k_y, k_z]^2) \quad (6)$$

(6) calculating correction values $\Delta u$ of the potentials $u[k_x, k_y, k_z]$ based upon the formula:

$$\Delta u \leftarrow \beta[k_x, k_y, k_z]\{G_N[k_x, k_y, k_z] \ (S[k_x, k_y, k_z] - \qquad (7)$$
$$O[k_x, k_y, k_z]) - G_x[k_x - 1, k_y, k_z] \ (S[k_x - 1, k_y, k_z] - O[k_x - 1, k_y, k_z]) -$$
$$G_x[k_x, k_y, k_z] \ (S[k_x + 1, k_y, k_z] - O[k_x + 1, k_y, k_z]) - G_y[k_x, k_y - 1, k_z]$$
$$(S[k_x, k_y - 1, k_z] - O[k_x, k_y - 1, k_z]) - G_y[k_x, k_y, k_z] \ (S[k_x, k_y + 1, k_z] -$$
$$O[k_x, k_y + 1, k_z]) - G_y[k_x, k_y, k_z - 1] \ (S[k_x, k_y, k_z - 1] -$$
$$O[k_x, k_y, k_z - 1]) - G_z[k_x, k_y, k_z] \ (S[k_x, k_y, k_z + 1] - O[k_x, k_y, k_z + 1])\}$$

(7) correcting the potential $u[k_x, k_y, k_z]$ by adding the calculated correction value $\Delta u$, (8) repeating the processing of steps (6) and (7) from 1 to $N_z$ for $k_z$, (9) repeating the processing of steps (6) to (8) from 1 to $N_y$ for $k_y$,

(10) repeating the processing of steps (6) to (9) from 1 to $N_x$ for $k_x$, and

(11) repeating the processing of steps (6) to (10) until an estimated error becomes smaller than a predetermined threshold value, and outputting the potentials which are finally obtained as an analysis result.

11. A physical quantity analyzing method according to claim 10 in which potentials $u[k_x, k_y, k_z]$ of each lattice point $[k_x, k_y, k_z]$ which correspond to the analysis result and are employed as a proportion constant $\alpha_{ij}$, in which known physical quantities are potentials measured at a surface of a region subjected to analysis, and to in which flowing in current $S[k_x, k_y, k_z]$ and flowing out current $O[k_x, k_y, k_z]$ are present at each lattice point $[k_x, k_y, k_z]$, the method further comprising the steps of:

(1) determining a provisional value for current which flows into one lattice point and flows out from another lattice point, (2) calculating an estimated value of a potential on a surface of the region subject to analysis by multiplying the provisionally determined current and the proportion constant, (3) calculating a correction value for a first provisionally determined current based upon a difference between the measured potential and an estimated value of the potential, (4) correcting the provisionally determined current based upon the calculated correction value, (5) repeating the processing of steps (2) to (4) for each lattice point, and (6) repeating the processing of steps (2) to (5) until an estimated error becomes smaller than a predetermined threshold value, and employing the determined current obtained as an analysis result.

12. A physical quantity analyzing method as set forth in claim 1, further comprising the steps of:

(1) selecting two physical quantity values from among a plurality of physical quantities, (2) calculating a correction value of the physical quantity value based upon a formula:

$$\Delta u_i \leftarrow \sum_{j=1}^{n} \{\alpha_{ij}(S_j - O_j)\} / \sum_{j=1}^{n} \alpha_{ij}^2, \qquad (8)$$

(3) correcting the physical quantity value based upon the calculated correction value, (4) correcting a first physical quantity value by carrying out steps (2) and (3), (5) correcting a second physical quantity value by carrying out steps (2) and (3), (6) correcting the first physical quantity value again by carrying out steps (2) and (3), (7) calculating a correction value for correcting the second physical quantity value again, by carrying out step (2), (8) calculating a correction value for the first physical quantity value by dividing a product of the correction values which are obtained in steps (6) and (7) by a difference between the correction value obtained in step (4) and the correction value obtained in step (6), (9) calculating a correction value for the second physical quantity value by dividing a product of the correction values which are obtained in steps (5) and (7) by a difference between the correction value obtained in step (4) and the correction value obtained in step (6),

(10) correcting the physical quantity values based upon one of the respective correction values obtained in steps (8) and (9),

(11) selecting two additional physical quantities and carrying out steps (4) to (10), and

(12) repeating steps (4) to (11) until an estimated error becomes smaller than a predetermined threshold value, the determined physical quantity values which are finally obtained being the analysis result.

13. A physical quantity analyzing method as set forth in claim 12, further comprising the steps of:

calculating the estimated errors of $$D[k_x, k_y, k_z] = (S[k_x, k_y, k_z] - O[k_x, k_y, k_z])$$

$$D[k_x-1, k_y, k_z] = (S[k_x-1, k_y, k_z] = (S[k_x-1, k_y, k_z] - O[k_x-1, k_y, k_z])$$

$$D[k_x+1, k_y, k_z] = (S[k_x+1, k_y, k_z] - O[k_x+1, k_y, k_z])$$

$$D[k_x, k_y-1, k_z] = (S[k_x, k_y-1, k_z] - O[k_x, k_y-1, k_z])$$

$$D[k_x, k_y+1, k_z] = (S[k_x, k_y+1, k_z] - O[k_x, k_y+1, k_z])$$

$$D[k_x, k_y, k_z-1] = (S[k_x, k_y, k_z-1] - O[k_x, k_y, k_z-1])$$

$$D[k_x, k_y, k_z+1] = (S[k_x, k_y, k_z+1] - O[k_x, k_y, k_z+1])$$

and correcting the estimated errors based upon formulae:

$$D[k_x, k_y, k_z] \leftarrow (D[k_x, k_y, k_z] + G_N[k_x, k_y, k_z])\Delta u$$

$$D[k_x-1, k_y, k_z] \leftarrow (D[k_x-1, k_y, k_z] + G_x[k_x-1, k_y, k_z])\Delta u$$

$$D[k_x+1, k_y, k_z] \leftarrow (D[k_x+1, k_y, k_z] + G_x[k_x, k_y, k_z])\Delta u$$

$$D[k_x, k_y-1, k_z] \leftarrow (D[k_x, k_y-1, k_z] + G_y[k_x, k_y-1, k_z])\Delta u$$

$$D[k_x, k_y+1, k_z] \leftarrow (D[k_x, k_y+1, k_z] + G_y[k_x, k_y, k_z])\Delta u$$

$$D[k_x, k_y, k_z-1] \leftarrow (D[k_x, k_y, k_z-1] + G_z[k_x, k_y, k_z-1])\Delta u$$

$$D[k_x, k_y, k_z+1] \leftarrow (D[k_x, k_y, k_z+1] + G_z[k_x, k_y, k_z])\Delta u \qquad (9)$$

wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, k_z]$, $D[k_x, k_y, k_z-1]$, $D[k_x, k_y, k_z+1]$ are employed instead of, $$(S[k_x, k_y, k_z] - O[k_x, k_y, k_z]),$$

$$(S[k_x-1, k_y, k_z] - O[k_x-1, k_y, k_z]),$$

$$(S[k_x+1, k_y, k_z] - O[k_x+1, k_y, k_z]),$$

$$(S[k_x, k_y-1, k_z] - O[k_x, k_y-1, k_z]),$$

$$(S[k_x, k_y+1, k_z] - O[k_x, k_y+1, k_z])$$

$$(S[k_x, k_y, k_z-1] - O[k_x, k_y, k_z-1])$$

$(S[k_x,k_y,k_z+1]O[k_x,k_y,k_z+1])$ in a formula:

$$\Delta u \leftarrow \beta[k_x, k_y, k_z]\{G_N[k_x, k_y, k_z] (S[k_x, k_y, k_z] - \qquad (7)$$
$O[k_x, k_y, k_z]) - G_x[k_x - 1, k_y, k_z] (S[k_x - 1, k_y, k_z] - O[k_x - 1, k_y, k_z]) -$
$G_x[k_x, k_y, k_z] (S[k_x + 1, k_y, k_z] - O[k_x + 1, k_y, k_z]) - G_y[k_x, k_y - 1, k_z]$
$(S[k_x, k_y - 1, k_z] - O[k_x, k_y - 1, k_z]) - G_y[k_x, k_y, k_z] (S[k_x, k_y + 1, k_z] -$
$O[k_x, k_y + 1, k_z]) - G_z[k_x, k_y, k_z - 1] (S[k_x, k_y, k_z - 1] -$
$O[k_x, k_y, k_z - 1]) - G_z[k_x, k_y, k_z] (S[k_x, k_y, k_z + 1] - O[k_x, k_y, k_z + 1])\}.$ 14. A physical quantity analyzing method as set forth in claim 1, wherein the method normalizes the sum of squares of the calculated difference.

15. A physical quantity analyzing apparatus for determining a physical quantity for an unknown physical source in a physical system which has a relationship with an expected physical quantity $O_j$ at an arbitrary observation position j based on a constant $\alpha_{ij}$ according to an equation:

$$O_j = \sum_{i=1}^{m} \alpha_{ij} \cdot u_i, \qquad (1)$$

wherein the apparatus comprises:

physical quantity provisionally determining means for provisionally determining a physical quantity value $u_i$ of each physical source i, physical quantity renewing means for calculating an expected physical quantity $O_j$ based on a constant $\alpha_{ij}$, carrying out equation (1) for each provisional physical quantity value, a and determining determined physical quantity values which minimize a sum of squares of differences based upon the differences and corresponding proportional constants, the difference being a difference between the expected physical quantity value $O_j$ and a corresponding known physical quantity value $S_j$, both $O_j$ and $S_j$ are for an arbitrary observation point j, first repetition control means for repeating calculation the difference and determination of the determined physical quantity values for each physical source based on the difference and previously determined physical quantity values, second repetition controlling means for iteratively repeating the calculation of the difference by the first repetition control means and the determination of the determined physical quantity value for each physical source until a sum of the squares of the differences becomes smaller than a predetermined threshold value, and physical quantity employment means for employing the determined physical quantity values which are finally obtained.

16. A physical quantity analyzing apparatus for determining a physical source quantity of each physical source i within a system based upon observation quantity values at a predetermined plurality of positions spaced apart from the physical sources, wherein the observation quantity values measured at predetermined plural arbitrary positions can be calculated based upon predetermined operation formulae whose components include physical source quantities for physical sources, and wherein the observation quantity values measured at the predetermined positions are in a linear system, the apparatus comprising:

constant determining means for predetermining constants, each of which represents a physical field, generated between each predetermined position and each physical source, provisional physical quantity determining means for determining a provision physical source quantity value, measurement means for measuring the physical observation quantity value at each predetermined position, difference calculating means for calculating a difference between a measured observation physical quantity value at each predetermined position and a value provided as a sum of products of each physical source quantity value and corresponding constant, physical quantity correcting means for determining physical source quantity values which minimize a sum of squares of differences as new physical source quantity values based upon the calculated differences and corresponding constants, first repetition control means for repetitively operating the difference calculating means and the physical quantity correcting means for each physical source, and physical quantity employment means for repetitively operating the repetitive operations of the difference calculating means and the physical quantity correcting means for each physical source by the first repetition control means, and for employing the new physical source quantity value which is finally obtained as physical source quantity value for each respective physical source.

17. A physical quantity analyzing apparatus for determining a physical quantity $u_i$ of a physical source i based upon a physical quantity value $S_j$ measured at plural measurement points j spaced apart from the physical source i, wherein positions of the plural measurement points j are known and are spaced apart from each individual physical source i, of which physical source position also is known, and wherein the physical quantity value $S_j$ is in a linear system, the apparatus comprising:

(1) constant determining means for predetermining constants $\alpha_{ij}$ each of which represents a physical field generated between each predetermined position and each physical source, (2) physical quantity determining means for provisionally determining a provisional value for a physical quantity $u_i$ for each physical source, (3) estimation means for calculating an expected quantity value $O_j$ which is anticipated at the measurement point j by carrying out the equation:

$$O_j = \sum_{i=1}^{m} \alpha_{ij} \cdot u_i, \qquad (1)$$

(4) measurement means for measuring the physical quantity $S_j$ at each measurement point j, (5) difference calculation means for calculating a difference between the measured physical quantity value $S_j$ and the expected quantity value $O_j$, (6) provisional solution means for obtaining a provisional solution value for the physical quantity $u_i$ a by carrying out the equation:

$$u_i = u_1 + \sum_{j=1}^{n} \{\alpha_{ij}(S_j - O_j)\} / \sum_{j=1}^{n} \alpha_{ij}^2, \qquad (2)$$

(7) repeating means for causing said estimation means, difference calculation means, measurement means, and provisional solution means to perform their respective processing for each physical source i, (8) iterative means for causing iterative repeating of processing by said estimation means, measurement means difference calculation means, and provisional solution means to perform their respective processing until the sum of the squares of the differences between $S_j$ and $O_j$ is smaller than a predetermined threshold value, and (9) employment means for employing the provisional solution value of each physical source as a final value for each physical quantity $u_i$ as an analysis result.

18. A physical quantity analyzing apparatus for determining physical quantities of magnetic sources within an object by measuring a magnetic field which is generated by the object with plural magnetic field sensors; the apparatus comprising:

(1) constant determining means for predetermining constants $\alpha_{ij}$ each of which represents a magnetic field value existing between each predetermined position and each magnetic field source, (2) physical quantity means for determining a provisional physical quantity $u_i$ for each magnetic field source at a lattice point k (k=1, 2, ..., p) within the object, (3) estimation means for calculating a magnetic field $O_j$ which is expected at a measurement point j by carrying out the equation:

$$O_j = \sum_{i=1}^{m} \alpha_{ij} \cdot u_i, \quad (1)$$

(4) measurement means for measuring a magnet field value $S_j$ at each measurement point j, (5) difference calculation means for calculating a difference between the measured magnetic field value $S_j$ and the expected magnetic field value $O_j$, (6) provisional solution means for obtaining a provisional solution for physical quantity $u_i$ the equation:

$$u_i = u_i + \sum_{j=1}^{n} \{\alpha_{ij}(S_j - O_j)\} / \sum_{j=1}^{n} \alpha_{ij}^2 \quad (2)$$

(7) repeating means for causing said estimation means, measurement means, difference calculation means, and provisional solution means to perform their respective processing for all magnetic field sources subject to analysis, (8) iterative means for causing said estimation means, measurement means, difference calculation means, and provisional solution means to perform their respective processing until a sum of the squares of the differences between $S_j$ and $O_j$ is smaller than a predetermined threshold value, and (9) employment means for employing the provisional solution value of each physical source as an analysis result.

19. A physical quantity analyzing apparatus according to claim 18, wherein a x-direction current component and a y-direction current component represented by the formula:

$$u_i = \begin{cases} P_{xi} (i = 1, 2, \ldots, p) \\ P_{yi} (i = P+1, P+2, \ldots, 2p) \end{cases} \quad (3)$$

are employed as the physical quantity $u_i$, wherein the constant $\alpha_{ij}$ is given by a formula:

$$\alpha_{ij} = \begin{cases} \dfrac{K_j(Y_j - Y_i)}{\{(x_j - x_i)^2 + (y_j - y_i)^2 + (z_j - z_i)^2\}^{3/2}} \\ \quad (i = 1, 2, \ldots, p) \\ \dfrac{-K_j(x_j - x_{i-p})}{\{(x_j - x_{i-p})^2 + (y_j - y_{i-p})^2 + (z_j - z_{i-p})^2\}^{3/2}} \\ \quad (i = p+1, p+2, \ldots, 2p) \end{cases} \quad (4)$$

20. A physical quantity analyzing apparatus for determining a physical quantity corresponding to each physical source, which should be observable at an arbitrary predetermined position which value is caused by the physical quantity values of physical sources, wherein the measured physical values at arbitrary predetermined positions spaced apart from each individual physical source can be calculated based upon predetermined operation formulae which include the physical quantity value for each physical source and measured physical quantity values at the arbitrary predetermined positions spaced apart from at least one physical source which are in a linear system, the apparatus comprising:

physical quantity measuring means for measuring a measured physical quantity value at the arbitrary predetermined position which is proximal to at least one physical source, provisional degree determining means for provisionally determining degrees, each of which represents an influence at the predetermined position by the physical source, difference calculating means for calculating a difference between a measured physical quantity value at each predetermined position and a sum of products of each measured physical quantity and corresponding degree, physical quantity correcting means for determining a value which minimizes a sum of squares of differences as a new physical quantity value based upon the calculated differences and each measured physical quantity value, first repetition control means for repetitively operating the difference calculating means and the physical quantity correcting means for each physical source, and physical quantity employment means for iteratively using the difference calculating means and the physical quantity correcting means by the first repetition controlling means for each physical source until a sum of squares of the differences which is obtained by the repetition of the processings becomes smaller than a predetermined threshold value, and for employing the physical quantity value for each physical source as observable physical quantity values for the arbitrary predetermined positions.

21. A physical quantity analyzing apparatus for determining a passive physical quantity value of a passive physical source which influences an observable physical quantity observed at a predetermined position effected by active physical quantity values for active physical sources, wherein the observable physical quantity value at arbitrary predetermined positions spaced apart from the active physical sources can be calculated based upon predetermined operation formulae, and observable physical quantity values are in a linear system, the apparatus comprising:

physical quantity measuring means for measuring the active physical quantity value of the active physical source, provisional physical quantity determining means for determining a provisional passive physical quantity value of the passive physical source, difference calculating means for calculating a difference between the observable physical quantity value and a sum of products of each active physical quantity value and the provisional passive physical quantity value, physical quantity correcting means for determining a value which minimizes a sum of squares of differences as a new passive physical quantity value based upon the calculated differences and each active physical quantity value, first repetition control means for repetitively operating the difference calculating means and the physical quantity correcting means for each active physical source, and physical quantity employment means for iterating the repetition of the difference calculating means and the physical quantity correcting means by the first repetition control means for each physical source until the sum of the squares of the differences which is obtained by the repetition of the processing becomes smaller than a predetermined threshold value, and for employing the new passive physical quantity value which is finally obtained.

22. A physical quantity analyzing apparatus for determining a physical quantity value which is obtained at an arbitrary point within a region which satisfies simultaneous linear equations having a physical quantity value for individual physical sources and proportion constants based upon the region, the apparatus comprising:

proportion constant holding means for previously obtaining and storing the proportion constants which are determined for the region, provisional physical quantity determining means for determining provisional physical quantity values at plural predetermined positions, measuring means for measuring a known physical quantity value at each predetermined position within the region, difference calculating means for calculating a difference between the known physical quantity value and a sum of products of each provisional physical quantity and corresponding proportion constant, physical quantity renewing means for determining a value which minimizes a sum of squares of differences as a new physical quantity value based upon the calculated differences and each known physical quantity, first repetition control means for using the difference calculating means and the physical quantity renewing means for each physical source, and second repetition control means for controlling the iterative use of the difference calculating means and the physical quantities for each physical source until the sum of the squares of the differences becomes smaller than a predetermined threshold value, and physical quantity employment means for employing the physical quantity value as the physical quantity value corresponding to the arbitrary point.

23. A physical quantity analyzing apparatus according to claim 22, wherein the difference calculating means, after calculating the sum of the products of each physical quantity value and corresponding proportion constant is performed, obtains a new sum by correcting the last physical quantity value based upon a product of a physical quantity difference between the new physical quantity and the last physical quantity and corresponding proportion constant for each by the first repetition control means.

24. A physical quantity analyzing apparatus according to claim 22, wherein the difference calculating means, after calculating the difference, obtains a new difference based upon a product of change between the new physical quantity and a last physical quantity and corresponding proportion constant for each repetition by the first repetition control means.

25. A physical quantity analyzing apparatus in which proportion constants are inverses: $G_x[k_x-1, k_y, k_z]$, $G_x[k_x, k_y, k_z]$, $G_y[k_x, k_y-1, k_z]$, $G_y[k_x, k_y, k_z]$, $G_z[k_x, k_y, k_z-1]$, $G_z[k_x, k_y, k_z]$ of resistance values of resistances which are connected in x, y, z-directions to each lattice point $[k_x, k_y, k_z]$ $N_x \times N_y \times N_z$ number of lattice points, and a sum $G_N[k_x, k_y, k_z]$ corresponding to resistances actually connected to the lattice point $[k_x, k_y, k_z]$ which sum is represented by the equation:

$$G_N[k_x, k_y, k_z] = G_x[k_x-1, k_y, k_z] + G_x[k_x, k_y, k_z] + G_y[k_x, k_y-1, k_z] + G_y[k_x, k_y, k_z] + G_z[k_x, k_y, k_z-1] + G_z[k_x, k_y, k_z] \quad (5)$$

and wherein flowing in current $S[k_x, k_y, k_z]$ and flowing out current $O[k_x, k_y, k_z]$ are present at the lattice point $[k_x, k_y, k_z]$, and physical quantities for analysis are potentials $u[k_x, k_y, k_z]$ at each lattice point $[k_x, k_y, k_z]$, the apparatus comprising, (1) first means for obtaining $(N_x-1) \times N_y \times N_z$ number of $G_x[k_x, k_y, k_z]$, (2) second means for obtaining $N_x \times (N_y-1) \times N_z$ number of $G_y[k_x, k_y, k_z]$, (3) third means for obtaining $N_x \times N_y \times (N_z-1)$ number of $G_z[k_x, k_y, k_z]$, (4) fourth means for obtaining $N_x \times N_y \times N_z$ number of $G_N[k_x, k_y, k_z]$, (5) fifth means for obtaining $N_x \times N_y \times N_z$ number of $[k_x, k_y, k_z]$ based upon the equation:

$$\beta[k_x, k_y, k_z] = 1/(G_N[k_x, k_y, k_z]^2 + G_x[k_x-1, k_y, k_z]^2 + G_x[k_x, k_y, k_z]^2 + G_y[k_x, k_y-1, k_z]^2 + G_y[k_x, k_y, k_z]^2 + G_z[k_x, k_y, k_z-1]^2 + G_z[k_x, k_y, k_z]^2), \quad (6)$$

(6) correction calculating means for calculating correction values $\Delta u$ of the potentials $u[k_x, k_y, k_z]$ based upon the formula:

$$\Delta u \leftarrow \beta[k_x, k_y, k_z]\{G_N[k_x, k_y, k_z](S[k_x, k_y, k_z] - \quad (7)$$
$$O[k_x, k_y, k_z]) - G_x[k_x-1, k_y, k_z](S[k_x-1, k_y, k_z] - O[k_x-1, k_y, k_z]) -$$
$$G_x[k_x, k_y, k_z](S[k_x+1, k_y, k_z] - O[k_x+1, k_y, k_z]) - G_y[k_x, k_y-1, k_z]$$
$$(S[k_x, k_y-1, k_z] - O[k_x, k_y-1, k_z]) - G_y[k_x, k_y, k_z](S[k_x, k_y+1, k_z] -$$
$$O[k_x, k_y+1, k_z]) - G_z[k_x, k_y, k_z-1](S[k_x, k_y, k_z-1] -$$
$$O[k_x, k_y, k_z-1]) - G_z[k_x, k_y, k_z](S[k_x, k_y, k_z+1] - O[k_x, k_y, k_z+1])\},$$

(7) potential correction means for correcting the potential $u[k_x, k_y, k_z]$ by adding the calculated correction value $\Delta u$, (8) z repeat means for the correction calculating means and the potential correction means to repeat from 1 to $N_z$ for $k_z$, (9) y repeat means for the z repeat means to repeat from 1 to $N_y$ for $k_y$,

(10) x repeat means for the y repeat means to repeat from 1 to $N_x$ for $k_x$, and

(11) control means for the x repeat means to repeat until an estimated error becomes smaller than a predetermined threshold value, and for employing the potentials which are finally obtained as a result of analysis.

26. A physical quantity analyzing apparatus according to claim 25, wherein potentials $u[k_x, k_y, k_z]$ of each lattice point $[k_x, k_y, k_z]$ is employed as a proportion constant $\alpha_{ij}$, known physical quantities are potentials measured at a surface of a region subject to analysis, and physical quantities subject to analysis are flowing in current $S[k_x, k_y, k_z]$ and flowing out current $O[k_x, k_y, k_z]$ at each lattice point $[k_x, k_y, k_z]$, the apparatus comprising:

(1) provisional determination means for determining a provisional current which flows into one lattice point and flows out from another lattice point, (2) estimation means for calculating an estimated potential value on a surface of the region subject to analysis by multiplying the provisional current and the proportion constant, (3) calculation means for calculating a correction value for the provisional current based upon a difference between the measured potential value and the estimated potential value, (4) correction means for correcting the one physical quantity based upon the calculated correction value, (5) repeating means for repetitively operating said estimation means, said calculation means, and said correction means for each physical quantity, and (6) controlling means for repetitively operating said estimation means, calculation means, said correction means, and said repeating means until an estimated error becomes smaller than a predetermined threshold value, and for employing a resulting current as an analysis result.

27. A physical quantity analyzing apparatus according to claim 15 comprising:

(1) selection means for selecting first and second physical quantity values from among a plurality of physical quantities, (2) error calculating means for calculating a correction value of the physical quantity value based upon the formula:

$$\Delta u_i \leftarrow \sum_{j=1}^{n} \{\alpha_{ij}(S_j - O_j)\} / \sum_{j=1}^{n} \alpha_{ij}^2, \quad (8)$$

(3) correction means for correcting the physical quantity value based upon the calculated correction value, (4) second repeat means for correcting the first physical quantity value by operating said error calculating means and correction means, (5) second repeat means for correcting the second physical cal quantity value by operating said error calculating means and correction means, (6) first iterate means for correcting the first physical quantity value again by operating said error calculating means and correction means, (7) second iterate means for correcting the second physical cal quantity value again by operating said error calculating means and correction means, (8) first correction calculating means for calculating a correction value for the first physical quantity value by dividing a product of the correction values which are obtained from said first iterate means and second iterate means by a difference between the correction value which is obtained from said first repeat means and the correction value obtained from said first iterate means, (9) second correction calculating means for calculating a correction value for the second physical quantity value by dividing a product of the correction values which are obtained from said second repeat means and second iterate means by a difference between the correction value which is obtained from said first repeat means and the correction value which is obtained from said first iterate means,

(10) final correction means for correcting the physical quantity values based upon one of the respective correction values from said first correction calculating means and second correction calculating means,

(11) second selection means for selecting two other physical quantity values and for operating each of said first repeat means, second repeat means, first iterate means, second iterate means, first correcting calculating means, second correction calculating means, and final correction means, and

(12) control means for repetitively operating each of said first repeat means, second repeat means, first iterate means, second iterate means, first correcting calculating means, second correction calculating means, final correction means, and second selection means until an estimated error becomes smaller than a predetermined threshold value, and for employing the determined physical quality values as the analysis result.

28. A physical quantity analyzing apparatus according to claim 27 further comprising:

means for calculating the estimated errors of $D[k_x, k_y, k_z]=(S[k_x, k_y, k_z]-O[k_x, k_y, k_z])$ $D[k_x-1, k_y, k_z]=(S[k_x-1, k_y, k_z]-O[k_x-1, k_y, k_z])$ $D[k_x+1, k_y, k_z]=(S[k_x+1, k_y, k_z]-O[k_x+1, k_y, k_z])$ $D[k_x, k_y-1, k_z]=(S[k_x, k_y-1, k_z]-O[k_x, k_y-1, k_z])$ $D[k_x, k_y+1, k_z]=(S[k_x, k_y+1, k_z]-O[k_x, k_y, k_z])$ $D[k_x[+1], k_y, k_z-1]=(S[k_x[+1], k_y, k_z-1]-O[k_x+1, k_y, k_z])$ $D[k_x, k_y, k_z+1]=(S[k_x, k_y, k_z+1]-O[k_x, k_y, k_z+1])$ and means for correcting the estimated errors based upon the formulae:

$D[k_x, k_y, k_z] \leftarrow (D[k_x, k_y, k_z]+G_N[k_x, k_y, k_z])\Delta u$ $D[k_x-1, k_y, k_z] \leftarrow (D[k_x-1, k_y, k_z]+G_x[k_x-1, k_y, k_z])\Delta u$ $D[k_x+1, k_y, k_z] \leftarrow (D[k_x+1, k_y, k_z]+G_x[k_x, k_y, k_z])\Delta u$ $D[k_x, k_y-1, k_z] \leftarrow (D[k_x, k_y-1, k_z]+G_y[k_x, k_y-1, k_z])\Delta u$ $D[k_x, k_y+1, k_z] \leftarrow (D[k_x, k_y+1, k_z]+G_y[k_x, k_y, k_z])\Delta u$ $D[k_x, k_y, k_z-1] \leftarrow (D[k_x, k_y, k_z-1]+G_z[k_x+1, k_y, k_z-1])\Delta u$ $D[k_x, k_y, k_z+1] \leftarrow (D[k_x, k_y, k_z+1]+G_z[G_x[k_x, k_y, k_z])\Delta u \quad (9)$ wherein $D[k_x, k_y, k_z]$, $D[k_x-1, k_y, k_z]$, $D[k_x+1, k_y, k_z]$, $D[k_x, k_y-1, k_z]$, $D[k_x, k_y+1, kz]$, $D[k_x, k_y, k_z-1]$, $D[k_x, k_y, k_z+1]$ are employed instead of $(S[k_x, k_y, k_z]-O[k_x, k_y, k_z])$ $(S[k_x-1, k_y, k_z]-O[k_x-1, k_y, k_z])$, $(S[k_x+1, k_y, k_z]-O[k_x+1, k_y, k_z])$, $(S[k_x, k_y-1, k_z]-O[k_x, k_y-1, k_z])$, $(S[k_x, k_y+1, k_z]-O[k_x, k_y-1, k_z])$, $(S[k_x, k_y, k_z-1]-O[k_x-1, k_y, k_z-1])$, $(S[k_x, k_y, k_z+1]-O[k_x, k_y, k_z+1])$, in the formula:

$$\Delta u \leftarrow \beta[k_x, k_y, k_z]\{G_N[k_x, k_y, k_z] (S[k_x, k_y, k_z] - \qquad(7)$$
$$O[k_x, k_y, k_z]) - G_x[k_x - 1, k_y, k_z] (S[k_x - 1, k_y, k_z] - O[k_x - 1, k_y, k_z]) -$$
$$G_x[k_x, k_y, k_z] (S[k_x + 1, k_y, k_z] - O[k_x + 1, k_y, k_z]) - G_y[k_x, k_y - 1, k_z]$$
$$(S[k_x, k_y - 1, k_z] - O[k_x, k_y - 1, k_z]) - G_y[k_x, k_y, k_z] (S[k_x, k_y + 1, k_z] -$$
$$O[k_x, k_y + 1, k_z]) - G_z[k_x, k_y, k_z - 1] (S[k_x, k_y, k_z - 1] -$$
$$O[k_x, k_y, k_z - 1]) - G_z[k_x, k_y, k_z] (S[k_x, k_y, k_z + 1] - O[k_x, k_y, k_z + 1])\}.$$

29. A physical quantity analyzing apparatus according to claim 15, wherein the physical quantity calculating means normalizes the sum of squares of the calculated difference.

30. A physical quantity analyzing method for determining a physical quantity value of a physical source at an arbitrary point within a region which satisfies simultaneous linear equations having individual physical quantity values for each individual physical source and proportion constants determined based upon the region, the method comprising the steps of:

determining the proportion constants based on characteristics of the region, determining a provisional physical quantity value for each plural predetermined position, measuring a known physical value for the arbitrary point, calculating a difference between the known physical quantity value and a sum of products of each provisional physical quantity and corresponding proportion constant, determining a value which is obtained by dividing a sum of the products of each provisional physical quantity and the corresponding proportion constant by a sum of squares of all of corresponding proportion constants, repeating the calculation of the difference and the employment of physical quantities for each physical source, iteratively repeating of the calculation of the difference and the employment of the physical quantities for each physical source until the sum of the squares of the differences which is obtained by the repetition of the processings becomes smaller than a predetermined threshold value, and employing the physical quantity which is finally obtained as a physical quantity for the predetermined position.

31. A physical quantity analyzing method for determining a physical quantity for an unknown physical source in a physical system, which physical quantity $u_i$ has a relationship with an expected physical $O_j$ at an arbitrary observation position j based on a constant $\alpha_{ij}$ given by the equation:

$$O_j = \sum_{i=1}^{m} \alpha_{ij} \cdot u_i \qquad(1)$$

the method comprising the steps of:

determining a provisional physical quantity value $u_i$ for each of a plurality of individual physical sources i in a physical system, calculating an expected physical quantity value $O_j$ based on a constant $\alpha_{ij}$ and carrying out equation (1) for each provisional physical quantity value, measuring a known physical quantity value $S_j$ for each arbitrary observation point j, determining determined physical quantity values which minimize squares of a difference between the expected physical quantity value $O_j$ and corresponding known physical quantity value $S_j$, both $O_j$ and $S_j$ being for an arbitrary observation point j, repeating calculation of the difference and determination of the determined physical quantity values for each physical source based on the difference and previously determined physical quantity values, iteratively repeating the calculation of the difference and the determination of the determined physical quantity value for each physical source until a sum of the square of the difference becomes smaller than a predetermined threshold value, and employing the determined physical quantity values which are finally obtained as the physical quantity value $u_i$ for each physical source.

32. A physical quantity analyzing method for determining a physical quantity for an unknown physical source in a physical system, which physical quantity $u_i$ has a relationship with an expected physical $O_j$ at an arbitrary observation position j based on a constant $\alpha_{ij}$ given by the equation:

$$O_j = \sum_{i=1}^{m} \alpha_{ij} \cdot u_i \qquad(1)$$

the method comprising the steps of:

determining a provisional physical quantity value $u_i$ for each of a plurality of individual physical sources i in a physical system, calculating an expected physical quantity value $O_j$ based on a constant $\alpha_{ij}$ and carrying out equation (1) for each provisional physical quantity value, measuring a known physical quantity value $S_j$ for each arbitrary observation point j, determining determined physical quantity values which minimize a sum of a square of a difference between the expected physical quantity value $O_j$ and corresponding known physical quantity value $S_j$, both $O_j$ and $S_j$ being for an arbitrary observation point j, repeating calculation of the difference and determination of the determined physical quantity values for each physical source based on the difference and previously determined physical quantity values, iteratively repeating the calculation of the difference and the determination of the determined physical quantity value for each physical source until a sum of an absolute value of the difference becomes smaller than a predetermined threshold value, and employing the determined physical quantity values which are finally obtained as the physical quantity $u_i$ for each physical source.

33. A physical quantity analyzing apparatus for determining a physical quantity for an unknown physical source in a physical system which has a relationship with an expected physical quantity $O_j$ at an arbitrary observation position j based on a constant $\alpha_{ij}$ according to an equation:

$$O_j = \sum_{i=1}^{m} \alpha_{ij} \cdot u_i, \qquad(1)$$

wherein the apparatus comprises:

physical quantity provisionally determining means for provisionally determining a physical quantity value $u_i$ of each physical source i, physical quantity renewing means for calculating an expected physical quantity $O_j$ based on a constant $\alpha_{ij}$ carrying out equation (1) for each provisional physical quantity value, and determining determined physical quantity values which minimize squares of differences based upon the differences and corresponding proportional constants, the difference being a difference between the expected physical quantity value $O_j$ and a corresponding known physical quantity value $S_j$, both $O_j$ and $S_j$ being for an arbitrary observation point j, first repetition control means for repeating calculation the difference and determination of the determined physical quantity values for each physical source based on the difference and previously determined physical quantity values, second repetition controlling means for iteratively repeating the calculation of the difference by the first repetition control means and the determination of the determined physical quantity value for each physical source until a sum of the squares of the differences becomes smaller than a predetermined threshold value, and physical quantity employment means for employing the determined physical quantity values which are finally obtained.

34. A physical quantity analyzing apparatus for determining a physical quantity for an unknown physical source in a physical system which has a relationship with an expected physical quantity $O_j$ at an arbitrary observation position j based on a constant $\alpha_{ij}$ according to an equation:

$$O_j = \sum_{i=1}^{m} \alpha_{ij} \cdot u_i, \quad (1)$$

wherein the apparatus comprises:

physical quantity provisionally determining means for provisionally determining a physical quantity value $u_i$ of each physical source i, physical quantity renewing means for calculating an expected physical quantity $O_j$ based on a constant $\alpha_{ij}$, carrying out equation (1) for each provisional physical quantity value, and determining determined physical quantity values which minimize a sum of squares of differences based upon the differences and corresponding proportional constants, the difference being a difference between the expected physical quantity value $O_j$ and a corresponding known physical quantity value $S_j$, both $O_j$ and $S_j$ being for an arbitrary observation point j, first repetition control means for repeating calculation the difference and determination of the determined physical quantity values for each physical source based on the difference and previously determined physical quantity values, second repetition controlling means for iteratively repeating the calculation of the difference by the first repetition control means and the determination of the determined physical quantity value for each physical source until a sum of absolute values of the difference becomes smaller than a predetermined threshold value, and physical quantity employment means for employing the determined physical quantity values which are finally obtained.

* * * * *